(12) United States Patent
Hiyama

(10) Patent No.: US 12,306,346 B2
(45) Date of Patent: May 20, 2025

(54) TIME MEASUREMENT DEVICE

(71) Applicant: SONY SEMICONDUCTOR SOLUTIONS CORPORATION, Kanagawa (JP)

(72) Inventor: Hiroki Hiyama, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 947 days.

(21) Appl. No.: 17/295,927

(22) PCT Filed: Oct. 10, 2019

(86) PCT No.: PCT/JP2019/039982
§ 371 (c)(1),
(2) Date: May 21, 2021

(87) PCT Pub. No.: WO2020/110475
PCT Pub. Date: Jun. 4, 2020

(65) Prior Publication Data
US 2022/0011411 A1    Jan. 13, 2022

(30) Foreign Application Priority Data
Nov. 30, 2018  (JP) ................ 2018-224545

(51) Int. Cl.
G01C 3/08      (2006.01)
G01S 7/4865    (2020.01)
G01S 17/10     (2020.01)

(52) U.S. Cl.
CPC ............ G01S 7/4865 (2013.01); G01S 17/10 (2013.01)

(58) Field of Classification Search
CPC ................ G01S 7/4865; G01S 17/10
See application file for complete search history.

(56) References Cited

U.S. PATENT DOCUMENTS 5,054,911 A * 10/1991 Ohishi ................. G01B 11/026
                                                    356/5.07
6,288,775 B1    9/2001 Tanaka
(Continued)

FOREIGN PATENT DOCUMENTS

DE    102016114432 A1    2/2018
EP         0957375 A2   11/1999
(Continued)

OTHER PUBLICATIONS

International Search Report and Written Opinion of PCT Application No. PCT/JP2019/039982, issued on Dec. 17, 2019, 11 pages of ISRWO.

Primary Examiner — Mark Hellner
(74) Attorney, Agent, or Firm — CHIP LAW GROUP

(57) ABSTRACT

A time measurement device according to the present disclosure includes: a first light receiving unit; a first timing detection unit; a first calculation unit; and a histogram generation unit. The first light receiving unit is configured to detect first pulse light and second pulse light. The first pulse light corresponds to emission pulse light emitted from a light emitting unit. The second pulse light includes reflected light by a target object. The reflected light by the target object corresponds to the emission pulse light. The first timing detection unit is configured to detect a first light receiving timing of the first pulse light and a second light receiving timing of the second pulse light by the first light receiving unit on the basis of an output signal of the first light receiving unit. The first calculation unit is configured to calculate a first time value by performing a subtraction process on the basis of the first light receiving timing and the second light receiving timing. The histogram generation unit is configured to generate a histogram on the basis of the first time value.

16 Claims, 27 Drawing Sheets

(56) References Cited

U.S. PATENT DOCUMENTS

| | | |
|---|---|---|
| 9,006,641 B2 | 4/2015 | Drader |
| 9,639,063 B2 | 5/2017 | Dutton |
| 2004/0070746 A1* | 4/2004 | Lewis .................. G01S 7/4811 |
| | | 356/5.01 |
| 2016/0033644 A1 | 2/2016 | Moore |
| 2018/0210084 A1 | 7/2018 | Zwölfer |

FOREIGN PATENT DOCUMENTS

| | | | |
|---|---|---|---|
| EP | 3279685 A1 | 2/2018 | |
| JP | 2-181689 A | 7/1990 | |
| JP | 6-289136 A | 10/1994 | |
| JP | 11-326515 A | 11/1999 | |
| JP | 3225682 B2 * | 11/2001 | ............. G01S 17/10 |
| JP | 2010-091377 A | 4/2010 | |
| JP | 5206297 B2 * | 6/2013 | ............. G01S 17/10 |
| JP | 2015-117970 A | 6/2015 | |
| JP | 2016-211881 A | 12/2016 | |
| JP | 2018-059898 A | 4/2018 | |
| WO | 2018/211762 A1 | 11/2018 | |

\* cited by examiner

[FIG. 1]
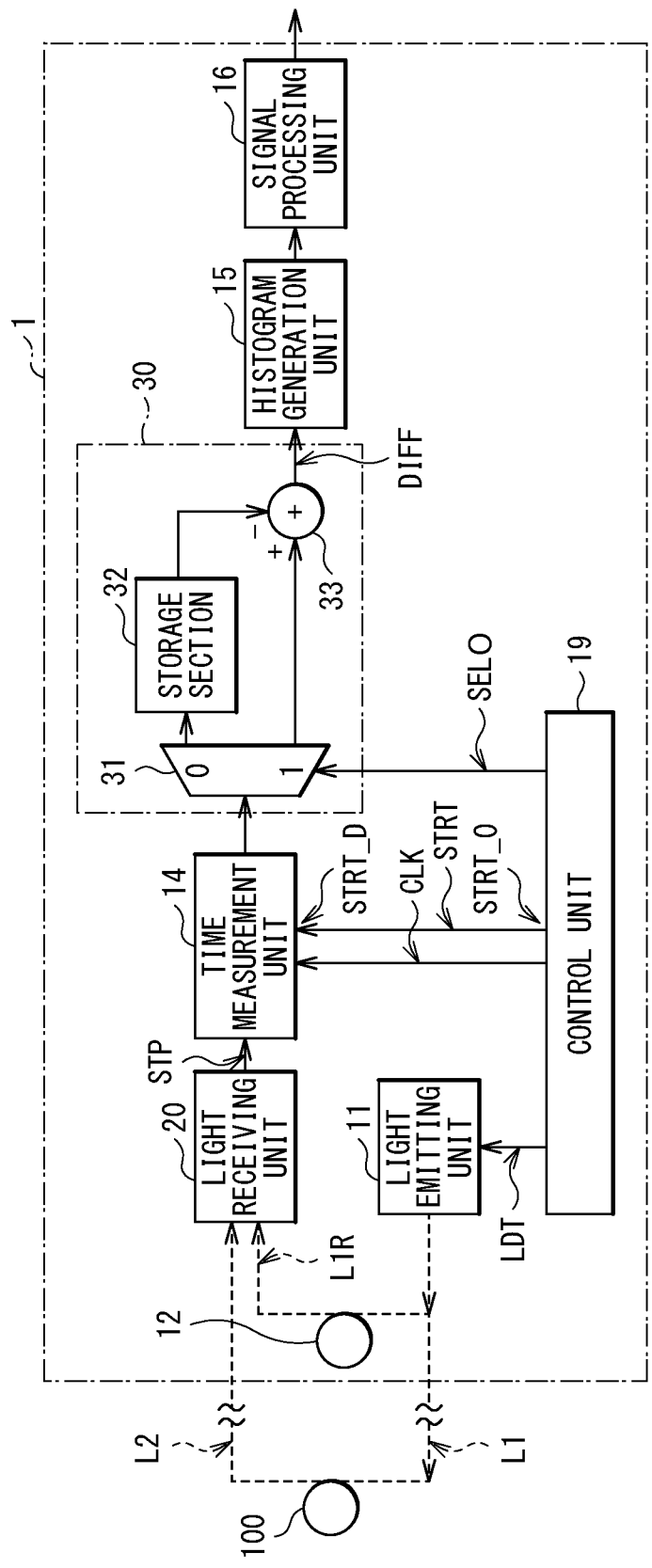

[FIG. 2]
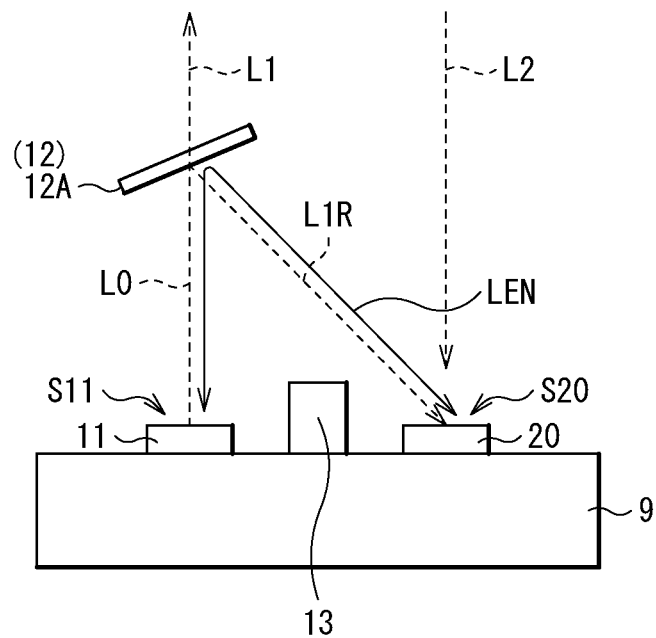
[FIG. 3]
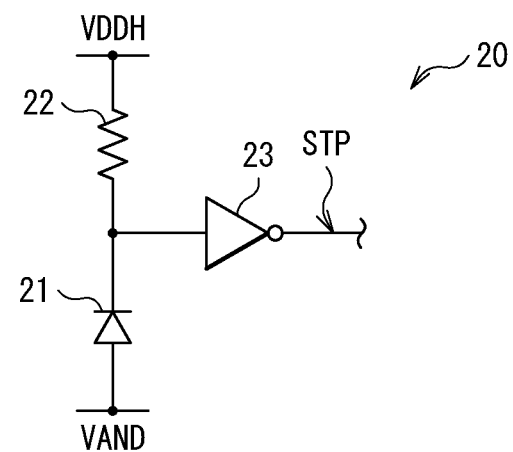

[FIG. 4]
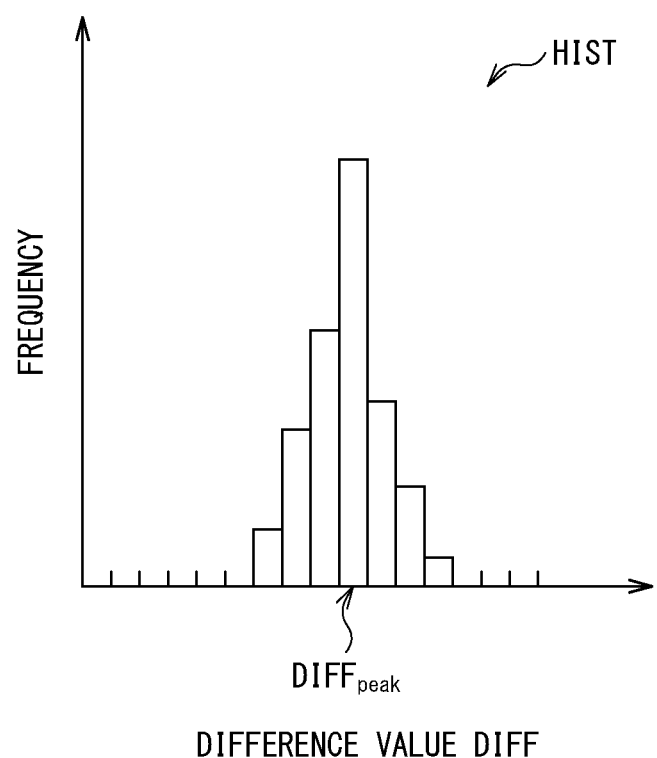

[FIG. 5]
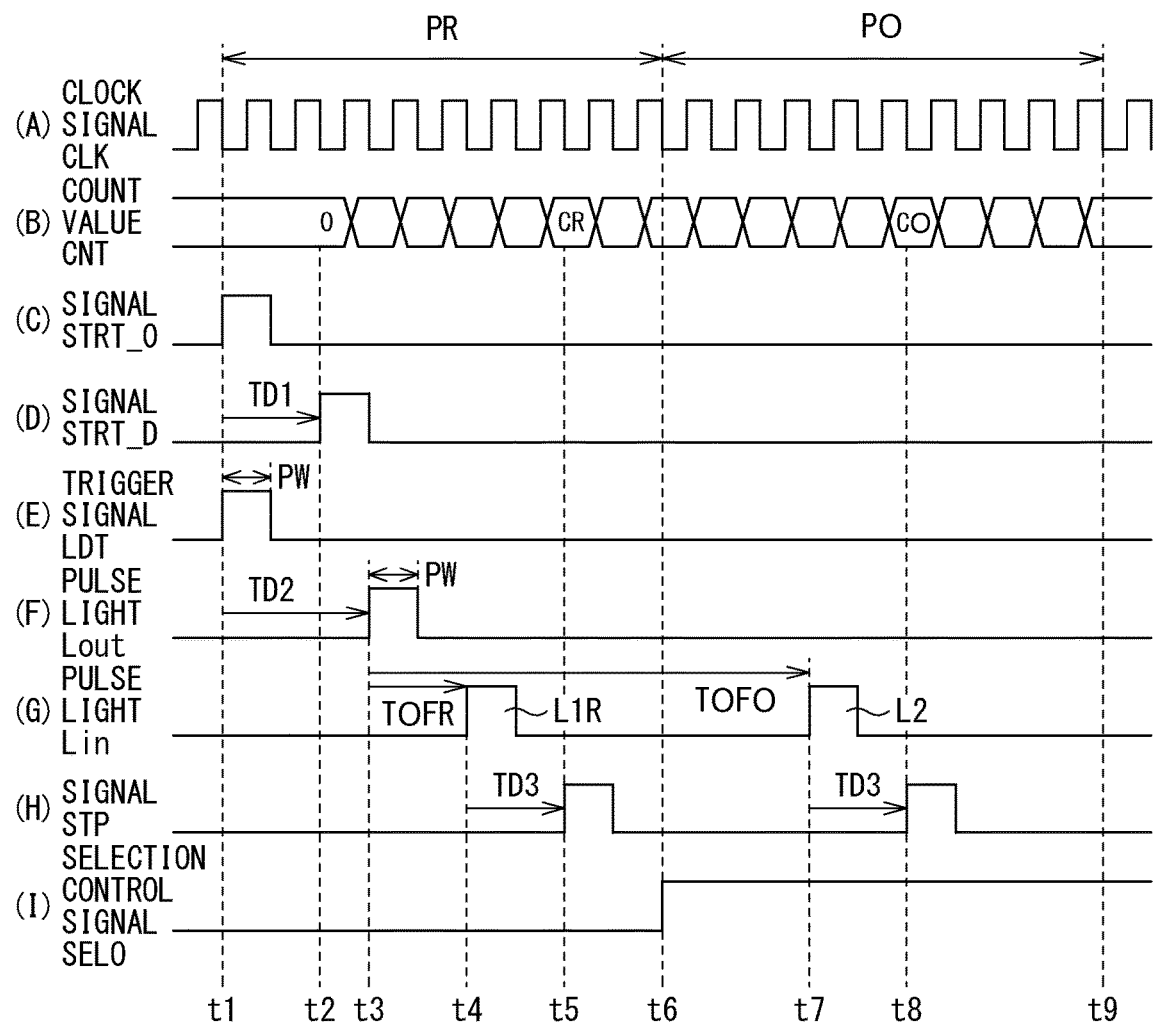

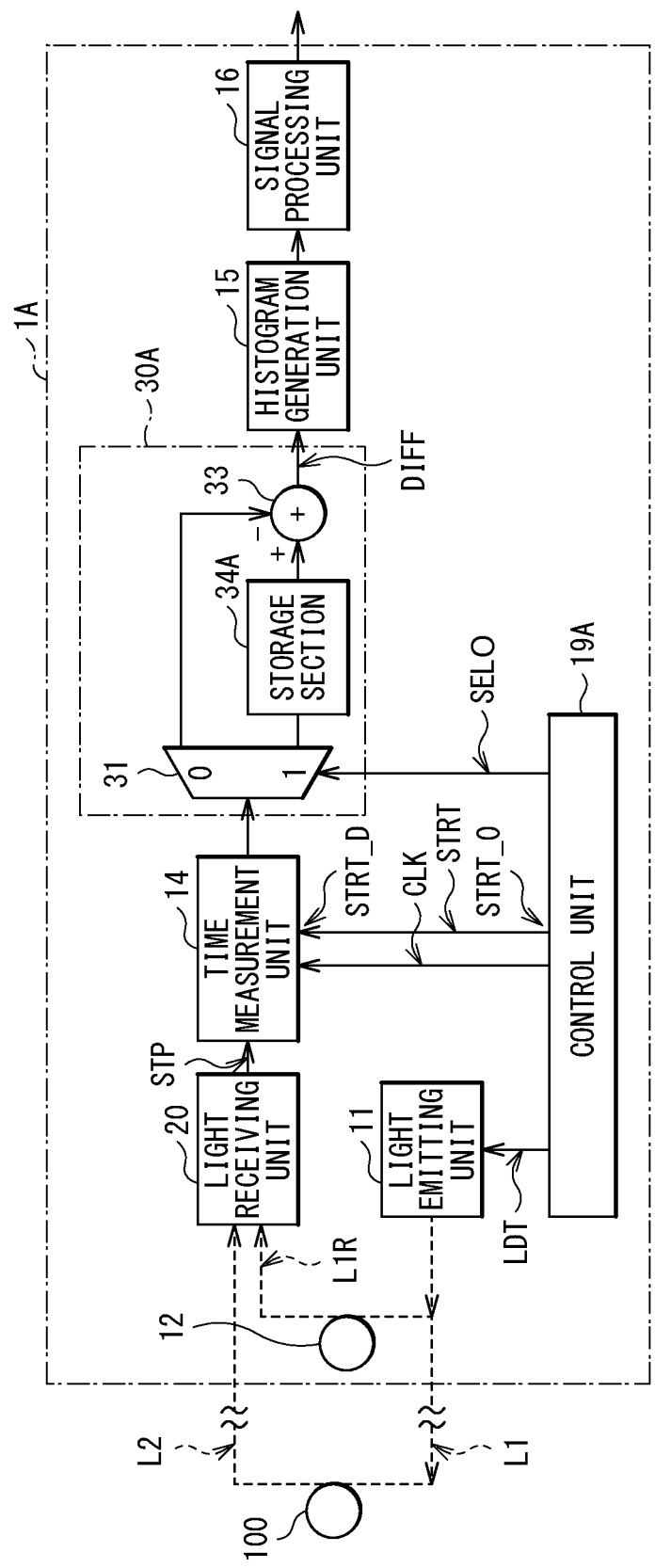
[FIG. 6]

[FIG. 7A]
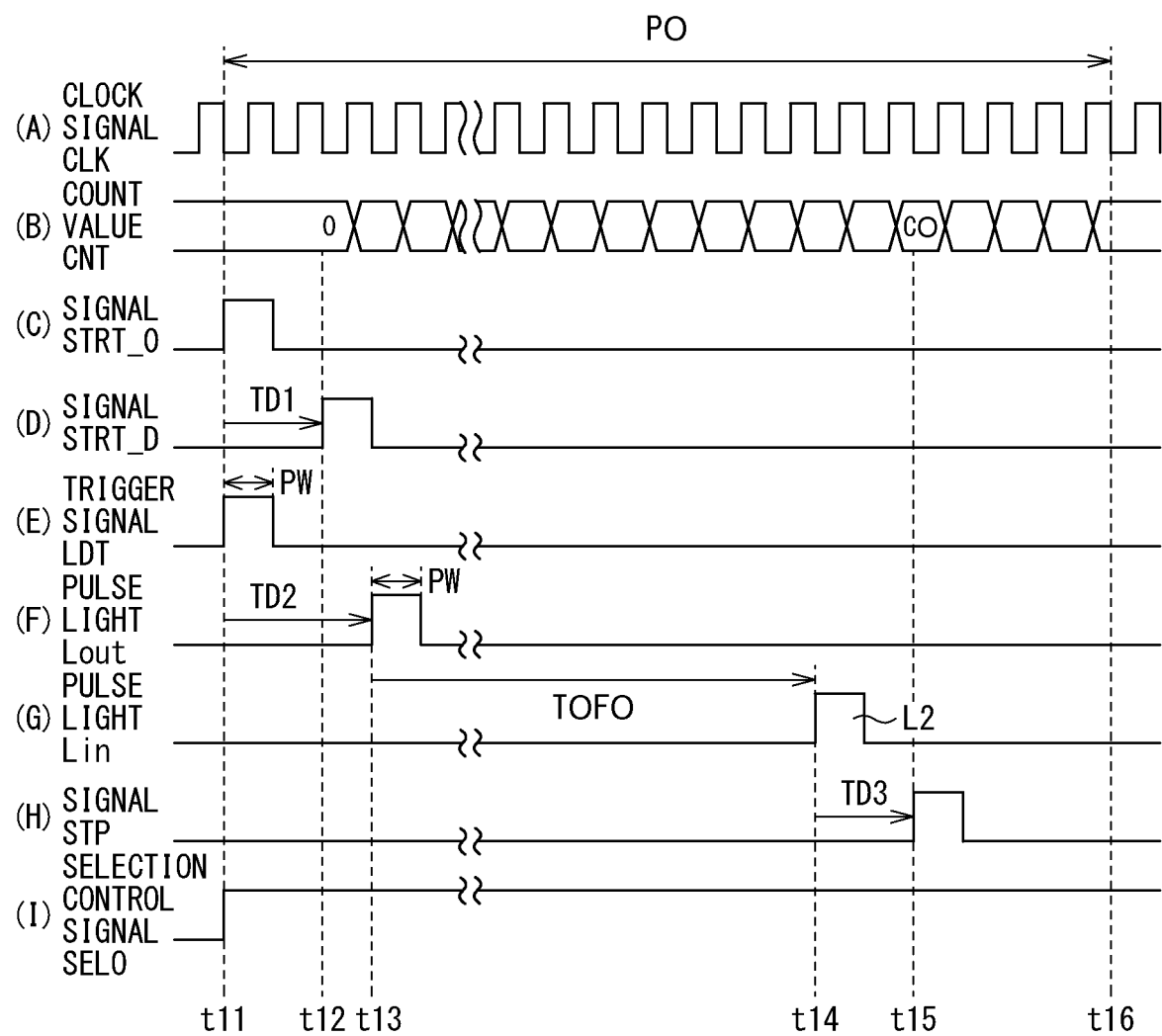

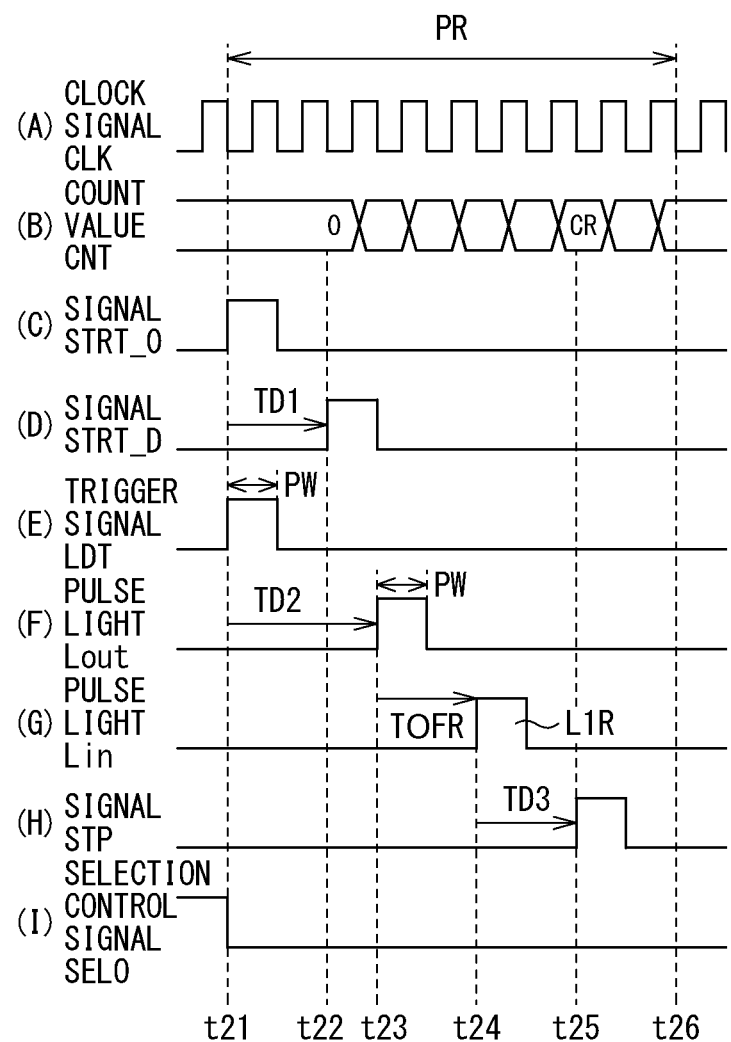
[FIG. 7B]

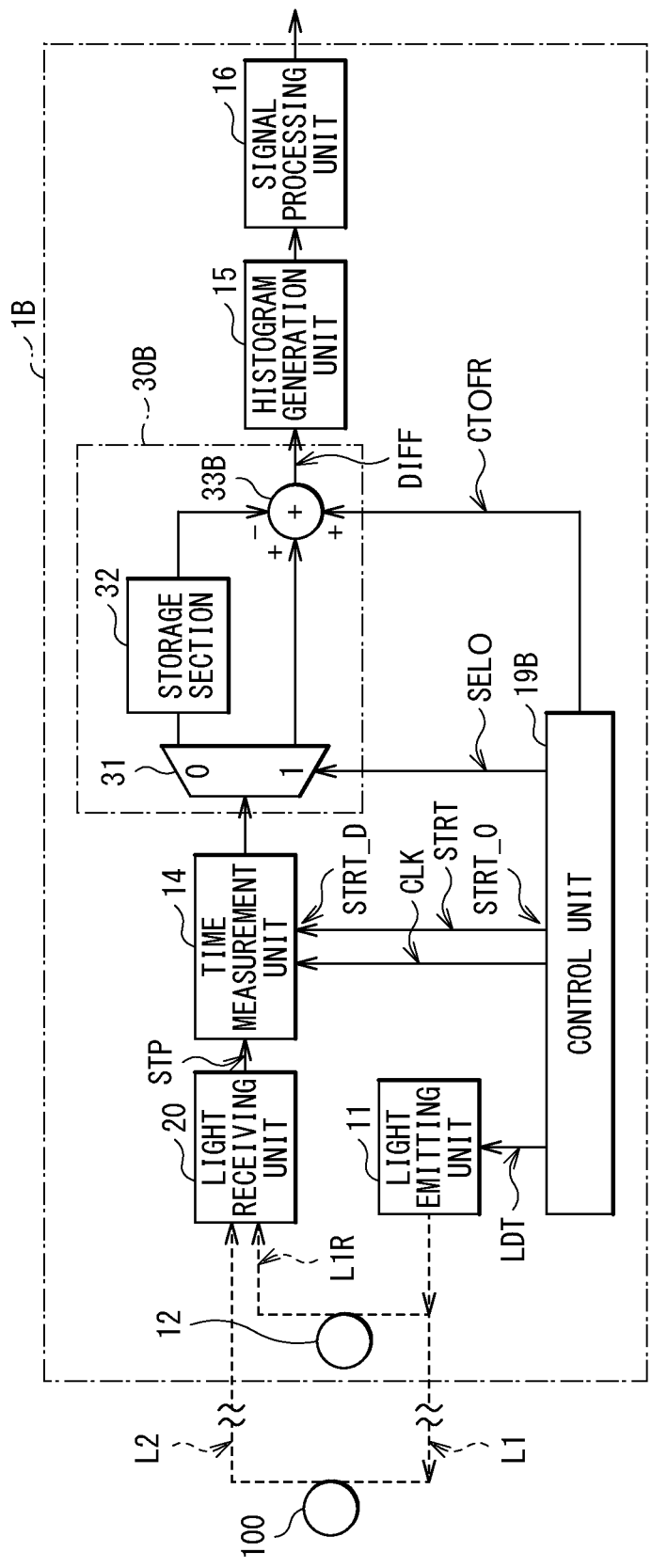
[FIG. 8]

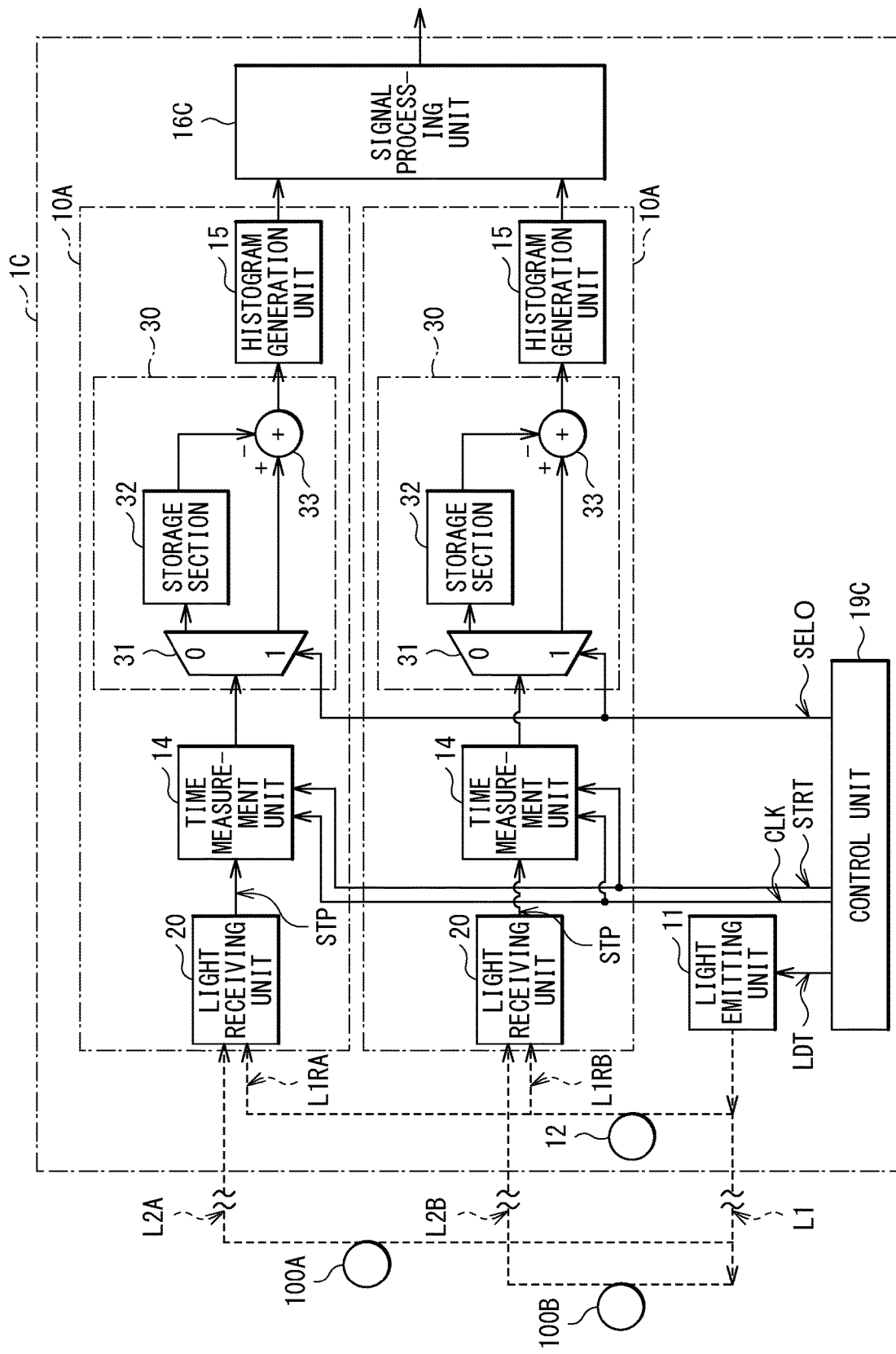
[FIG. 9]

[FIG. 10]
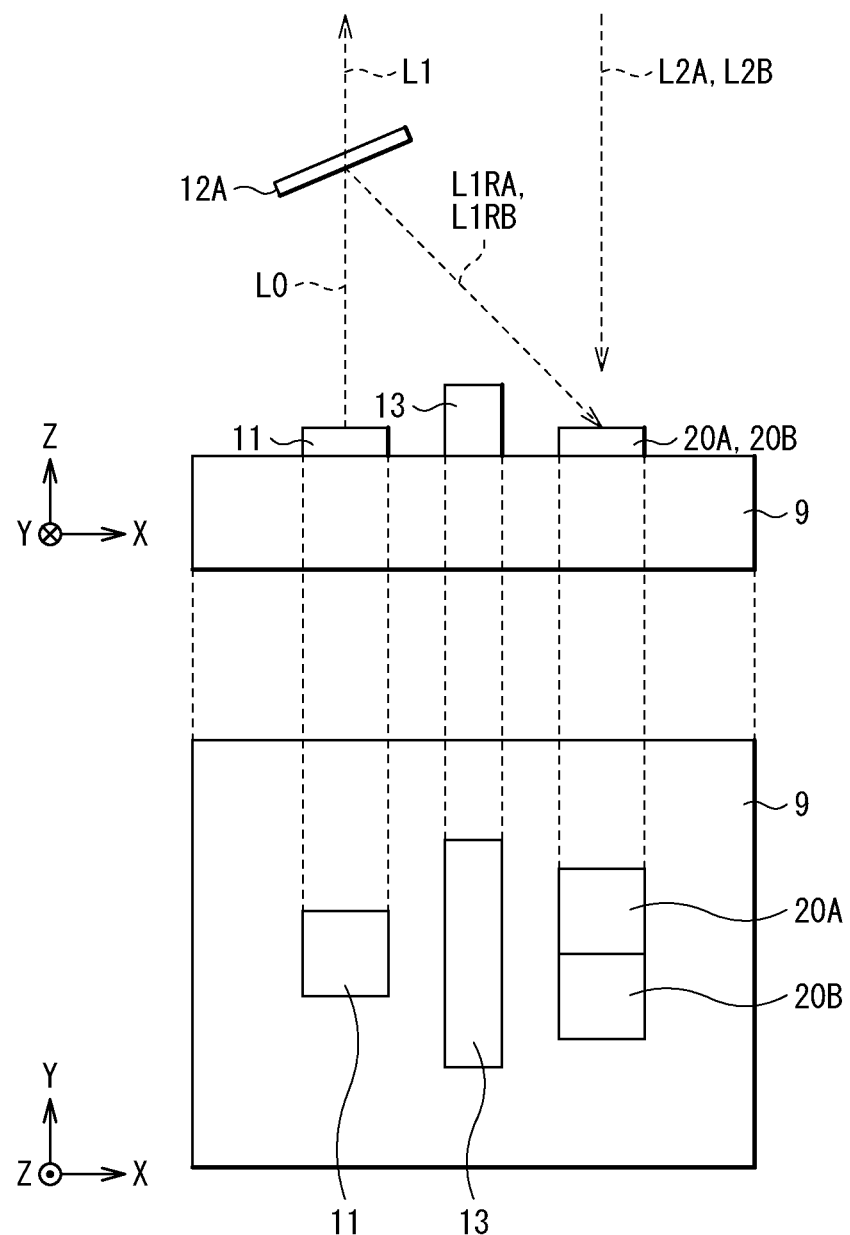

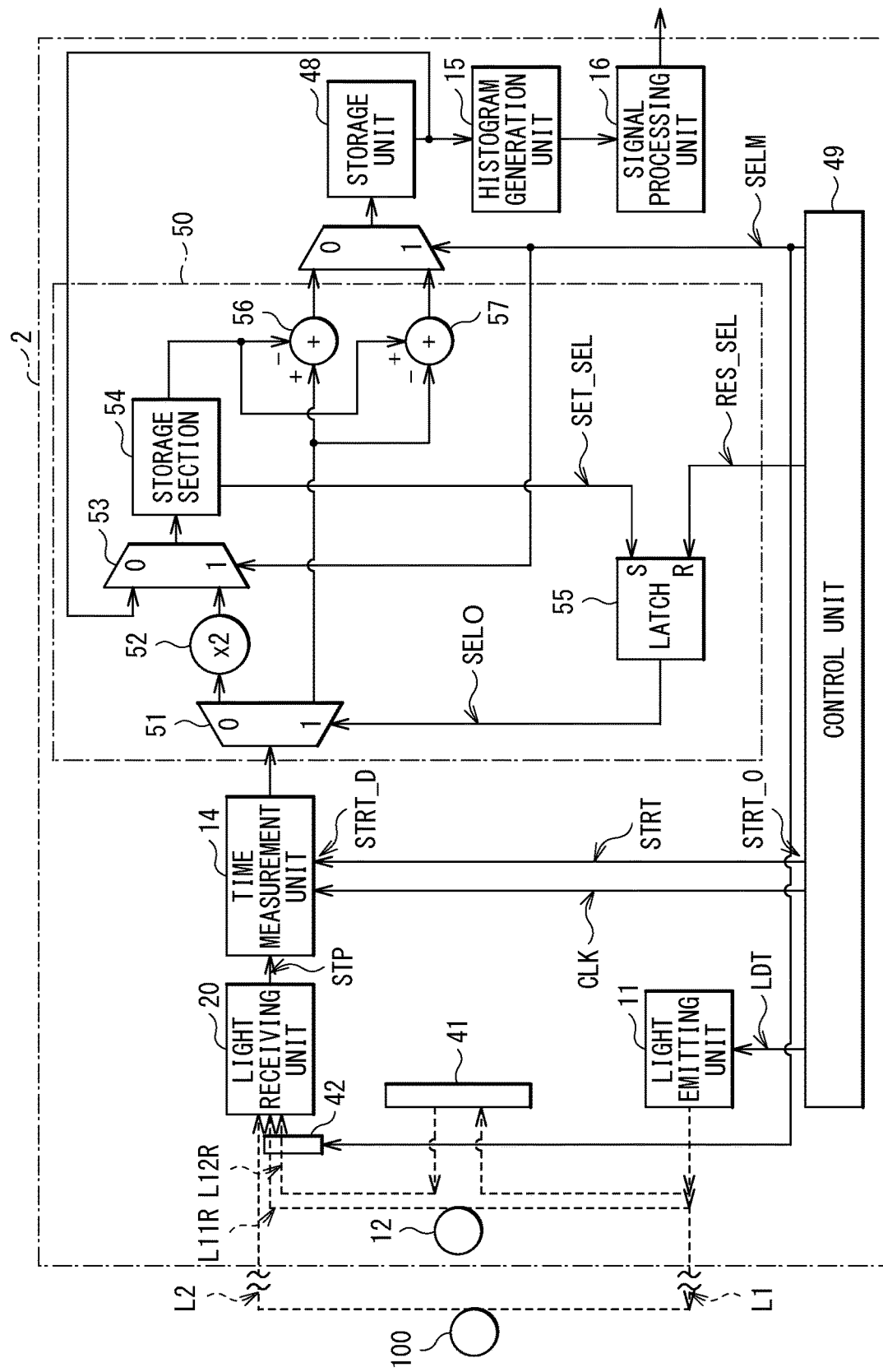
[FIG. 11]

[FIG. 12A]
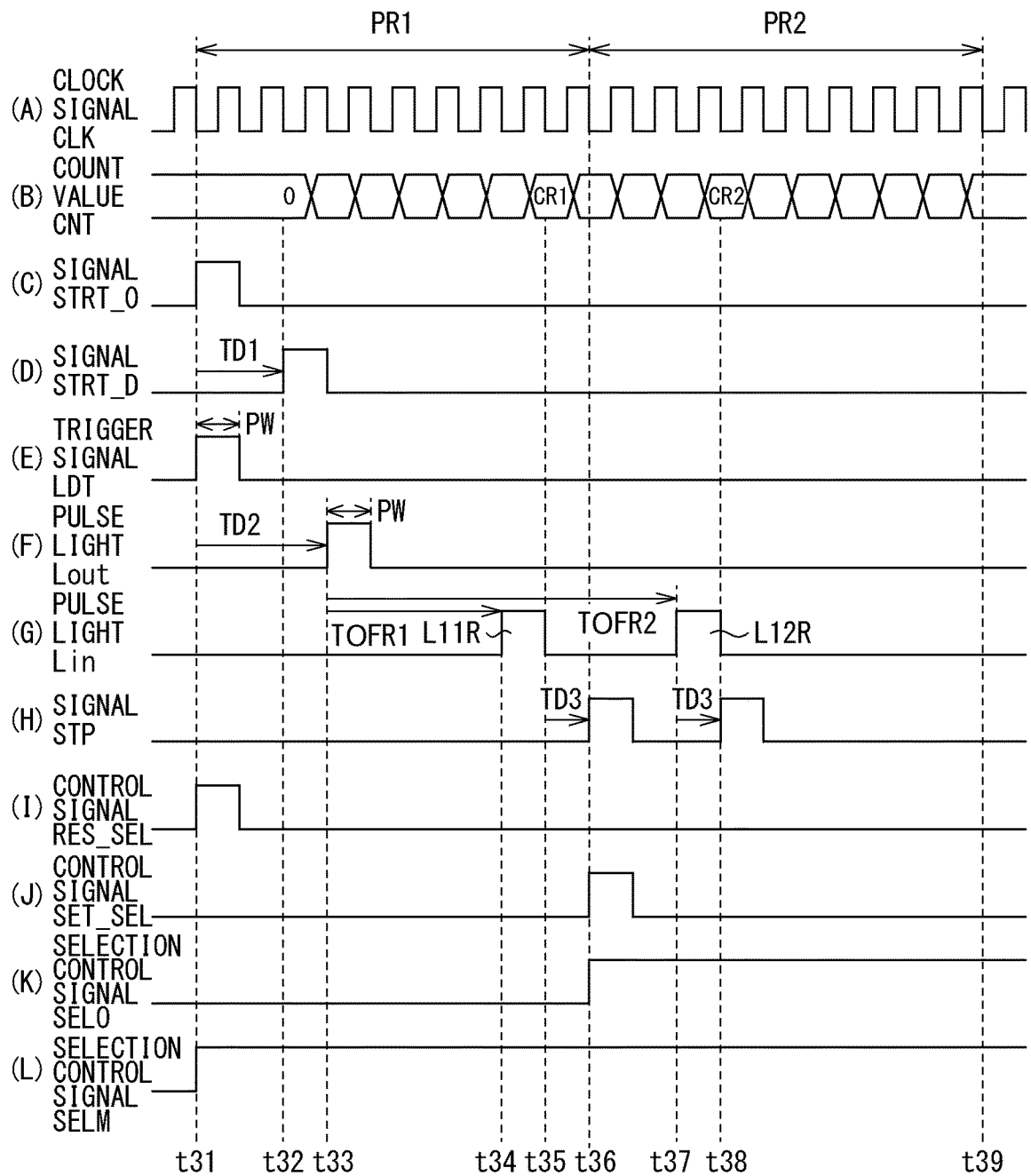

[FIG. 12B]
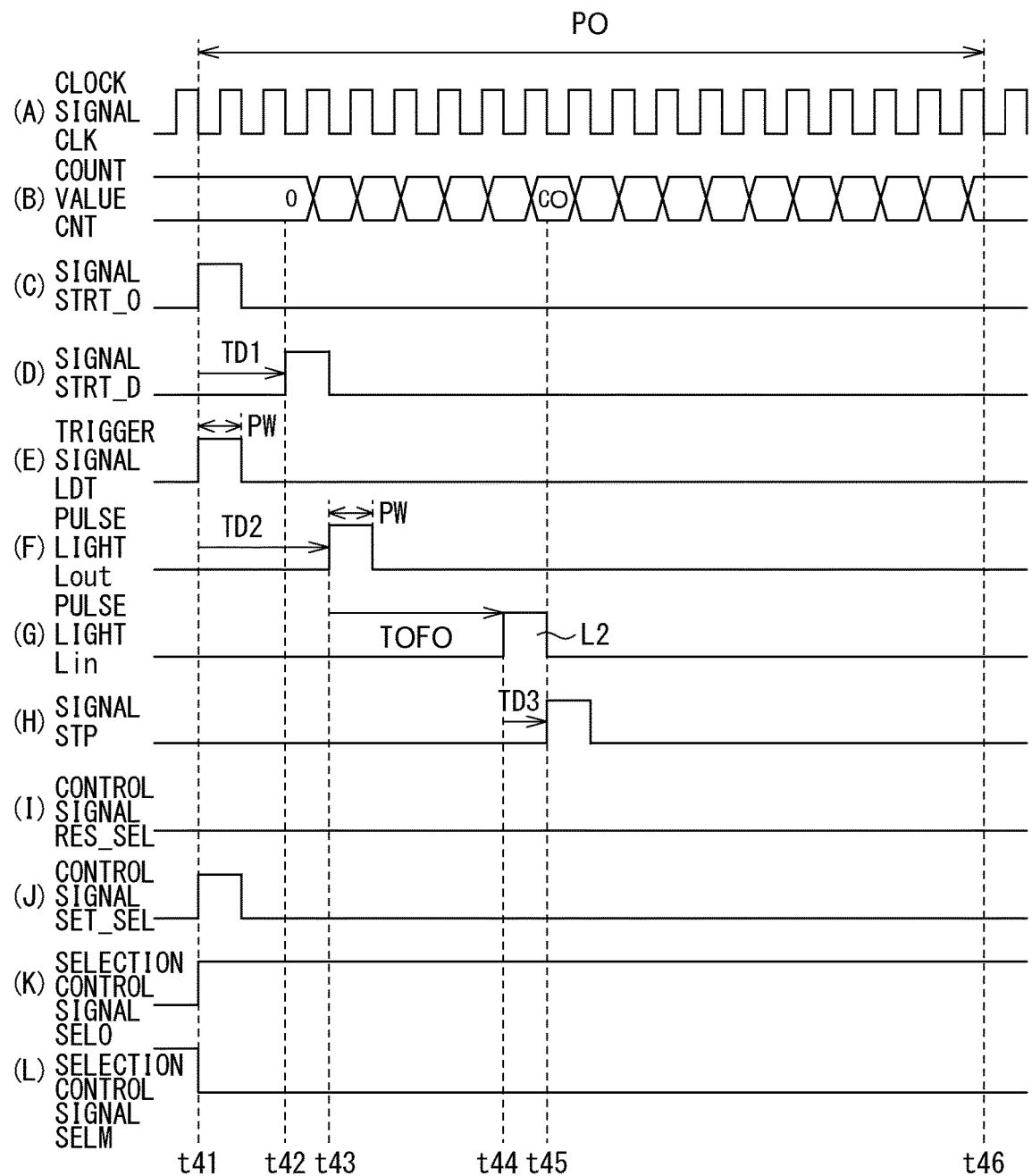

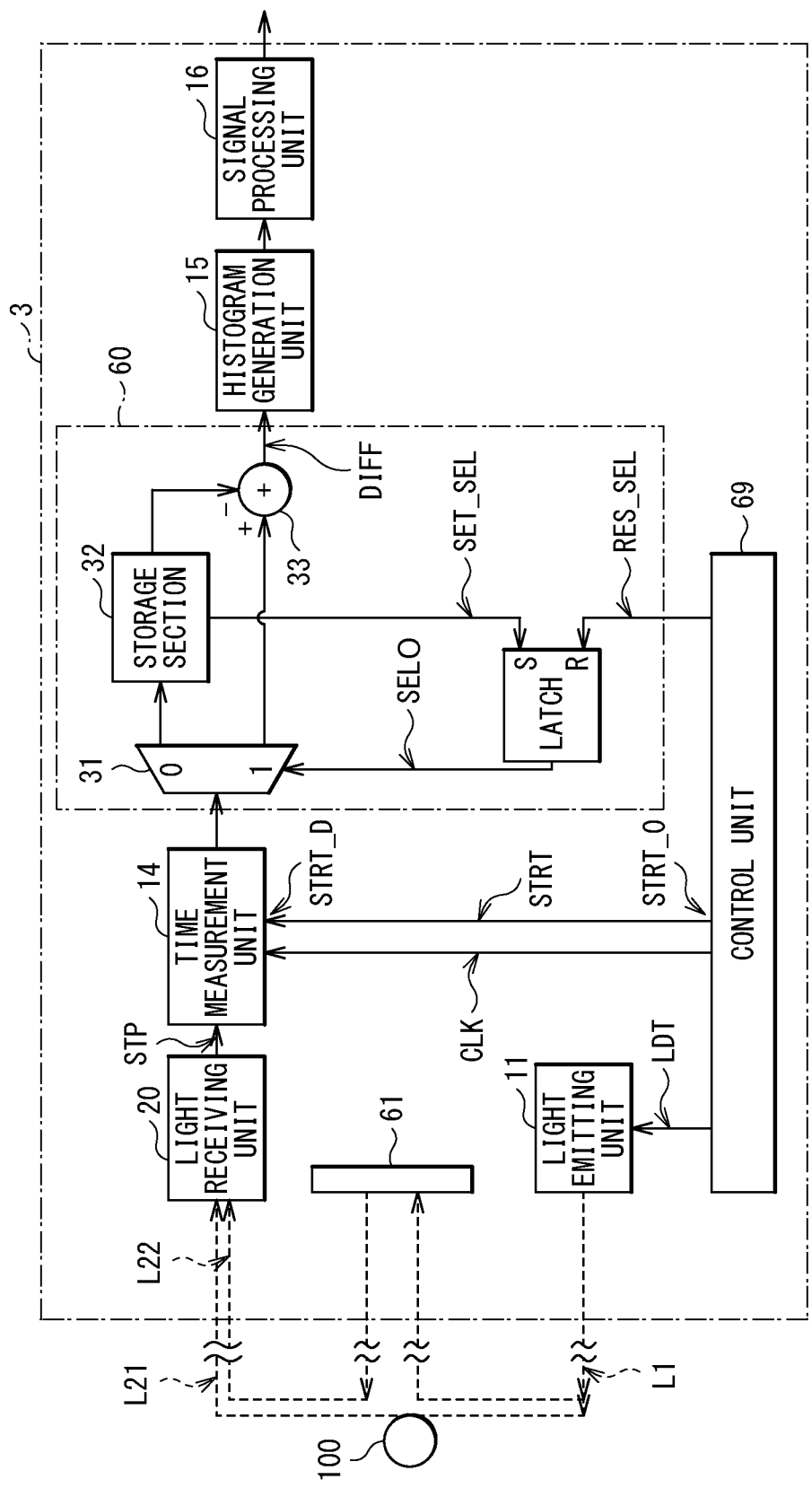
[FIG. 13]

[FIG. 14]
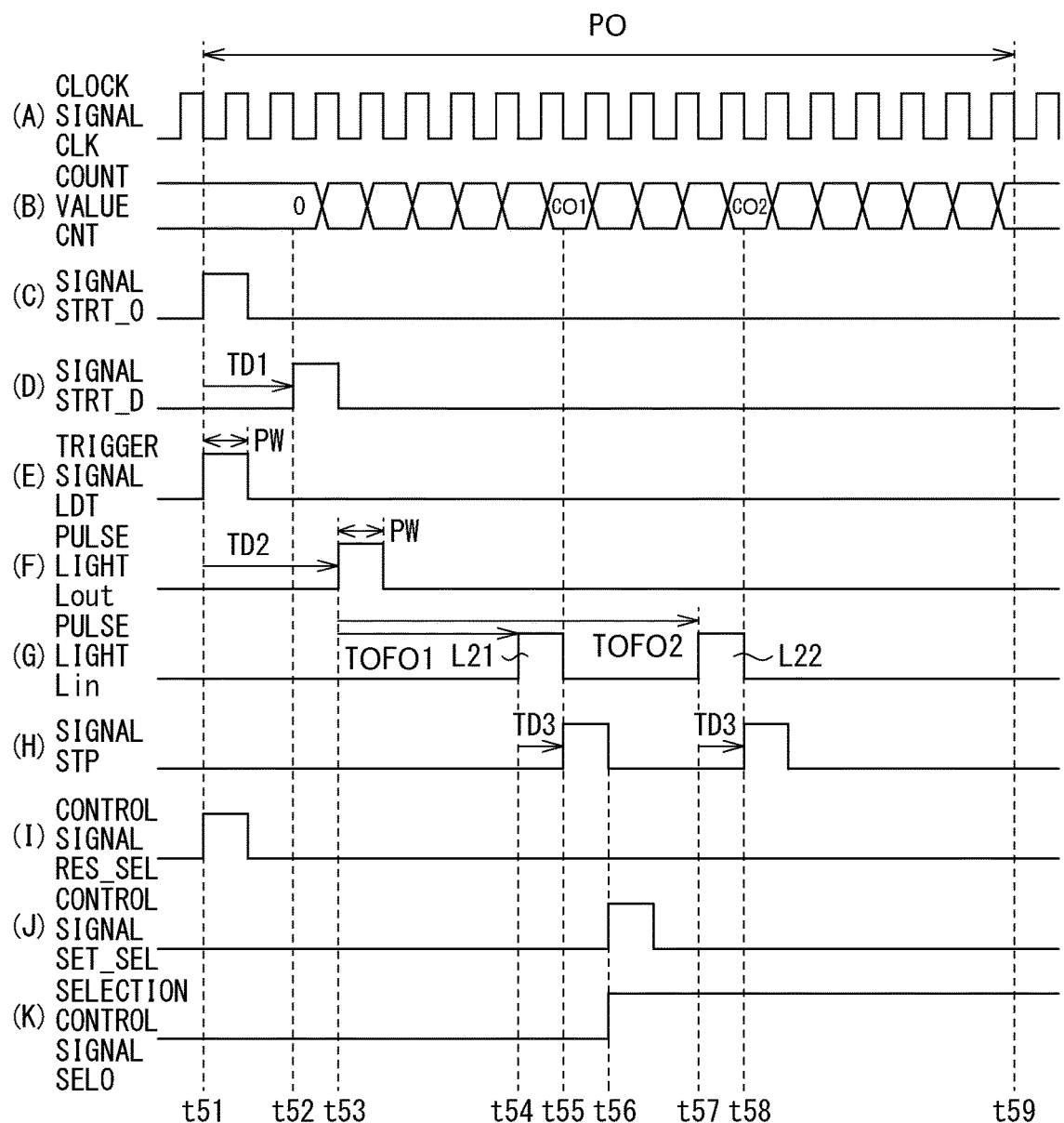

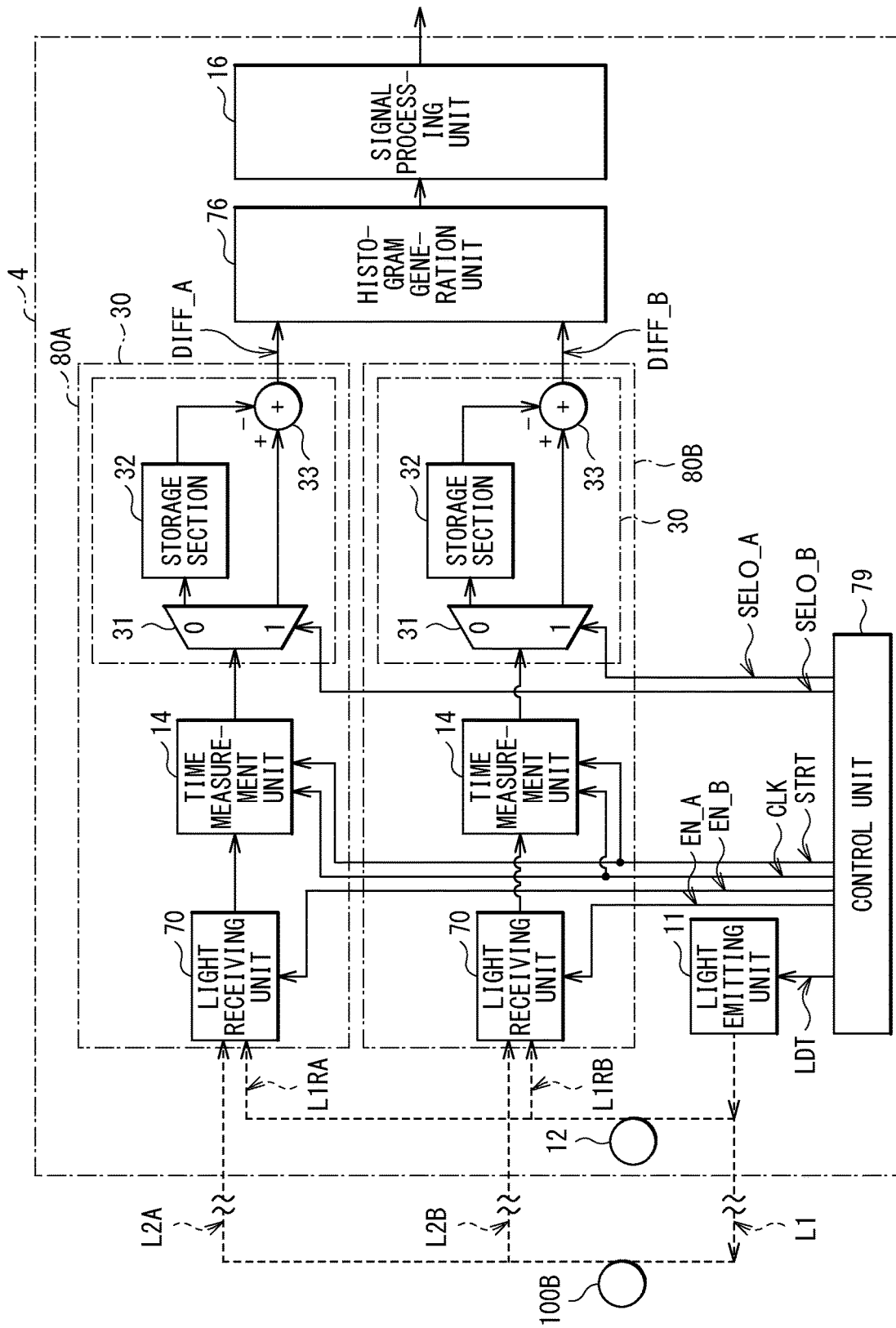
[FIG. 15]

[FIG. 16]
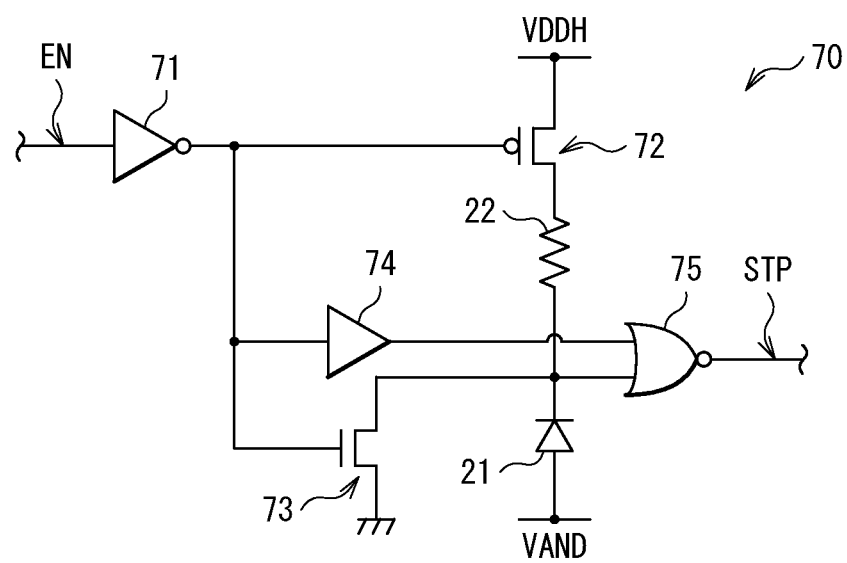

| FIG. | | D1 | D2 | | | | D2 | | | |
|---|---|---|---|---|---|---|---|---|---|---|
| | | | P1 | P2 | P3 | P4 | P1 | P2 | P3 | P4 |
| FIG. 17A | OPERATION MODE | AR_BR | AO_BR | AR_BO | AO_BO | AO_BO | AO_BR | AR_BO | AO_BO | AO_BO |
| FIG. 17B | MEASUREMENT TARGET OF CIRCUIT 80A | REFERENCE REFLECTOR 12 | MEASUREMENT TARGET OBJECT 100 | REFERENCE REFLECTOR 12 | MEASUREMENT TARGET OBJECT 100 | MEASUREMENT TARGET OBJECT 100 | MEASUREMENT TARGET OBJECT 100 | REFERENCE REFLECTOR 12 | MEASUREMENT TARGET OBJECT 100 | MEASUREMENT TARGET OBJECT 100 |
| FIG. 17C | MEASUREMENT TARGET OF CIRCUIT 80 | REFERENCE REFLECTOR 12 | REFERENCE REFLECTOR 12 | MEASUREMENT TARGET OBJECT 100 | MEASUREMENT TARGET OBJECT 100 | MEASUREMENT TARGET OBJECT 100 | REFERENCE REFLECTOR 12 | MEASUREMENT TARGET OBJECT 100 | MEASUREMENT TARGET OBJECT 100 | MEASUREMENT TARGET OBJECT 100 |

[FIG. 18]
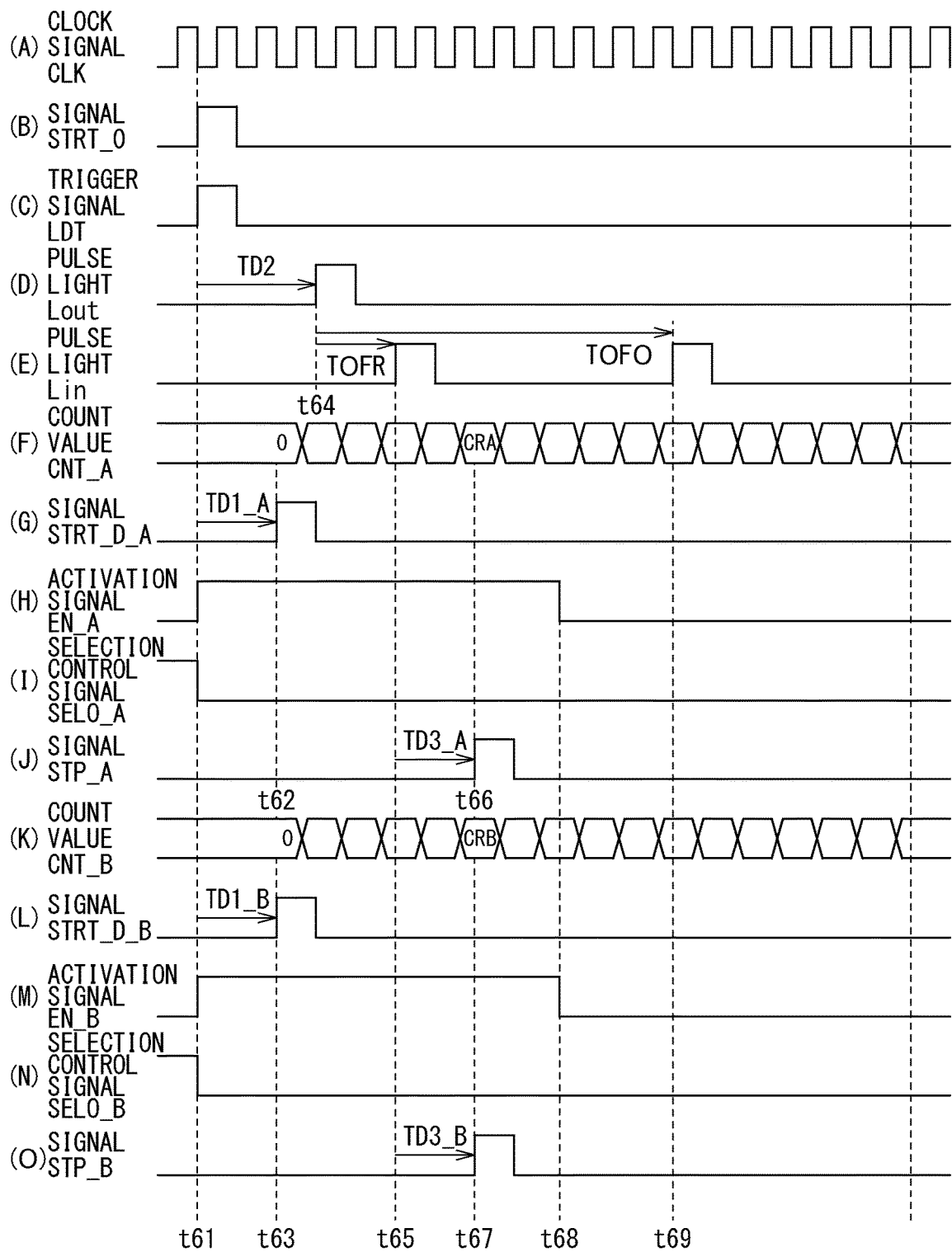

[FIG. 19]
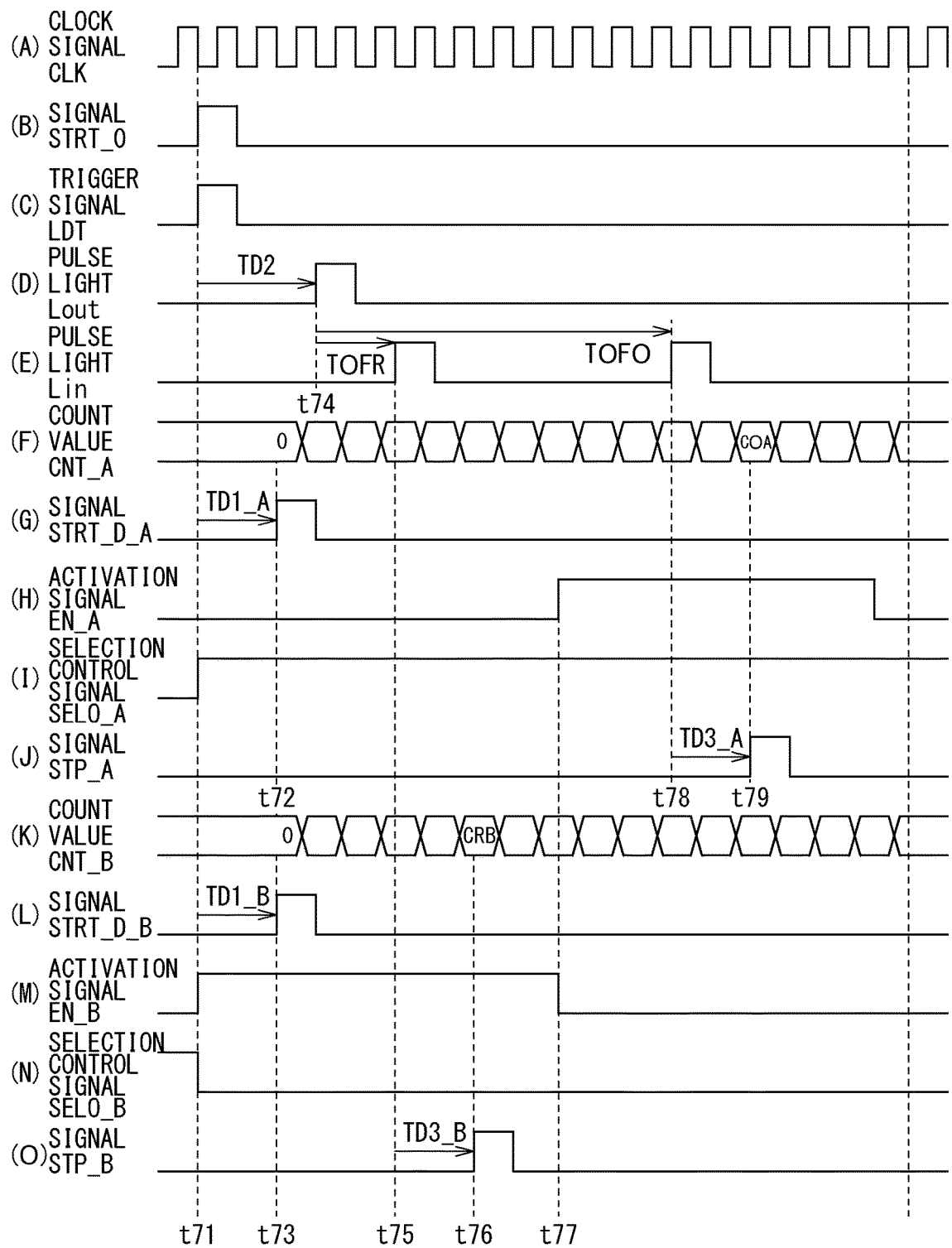

[FIG. 20]
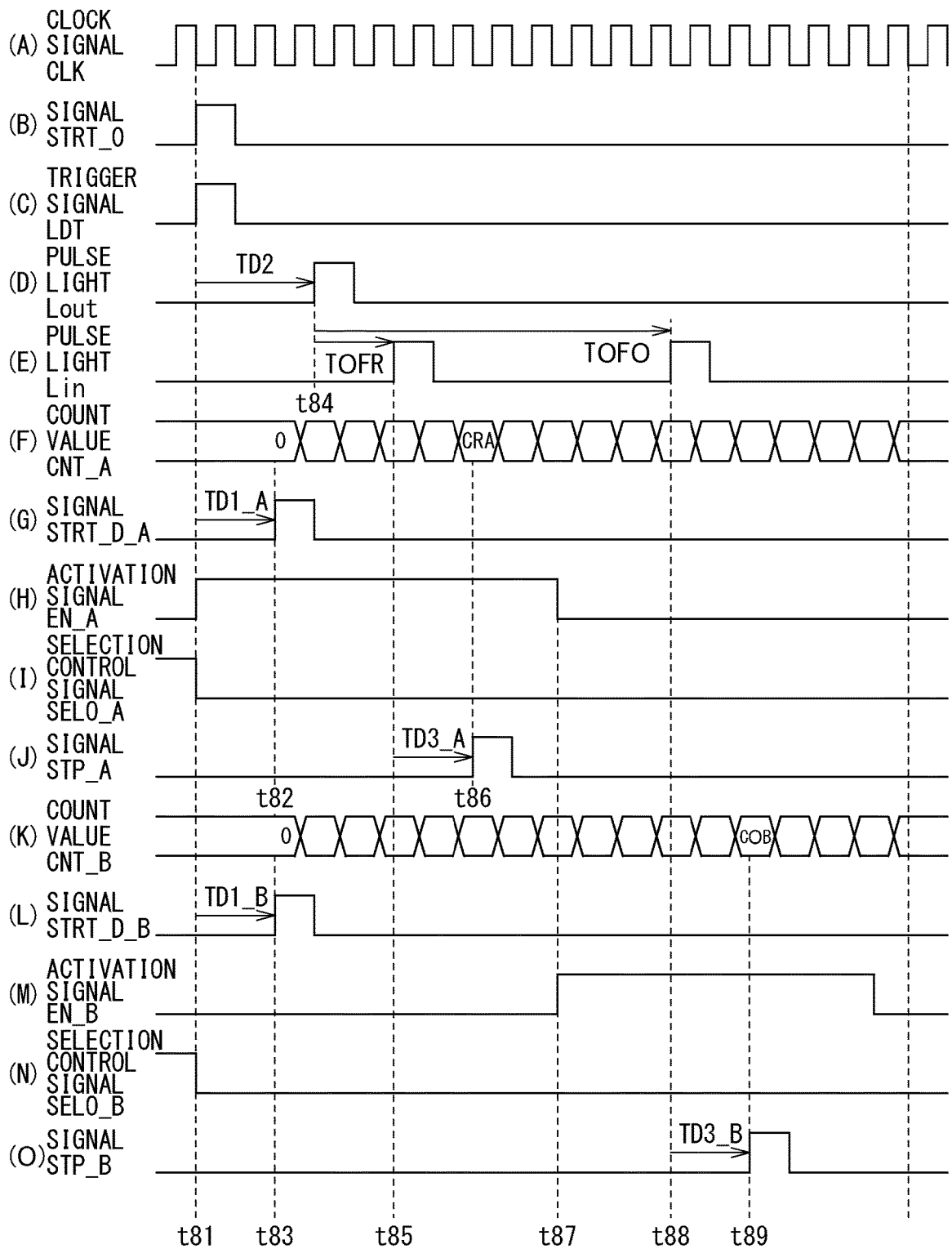

[FIG. 21]
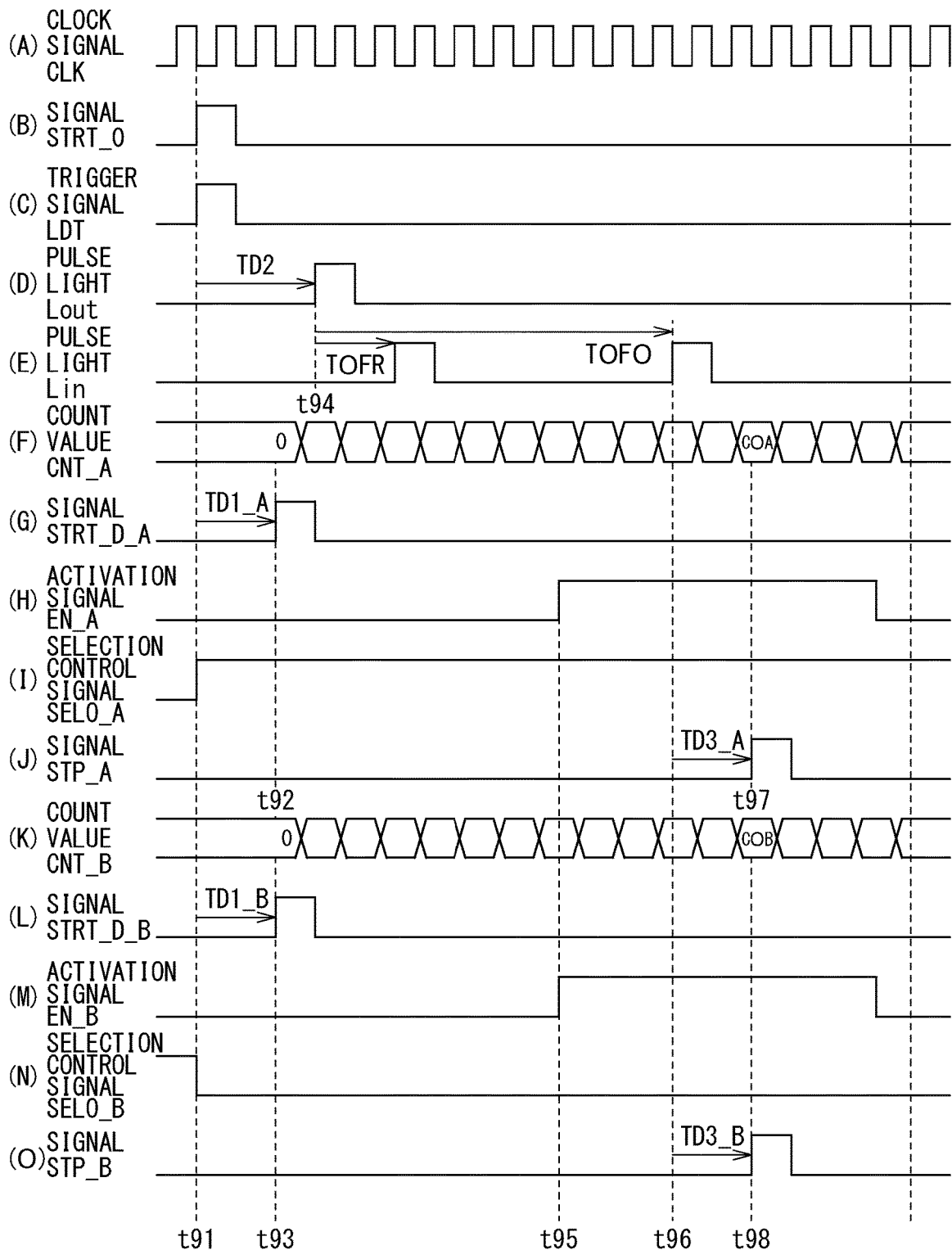

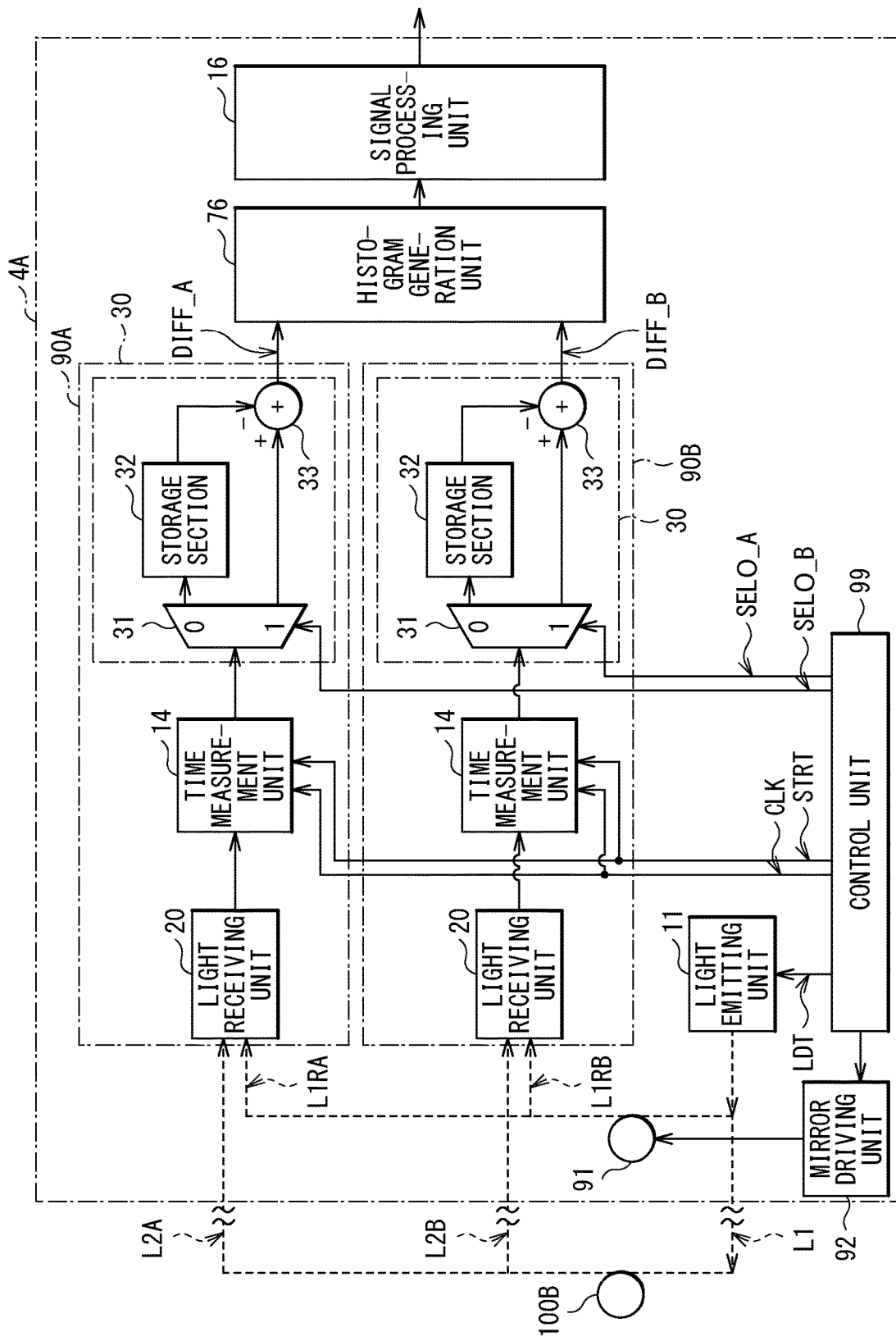
[FIG. 22]

[FIG. 23A]
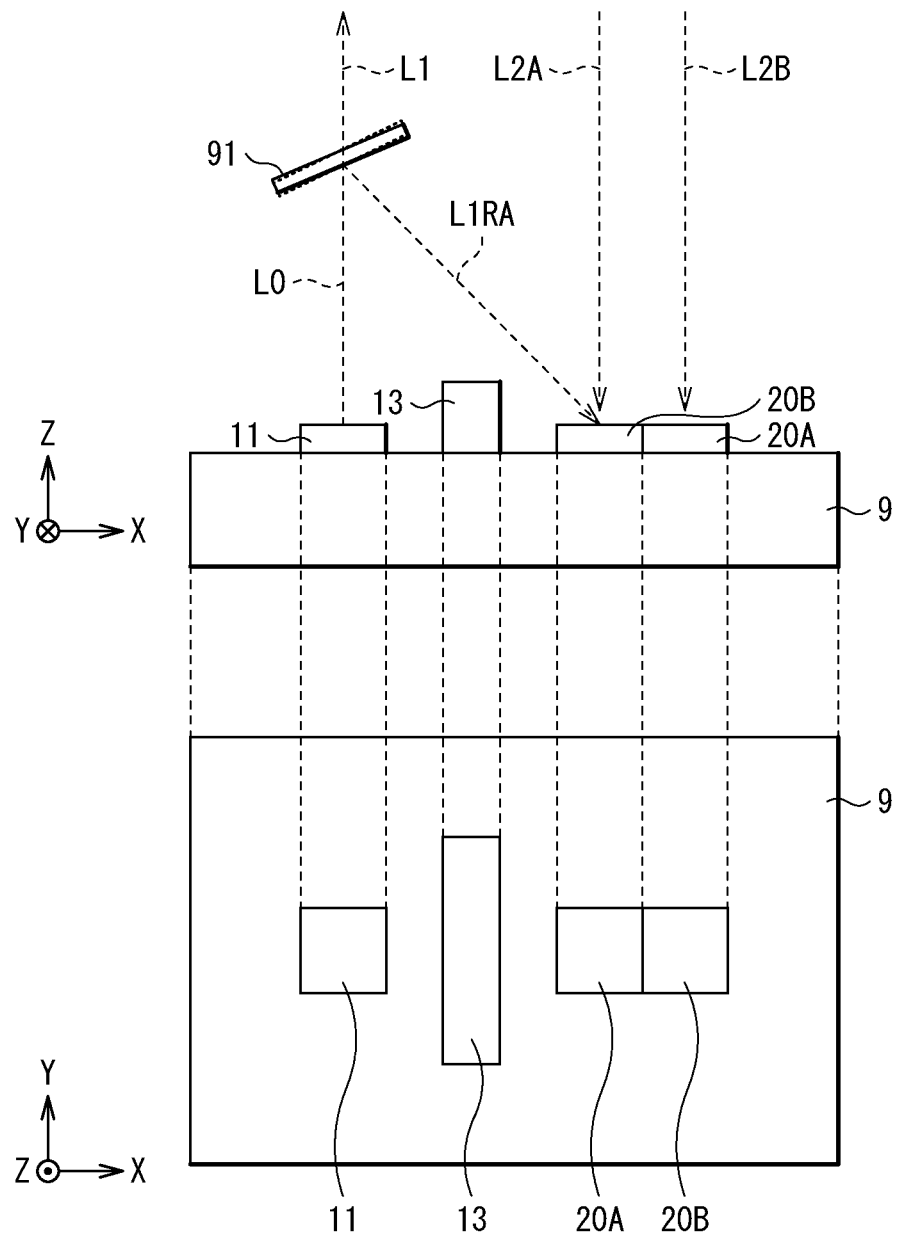

[FIG. 23B]
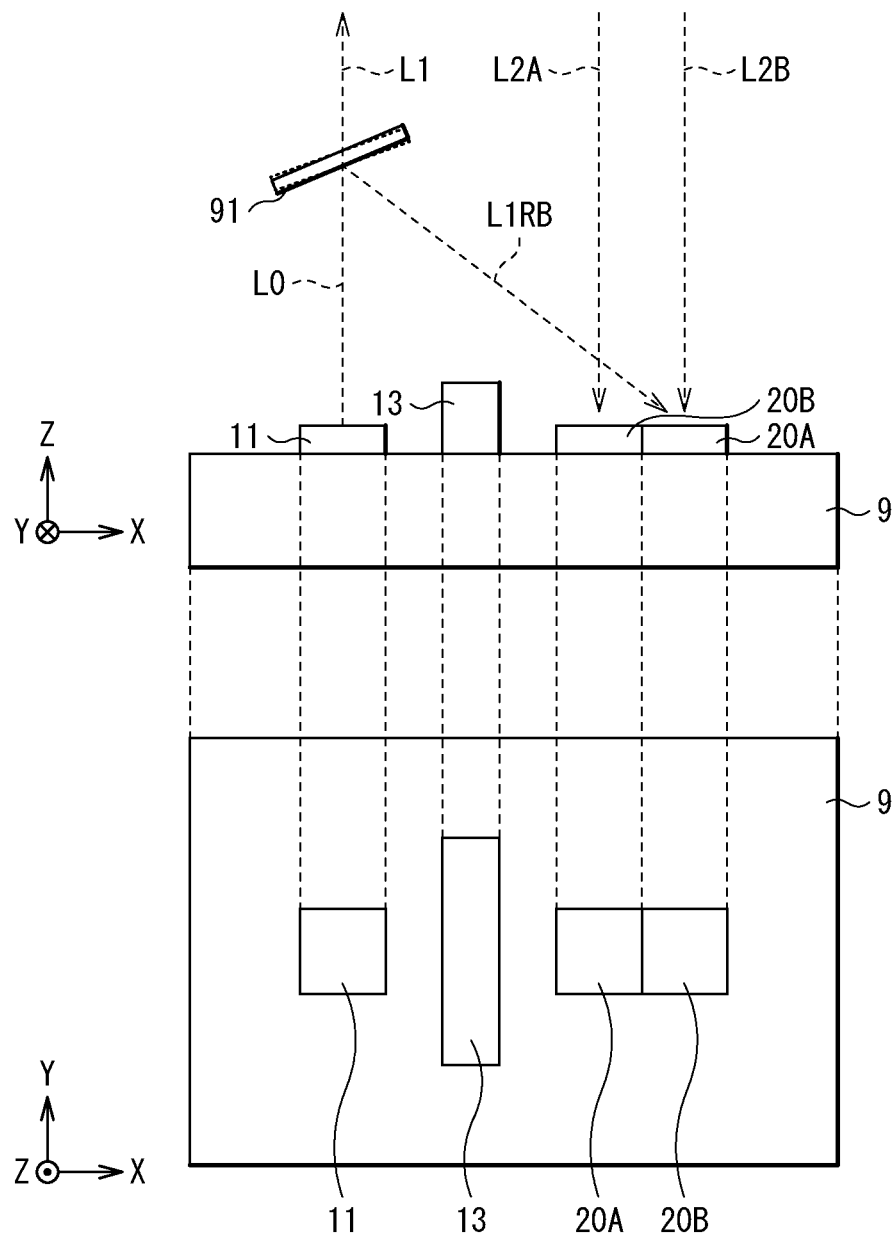

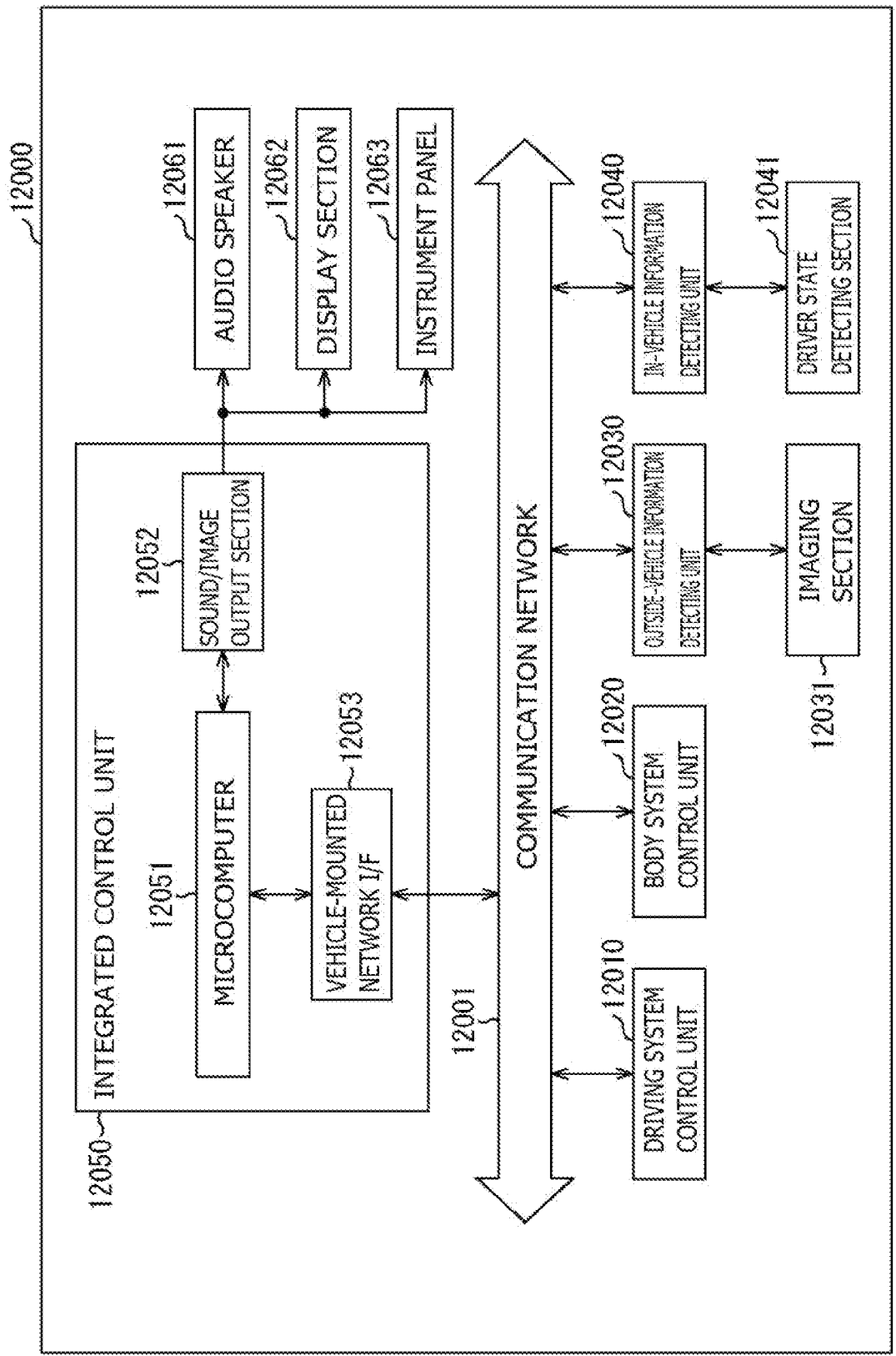
[FIG. 24]

[FIG. 25]
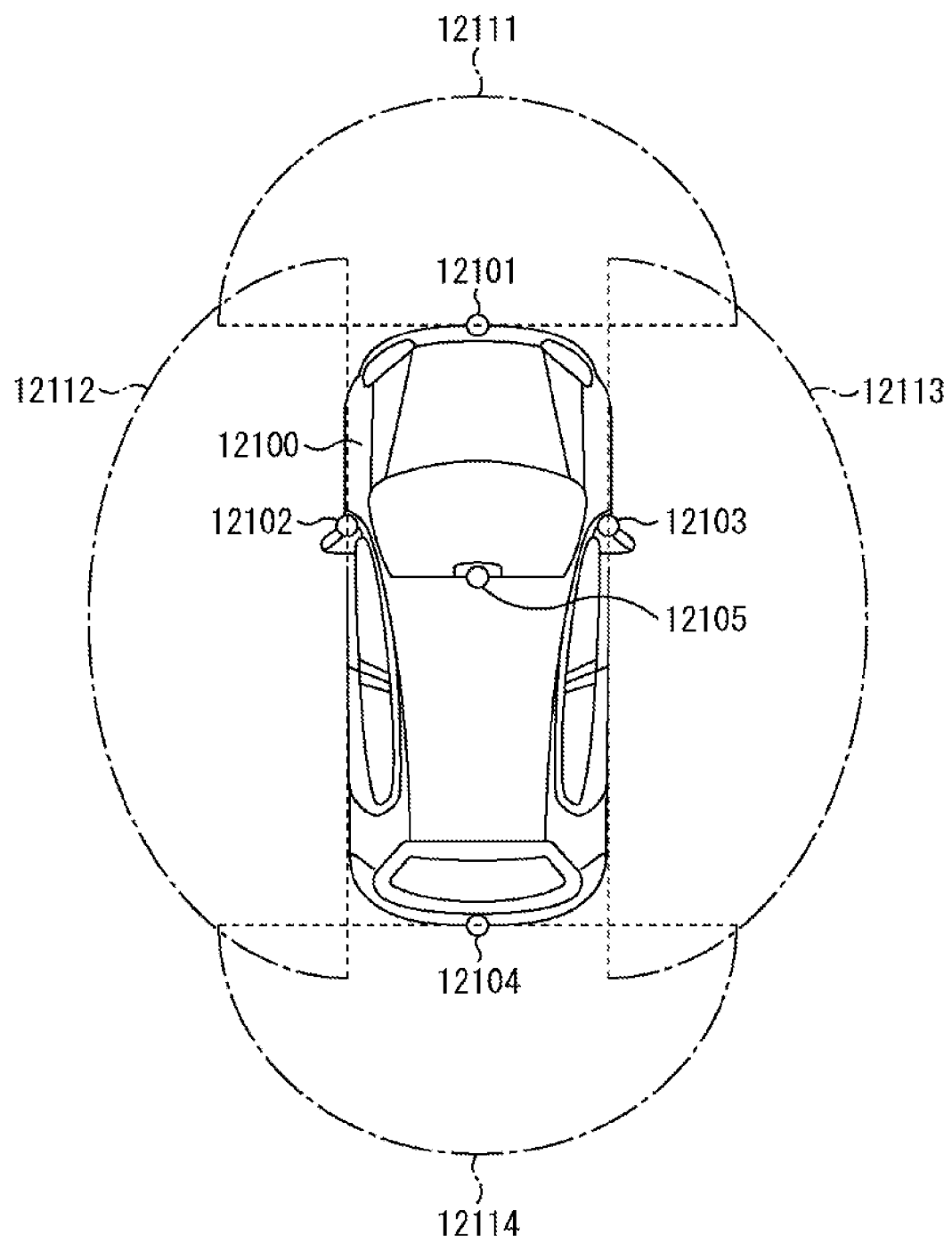

TIME MEASUREMENT DEVICE

CROSS REFERENCE TO RELATED APPLICATIONS

This application is a U.S. National Phase of International Patent Application No. PCT/JP2019/039982 filed on Oct. 10, 2019, which claims priority benefit of Japanese Patent Application No. JP 2018-224545 filed in the Japan Patent Office on Nov. 30, 2018. Each of the above-referenced applications is hereby incorporated herein by reference in its entirety.

TECHNICAL FIELD

The present disclosure relates to a time measurement device that measures the time from a timing at which light is outputted to a timing at which the light is detected.

BACKGROUND ART

In measuring the distance to a measurement target object, a TOF (Time Of Flight) method is often used. In this TOF method, light is outputted and reflected light reflected by a measurement target object is detected. The TOF method then measures a time difference between a timing at which the light is outputted and a timing at which the reflected light is detected, thereby measuring the distance to the measurement target object (e.g., PTL 1).

CITATION LIST

Patent Literature

PTL 1: Japanese Unexamined Patent Application Publication No. 2016-211881

SUMMARY OF THE INVENTION

Incidentally, it is desired that the time measurement device have high time measurement accuracy. Higher accuracy is expected.

It is desirable to provide a time measurement device that makes it possible to increase the time measurement accuracy.

A time measurement device according to an embodiment of the present disclosure includes: a first light receiving unit; a first timing detection unit; a first calculation unit; and a histogram generation unit. The first light receiving unit is configured to be able to detect first pulse light and second pulse light. The first pulse light corresponds to emission pulse light emitted from a light emitting unit. The second pulse light includes reflected light by a target object. The reflected light by the target object corresponds to the emission pulse light. The first timing detection unit is configured to be able to detect a first light receiving timing of the first pulse light and a second light receiving timing of the second pulse light by the first light receiving unit on the basis of an output signal of the first light receiving unit. The first calculation unit is configured to be able to calculate a first time value by performing a subtraction process on the basis of the first light receiving timing and the second light receiving timing. The histogram generation unit is configured to be able to generate a histogram on the basis of the first time value.

In the time measurement device according to the embodiment of the present disclosure, the first light receiving unit detects the first pulse light corresponding to the emission pulse light emitted from the light emitting unit and detects the second pulse light that includes the reflected light by the target object. The reflected light by the target object corresponds to the emission pulse light. The subtraction process is performed on the basis of the first light receiving timing of the first pulse light and the second light receiving timing of the second pulse light, thereby calculating the first time value. The histogram is then generated on the basis of this first time value.

BRIEF DESCRIPTION OF DRAWING

FIG. 1 is a block diagram illustrating a configuration example of a time measurement device according to a first embodiment of the present disclosure.

FIG. 2 is an explanatory diagram illustrating a configuration example of a reference reflector illustrated in FIG. 1.

FIG. 3 is a circuit diagram illustrating a configuration example of a light receiving unit illustrated in FIG. 1.

FIG. 4 is an explanatory diagram illustrating an example of a histogram that is generated by a histogram generation unit illustrated in FIG. 1.

FIG. 5 is a timing waveform chart illustrating an operation example of the time measurement device illustrated in FIG. 1.

FIG. 6 is a block diagram illustrating a configuration example of a time measurement device according to a modification example of the first embodiment.

FIG. 7A is a timing waveform chart illustrating an operation example of the time measurement device illustrated in FIG. 6.

FIG. 7B is another timing waveform chart illustrating the operation example of the time measurement device illustrated in FIG. 6.

FIG. 8 is a block diagram illustrating a configuration example of a time measurement device according to another modification example of the first embodiment.

FIG. 9 is a block diagram illustrating a configuration example of a time measurement device according to another modification example of the first embodiment.

FIG. 10 is an explanatory diagram illustrating the configuration example of the time measurement device illustrated in FIG. 9.

FIG. 11 is a block diagram illustrating a configuration example of a time measurement device according to a second embodiment.

FIG. 12A is a timing waveform chart illustrating an operation example of the time measurement device illustrated in FIG. 11.

FIG. 12B is another timing waveform chart illustrating the operation example of the time measurement device illustrated in FIG. 11.

FIG. 13 is a block diagram illustrating a configuration example of a time measurement device according to a third embodiment.

FIG. 14 is a timing waveform chart illustrating an operation example of the time measurement device illustrated in FIG. 13.

FIG. 15 is a block diagram illustrating a configuration example of a time measurement device according to a fourth embodiment.

FIG. 16 is a circuit diagram illustrating a configuration example of a light receiving unit illustrated in FIG. 15.

FIGS. 17A, 17B, and 17C are explanatory diagrams illustrating an operation example of the time measurement device illustrated in FIG. 15.

FIG. 18 is a timing waveform chart illustrating the operation example of the time measurement device illustrated in FIG. 15.

FIG. 19 is another timing waveform chart illustrating the operation example of the time measurement device illustrated in FIG. 15.

FIG. 20 is another timing waveform chart illustrating the operation example of the time measurement device illustrated in FIG. 15.

FIG. 21 is another timing waveform chart illustrating the operation example of the time measurement device illustrated in FIG. 15.

FIG. 22 is a block diagram illustrating a configuration example of a time measurement device according to a modification example of the fourth embodiment.

FIG. 23A is an explanatory diagram illustrating an operation example of the time measurement device illustrated in FIG. 22.

FIG. 23B is another explanatory diagram illustrating the operation example of the time measurement device illustrated in FIG. 22.

FIG. 24 is a block diagram depicting an example of schematic configuration of a vehicle control system.

FIG. 25 is a diagram of assistance in explaining an example of installation positions of an outside-vehicle information detecting section and an imaging section.

MODES FOR CARRYING OUT THE INVENTION

The following describes embodiments of the present disclosure in detail with reference to the drawings. It is to be noted that description is given in the following order.

1. First Embodiment
2. Second Embodiment
3. Third Embodiment
4. Fourth Embodiment
5. Example of Application to Mobile Body 1. First Embodiment Configuration Example FIG. 1 illustrates a configuration example of a time measurement device (time measurement device 1) according to a first embodiment. The time measurement device 1 is configured to output light and detect reflected light reflected by a measurement target object 100 to measure a time difference between a timing at which the light is outputted and a timing at which the reflected light is detected. The time measurement device 1 includes a light emitting unit 11, a reference reflector 12, a light receiving unit 20, a time measurement unit 14, a calculation unit 30, a histogram generation unit 15, a signal processing unit 16, and a control unit 19.

The light emitting unit 11 is configured to output pulse light (emission pulse light L0) on the basis of a trigger signal LDT supplied from the control unit 19. The pulse light (emission pulse light L0) has a pulse width PW. The light emitting unit 11 includes, for example, a pulse laser light source that outputs infrared light.

The reference reflector 12 is disposed at a predetermined position in the time measurement device 1. The reference reflector 12 is configured to reflect a portion of light emitted from the light emitting unit 11 and guide the reflected light to the light receiving unit 20.

FIG. 2 illustrates a configuration example of the reference reflector 12. The time measurement device 1 includes a support substrate 9 and a light shielding object 13. The light emitting unit 11, the light shielding object 13, and the light receiving unit 20 are disposed in this order in the same plane on the surface of the support substrate 9 in this example. This prevents the light receiving unit 20 in the time measurement device 1 from directly detecting light emitted from the light emitting unit 11.

In this example, the reference reflector 12 is a half mirror 12A. The half mirror 12A is disposed apart from the light emitting unit 11 on the optical path of light emitted from the light emitting unit 11. The half mirror 12A reflects a portion of the emission pulse light L0 emitted from the light emitting unit 11 to the light receiving unit 20 and transmits the remainder. The light reflected by the half mirror 12A travels to the light receiving unit 20 as reference pulse light L1R. In this example, the half mirror 12A is disposed at a predetermined position. Light traveling from the light emitting unit 11 to the light receiving unit 20 via this half mirror 12A therefore has a known optical path length (reference optical path length LEN). Pulse light flying from the light emitting unit 11 to the light receiving unit 20 via the half mirror 12A thus also has a known time (time TOFR of flight). In addition, light passing through the half mirror 12A travels to the measurement target object 100 as pulse light L1. Light reflected by the measurement target object 100 then travels to the light receiving unit 20 as reflected pulse light L2.

The light receiving unit 20 (FIG. 1) is configured to detect the reference pulse light L1R and the reflected pulse light L2. The reference pulse light L1R is reflected light by the reference reflector 12. The reflected light by the reference reflector 12 corresponds to the emission pulse light L0. The reflected pulse light L2 is reflected light by the measurement target object 100. The reflected light by the measurement target object 100 corresponds to the emission pulse light L0.

FIG. 3 illustrates a configuration example of the light receiving unit 20. The light receiving unit 20 includes a light receiving element 21, a resistor element 22, and an inverter 23.

The light receiving element 21 is a photoelectric conversion element that detects light. The light receiving element 21 includes, for example, a single-photon avalanche diode (SPAD). The light receiving element 21 has the anode supplied with a voltage Vand and the cathode coupled to the resistor element 22 and the inverter 23. It is to be noted that this is not limitative, but a light receiving element other than a single-photon avalanche diode may be used.

One end of the resistor element 22 is supplied with a voltage VDDH and the other end is coupled to the cathode of the light receiving element 21 and the inverter 23.

The input terminal of the inverter 23 is coupled to the cathode of the light receiving element 21 and the other end of the resistor element 22. The inverter 23 then generates a signal STP.

In the light receiving element 21, electron/hole pairs are formed on the basis of incident light and avalanche breakdown occurs. This temporarily lowers the voltage (cathode voltage) of the cathode of the light receiving element 21 from the voltage VDDH to a voltage near a voltage VAND. Then, once the avalanche breakdown ends in the light receiving element 21, the cathode of the light receiving element 21 is charged by using currents flowing through the resistor element 22. The cathode voltage returns to the voltage VDDH. The inverter 23 generates the signal STP on the basis of such a cathode voltage. The signal STP is a pulse signal.

The time measurement unit 14 is TDC (Time to Digital Converter). The time measurement unit 14 is configured to begin to count clock pulses included in a clock signal CLK supplied from the control unit 19 on the basis of a signal STRT (signal STRT_D) supplied from the control unit 19 and output a count value CNT on the basis of the signal STP. The count value CNT outputted from the time measurement unit 14 indicates a timing at which the light receiving element 21 detects pulse light. The signal STRT_0 is a signal of the output terminal of the control unit 19 and the signal STRT_D is a signal of the input terminal of the time measurement unit 14. In other words, the signal STRT_D is a signal having a delay from the signal STRT_0. The delay corresponds to the signal path from the control unit 19 to the time measurement unit 14.

The calculation unit 30 is configured to calculate a difference value DIFF on the basis of the count value CNT supplied from the time measurement unit 14. This difference value DIFF is a value corresponding to a time TOFO of flight for pulse light to fly from the light emitting unit 11 to the light receiving unit 20 via the measurement target object 100 as described below. The calculation unit 30 includes a demultiplexer 31, a storage section 32, and a subtraction section 33.

The demultiplexer 31 is configured to selectively supply the count value CNT to the storage section 32 or the subtraction section 33 on the basis of a selection control signal SELO supplied from the control unit 19. The count value CNT is supplied from the time measurement unit 14. Specifically, in a case where the selection control signal SELO is at the low level ("0"), the demultiplexer 31 supplies the count value CNT supplied from the time measurement unit 14 to the storage section 32. In a case where the selection control signal SELO is at the high level ("1"), the demultiplexer 31 supplies the count value CNT supplied from the time measurement unit 14 to the subtraction section 33.

The storage section 32 includes, for example, a register. The storage section 32 is configured to store the count value CNT supplied from the demultiplexer 31.

The subtraction section 33 is configured to calculate the difference value DIFF by subtracting the count value CNT supplied from the storage section 32 from the count value CNT supplied from the demultiplexer 31.

The histogram generation unit 15 is configured to generate a histogram HIST on the basis of the difference value DIFF supplied from the calculation unit 30. In other words, the time measurement device 1 repeats an operation for the light emitting unit 11 to output pulse light and an operation for the light receiving unit 20 to detect the reflected pulse light L2 and the reference pulse light L1R a plurality of times, thereby calculating the plurality of difference values DIFF. The histogram generation unit 15 generates the histogram HIST on the basis of the plurality of these difference values DIFF.

FIG. 4 illustrates an example of the histogram HIST. In FIG. 4, the horizontal axis indicates the difference value DIFF and the vertical axis indicates frequency. The histogram generation unit 15 generates the histogram HIST like this on the basis of the plurality of difference values DIFF supplied from the calculation unit 30. The histogram generation unit 15 then obtains the difference value DIFF having the highest frequency, for example, in this histogram HIST as a difference value DIFFpeak.

The signal processing unit 16 is configured to calculate the time TOFO of flight for pulse light to fly from the light emitting unit 11 to the light receiving unit 20 via the measurement target object 100 on the basis of the difference value DIFFpeak supplied from the histogram generation unit 15. It is to be noted that this is not limitative, but the signal processing unit 16 may obtain the round-trip distance between the time measurement device 1 and the measurement target object 100, for example, by further multiplying this time TOFO of flight by the velocity of light and calculate the distance between the time measurement device 1 and the measurement target object 100 by dividing the round-trip distance by "2".

The control unit 19 is configured to control an operation of the time measurement device 1. Specifically, the control unit 19 controls an operation of the time measurement device 1 by supplying the trigger signal LDT to the light emitting unit 11, supplying the clock signal CLK and the signal STRT to the time measurement unit 14, and supplying the selection control signal SELO to the demultiplexer 31.

This configuration allows the time measurement device 1 to suppress the influence of a variety of delays occurring in the time measurement device 1 as described below and increase the measurement accuracy of the time TOFO of flight for pulse light.

Here, the light emitting unit 11 corresponds to a specific example of a "light emitting unit" in the disclosure. The reference reflector 12 corresponds to a specific example of a "reference reflector" in the present disclosure. The light receiving unit 20 corresponds to a specific example of a "first light receiving unit" in the present disclosure. The emission pulse light L0 corresponds to a specific example of "emission pulse light" in the present disclosure. The reference pulse light L1R corresponds to a specific example of "first pulse light" in the present disclosure. The reflected pulse light L2 corresponds to a specific example of "second pulse light" in the present disclosure. The time measurement unit 14 corresponds to a specific example of a "first timing detection unit" in the present disclosure. The calculation unit 30 corresponds to a specific example of a "first calculation unit" in the present disclosure. The histogram generation unit 15 corresponds to a specific example of a "histogram generation unit" in the present disclosure. The difference value DIFF corresponds to a specific example of a "first time value" in the present disclosure.

Operations and Workings

Next, the operations and workings of the time measurement device 1 according to the present embodiment are described.

(Overview of Overall Operation)

First, with reference to FIG. 1, an overview of an overall operation of the time measurement device 1 is described. The control unit 19 supplies the light emitting unit 11 with the trigger signal LDT, supplies the time measurement unit 14 with the signal STRT and the clock signal CLK, and supplies the calculation unit 30 with the selection control signal SELO. The light emitting unit 11 outputs the emission pulse light L0 on the basis of the trigger signal LDT supplied from the control unit 19. The reference reflector 12 is disposed at a predetermined position in the time measurement device 1. The reference reflector 12 reflects a portion of light emitted from the light emitting unit 11 and guides the reflected light to the light receiving unit 20. The light receiving unit 20 detects the reference pulse light L1R and the reflected pulse light L2. The reference pulse light L1R is reflected light by the reference reflector 12. The reflected light by the reference reflector 12 corresponds to the emission pulse light L0. The reflected pulse light L2 is reflected light by the measurement target object 100. The reflected light by the measurement target object 100 corresponds to the emission pulse light L0. The time measurement unit 14 begins to count clock pulses included in the clock signal CLK supplied from the control unit 19 on the basis of the signal STRT supplied from the control unit 19 and outputs the count value CNT on the basis of the signal STP. The calculation unit 30 calculates the difference value DIFF on the basis of the count value CNT supplied from the time measurement unit 14. The histogram generation unit 15 generates the histogram HIST on the basis of the difference value DIFF and obtains the difference value DIFF having the highest frequency, for example, in this histogram HIST as the difference value DIFFpeak. The signal processing unit 16 calculates the time TOFO of flight for pulse light on the basis of the difference value DIFFpeak supplied from the histogram generation unit 15.

(Detailed Operation)

The time measurement device 1 may have a variety of delays. Examples of these delays include a signal delay of the signal STRT from the control unit 19 to the time measurement unit 14, a signal delay of the trigger signal LDT from the control unit 19 to the light emitting unit 11, an internal delay in the light emitting unit 11, an internal delay in the light receiving unit 20, a signal delay from the light receiving unit 20 to the time measurement unit 14, and the like. The time measurement device 1 is able to suppress the influence of these delays occurring in the time measurement device 1 and increase the measurement accuracy of the time TOFO of flight for pulse light. The following describes an operation of the time measurement device 1 in detail.

FIG. 5 illustrates an operation example of the time measurement device 1. (A) illustrates the waveform of the clock signal CLK. (B) illustrates the count value CNT of the time measurement unit 14. (C) illustrates the waveform of the signal STRT (signal STRT_0) of the output terminal of the control unit 19. (D) illustrates the waveform of the signal STRT (signal STRT_D) of the input terminal of the time measurement unit 14. (E) illustrates the waveform of the trigger signal LDT of the output terminal of the control unit 19. (F) illustrates the waveform of pulse light Lout on a light emitting surface S11 of the light emitting unit 11. (G) illustrates the waveform of pulse light Lin on a light receiving surface S20 of the light receiving unit 20. (H) illustrates the waveform of the signal STP of the input terminal of the time measurement unit 14. (I) illustrates the waveform of the selection control signal SELO.

The time measurement device 1 first detects the reference pulse light L1R in a period PR. The reference pulse light L1R is reflected light by the reference reflector 12. Next, the time measurement device 1 detects the reflected pulse light L2 in a period PO subsequent to the period PR. The reflected pulse light L2 is reflected light by the measurement target object 100. The time measurement device 1 then calculates the time TOFO of flight for pulse light to fly from the light emitting unit 11 to the light receiving unit 20 via the measurement target object 100 on the basis of a difference between the light receiving timing of the reference pulse light L1R and the light receiving timing of the reflected pulse light L2. The following describes this operation in detail.

First, the period PR begins at a timing t1. In this period PR, the control unit 19 sets the selection control signal SELO at the low level ((I) of FIG. 5).

At this timing t1, the control unit 19 then changes the trigger signal LDT from the low level to the high level. At the timing a predetermined time (pulse width PW) after the timing t1, the control unit 19 changes the trigger signal LDT from the high level to the low level ((E) of FIG. 5). This causes the light emitting unit 11 to emit light at a timing t3 that is delayed from the timing t1 by a time TD2 and causes the light emitting unit 11 to extinguish light at the timing a predetermined time (pulse width PW) after the timing t3, thereby outputting the pulse light Lout (emission pulse light L0) ((F) of FIG. 5). This time TD2 corresponds to the total time of the time of a signal delay of the trigger signal LDT from the control unit 19 to the light emitting unit 11 and the time of an internal delay in the light emitting unit 11.

In addition, at the timing t1, the control unit 19 changes the signal STRT (signal STRT_0) from the low level to the high level. At the timing a predetermined time after the timing t1, the control unit 19 changes the signal STRT (signal STRT_0) from the high level to the low level ((C) of FIG. 5). The signal STRT (signal STRT_D) of the input terminal of the time measurement unit 14 is changed from the low level to the high level at a timing t2 delayed from the timing t1 by a time TD1 ((D) of FIG. 5). This time TD1 corresponds to the time of a signal delay of the signal STRT from the control unit 19 to the time measurement unit 14 as described above. The time measurement unit 14 then begins to count the clock pulses included in the clock signal CLK on the basis of this signal STRT (signal STRT_D) ((A) and (B) of FIG. 5). This causes the count value CNT of the time measurement unit 14 to begin to increase ((B) of FIG. 5).

At a timing t4 delayed from the timing t3 by the time TOFR of flight, the light receiving unit 20 then detects the reference pulse light L1R that is reflected light by the reference reflector 12 ((G) of FIG. 5). This time TOFR of flight is a time for pulse light to fly from the light emitting unit 11 to the light receiving unit 20 via the reference reflector 12. As illustrated in FIG. 2, light traveling from the light emitting unit 11 to the light receiving unit 20 via the reference reflector 12 has the known reference optical path length LEN. This time TOFR of flight is thus known. At a timing t5 delayed from this timing t4 by a time TD3, the signal STP of the input terminal of the time measurement unit 14 is then changed from the low level to the high level ((H) of FIG. 5). This time TD3 corresponds to the total time of the time of an internal delay in the light receiving unit 20 and the time of a signal delay from the light receiving unit 20 to the time measurement unit 14. The time measurement unit 14 then outputs the count value CNT (value CR) on the basis of this signal STP. As illustrated in (I) of FIG. 5, the selection control signal SELO is at the low level ("0"). This causes the demultiplexer 31 of the calculation unit 30 to supply this count value CNT (value CR) to the storage section 32. The storage section 32 then stores this count value CNT (value CR).

At a timing t6, the period PR then ends and the period PO begins. The control unit 19 changes the selection control signal SELO from the low level to the high level at this timing t6 ((I) of FIG. 5).

Next, at a timing t7 delayed from the timing t3 by the time TOFO of flight, the light receiving unit 20 detects the reflected pulse light L2 that is reflected light by the measurement target object 100 ((G) of FIG. 5). This time TOFO of flight is a time for pulse light to fly from the light emitting unit 11 to the light receiving unit 20 via the measurement target object 100. At a timing t8 delayed from this timing t7 by the time TD3, the signal STP of the input terminal of the time measurement unit 14 is then changed from the low level to the high level ((H) of FIG. 5). The time measurement unit 14 outputs the count value CNT (value CO) on the basis of this signal STP. As illustrated in (I) of FIG. 5, the selection control signal SELO is at the high level ("1"). This causes the demultiplexer 31 of the calculation unit 30 to supply this count value CNT (value CO) to the subtraction section 33. The subtraction section 33 then calculates the difference value DIFF by subtracting the count value CNT (value CR) supplied from the storage section 32 from the count value CNT (value CO) supplied from the demultiplexer 31.

The period PO then ends at a timing t9.

The value CR of the count value CNT is a count value obtained by the time measurement unit 14. It is thus possible to convert this value CR into a time TR by multiplying the value CR by the time corresponding to one cycle of the clock signal CLK. It is possible to express this time TR with the following expression as illustrated in FIG. 5.

$$TR=TOFR+TD2+TD3-TD1 \quad (EQ1)$$

It is possible to similarly convert the value CO of the count value CNT to a time TO. It is possible to express this time TO with the following expression as illustrated in FIG. 5.

$$TO=TOFO+TD2+TD3-TD1 \quad (EQ2)$$

It is thus possible to express a time TDIFF corresponding to the difference value DIFF with the following expression.

$$TDIFF=TO-TR=TOFO-TOFR \quad (EQ3)$$

In this expression (3), the time TOFR of flight is known. This allows the time measurement device 1 to obtain the time TOFO of flight on the basis of this difference value DIFF.

The histogram generation unit 15 generates the histogram HIST as illustrated in FIG. 4 on the basis of the difference value DIFF supplied from the calculation unit 30. The histogram generation unit 15 then obtains the difference value DIFF having the highest frequency, for example, in this histogram HIST as the difference value DIFFpeak. The signal processing unit 16 is able to calculate the time TOFO of flight, for example, by multiplying this difference value DIFFpeak by the time corresponding to one cycle of the clock signal CLK to calculate the time TDIFF and adding the known time TOFR of flight to this time TDIFF.

In this way, the time measurement device 1 is provided with the reference reflector 12. The light receiving unit 20 detects both the reference pulse light L1R that is reflected light by this reference reflector 12 and the reflected pulse light L2 that is reflected light by the measurement target object 100. The time measurement device 1 then obtains a difference between the light receiving timing of the reference pulse light L1R and the light receiving timing of the reflected pulse light L2. This allows the influence a variety of delays occurring in the time measurement device 1 to cancel each other in the time measurement device 1. It is thus possible to increase the measurement accuracy of the time TOFO of flight for pulse light.

In addition, in the time measurement device 1, the light emitting unit 11 outputs one piece of emission pulse light LO and the light receiving unit 20 detects two pieces of pulse light (the reference pulse light L1R and the reflected pulse light L2) corresponding to this one emission pulse light LO. This causes the light emitting unit 11 to output, for example, two pieces of emission pulse light (the first emission pulse light and the second emission pulse light) and causes the light receiving unit 20 to detect the reference pulse light L1R corresponding to the first emission pulse light. It is also possible to decrease the number of times the emission pulse light L0 is outputted as compared with a case where the reflected pulse light L2 corresponding the second emission pulse light is detected. As a result, it is possible for the time measurement device 1 to effectively reduce the power consumption.

Effects

As described above, in the present embodiment, the reference reflector is provided. The light receiving unit detects both the reference pulse light that is reflected light by this reference reflector and the reflected pulse light that is reflected light by the measurement target object. It is thus possible to increase the measurement accuracy of the time TOFO of flight for pulse light.

In the present embodiment, the light emitting unit outputs one piece of pulse light and the light receiving unit detects two pieces of pulse light corresponding to this one pieces of pulse light. This makes it possible to reduce the power consumption.

Modification Example 1-1

In the embodiment described above, the reference pulse light L1R is detected in the period PR and the reflected pulse light L2 is detected in the period PO subsequent to the period PR, but this is not limitative. Instead, for example, the reflected pulse light L2 may be detected in the period PO and the reference pulse light L1R may be detected in the period PR subsequent to the period PO. The following describes a time measurement device 1A according to the present modification example in detail.

FIG. 6 illustrates a configuration example of the time measurement device 1A. The time measurement device 1A includes a calculation unit 30A and a control unit 19A. The calculation unit 30A includes a storage section 34A. The storage section 34A is configured to store the count value CNT supplied from the demultiplexer 31. This configuration causes the demultiplexer 31 to supply the count value CNT supplied from the time measurement unit 14 to the subtraction section 33 in a case where the selection control signal SELO is at "0". This configuration causes the demultiplexer 31 to supply the count value CNT supplied from the time measurement unit 14 to the storage section 34A in a case where the selection control signal SELO is at "1". The subtraction section 33 then calculates the difference value DIFF by subtracting the count value CNT supplied from the demultiplexer 31 from the count value CNT supplied from the storage section 34A. The control unit 19A is configured to control an operation of the time measurement device 1A.

Each of FIGS. 7A and 7B illustrates an operation example of the time measurement device 1A. The time measurement device 1A first detects the reflected pulse light L2 in the period PO as illustrated in FIG. 7A. The reflected pulse light L2 is reflected light by the measurement target object 100. Next, the time measurement device 1A detects the reference pulse light L1R in the period PR subsequent to the period PO as illustrated in FIG. 7B. The reference pulse light L1R is reflected light by the reference reflector 12. The time measurement device 1A then calculates the time TOFO of flight for pulse light on the basis of a difference between the light receiving timing of the reference pulse light L1R and the light receiving timing of the reflected pulse light L2. The following describes this operation in detail. The following describes this operation in detail.

First, the period PO begins at a timing t11. In this period PO, the control unit 19A sets the selection control signal SELO at the high level ((I) of FIG. 7A).

At this timing t1*l*, the control unit 19A then changes the trigger signal LDT from the low level to the high level. At the timing a predetermined time (pulse width PW) after the timing t11, the control unit 19A changes the trigger signal LDT from the high level to the low level ((E) of FIG. 7A). This causes the light emitting unit 11 to emit light at a timing t13 that is delayed from the timing t1 by the time TD2 and causes the light emitting unit 11 to extinguish light at the timing a predetermined time (pulse width PW) after the timing t13, thereby outputting the pulse light Lout (emission pulse light L0) ((F) of FIG. 7A).

In addition, the control unit 19A changes the signal STRT (signal STRT_0) from the low level to the high level at the timing t1*l* ((C) of FIG. 7A). The signal STRT (signal STRT_D) of the input terminal of the time measurement unit 14 is changed from the low level to the high level at a timing t12 delayed from the timing t11 by the time TD1 ((D) of FIG. 7A). The time measurement unit 14 then begins to count the clock pulses included in the clock signal CLK on the basis of this signal STRT (signal STRT_D) ((A) and (B) of FIG. 7A).

Next, at a timing t14 delayed from the timing t13 by the time TOFO of flight, the light receiving unit 20 detects the reflected pulse light L2 that is reflected light by the measurement target object 100 ((G) of FIG. 7A). At a timing t15 delayed from this timing t14 by a time TD3, the signal STP of the input terminal of the time measurement unit 14 is then changed from the low level to the high level ((H) of FIG. 7A). The time measurement unit 14 outputs the count value CNT (value CO) on the basis of this signal STP. As illustrated in (I) of FIG. 7A, the selection control signal SELO is at the high level ("1") in the period PO. This causes the demultiplexer 31 of the calculation unit 30A to supply this count value CNT (value CO) to the storage section 34A. The storage section 34A then stores this count value CNT (value CO).

The period PO then ends at a timing t16.

Next, as illustrated in FIG. 7B, the period PR begins at a timing t21. In this period PR, the control unit 19A sets the selection control signal SELO at the low level ((I) of FIG. 7B).

At this timing t21, the control unit 19A then changes the trigger signal LDT from the low level to the high level. At the timing a predetermined time (pulse width PW) after the timing t21, the control unit 19A changes the trigger signal LDT from the high level to the low level ((E) of FIG. 7B). This causes the light emitting unit 11 to emit light at a timing t23 that is delayed from the timing t21 by the time TD2 and causes the light emitting unit 11 to extinguish light at the timing a predetermined time (pulse width PW) after the timing t23, thereby outputting the pulse light Lout (emission pulse light L0) ((F) of FIG. 7B).

In addition, the control unit 19A changes the signal STRT (signal STRT_0) from the low level to the high level at the timing t21 ((C) of FIG. 7B). The signal STRT (signal STRT_D) of the input terminal of the time measurement unit 14 is changed from the low level to the high level at a timing t22 delayed from the timing t21 by the time TD1 ((D) of FIG. 7B). The time measurement unit 14 then begins to count the clock pulses included in the clock signal CLK on the basis of this signal STRT (signal STRT_D) ((A) and (B) of FIG. 7B).

At a timing t24 delayed from the timing t23 by the time TOFR of flight, the light receiving unit 20 then detects the reference pulse light L1R that is reflected light by the reference reflector 12 ((G) of FIG. 7B). At a timing t25 delayed from this timing t24 by the time TD3, the signal STP of the input terminal of the time measurement unit 14 is then changed from the low level to the high level ((H) of FIG. 7B). The time measurement unit 14 then outputs the count value CNT (value CR) on the basis of this signal STP. As illustrated in (I) of FIG. 7B, the selection control signal SELO is at the low level ("0") in the period PR. This causes the demultiplexer 31 of the calculation unit 30A to supply this count value CNT (value CR) to the subtraction section 33. The subtraction section 33 then calculates the difference value DIFF by subtracting the count value CNT (value CR) supplied from the demultiplexer 31 from the count value CNT (value CO) supplied from the storage section 32.

The period PR then ends at a timing t26. The histogram generation unit 15 and the signal processing unit 16 calculate the time TOFO of flight on the basis of this difference value DIFF as in the embodiment described above.

Modification Example 1-2

In the embodiment described above, the signal processing unit 16 calculates the time TOFO of flight, for example, by adding the known time TOFR of flight to the time TDIFF corresponding to the difference value DIFFpeak, but this is not limitative. Instead, for example, the calculation unit may add a count value CTOFR corresponding to the known time TOFR of flight to the difference value DIFF as with a time measurement device 1B illustrated in FIG. 8. This time measurement device 1B includes a calculation unit 30B and a control unit 19B.

The calculation unit 30B includes a subtraction section 33B. The subtraction section 33B is configured to calculate the difference value DIFF by subtracting the count value CNT supplied from the storage section 32 from the count value CNT supplied from the demultiplexer 31 and a result of the addition of the count value CTOFR corresponding to the known time TOFR of flight. In other words, this difference value DIFF is obtained by adding the count value CTOFR corresponding to the known time TOFR of flight to the difference value DIFF in the embodiment described above.

The histogram generation unit 15 generates the histogram HIST on the basis of the difference value DIFF supplied from the calculation unit 30B and obtains the difference value DIFF having the highest frequency, for example, in this histogram HIST as the difference value DIFFpeak. The multiplication of this difference value DIFFpeak by the time corresponding to one cycle of the clock signal CLK then allows the signal processing unit 16 to calculate the time TOFO of flight.

The control unit 19B is configured to control an operation of the time measurement device 1B. The control unit 19B supplies the count value CTOFR corresponding to the known time TOFR of flight to the subtraction section 33B. This count value CTOFR is a value obtained by dividing the known time TOFR of flight by the time corresponding to one cycle of the clock signal CLK.

Modification Example 1-3

In the embodiment described above, the time measurement device 1 includes the one light receiving unit 20, but this is not limitative. The time measurement device may include the two or more light receiving units 20. For example, in a case where the plurality of light receiving units 20 is disposed in a matrix, the time measurement device is able to generate, for example, a depth image. The following describes an example in detail in which the time measurement device includes the two light receiving units 20.

Each of FIGS. 9 and 10 illustrates a configuration example of a time measurement device 1C according to the present modification example. The time measurement device 1C includes circuits 10A and 10B, a signal processing unit 16C, and a control unit 19C.

Each of the circuits 10A and 10B includes the light receiving unit 20, the time measurement unit 14, the calculation unit 30, and the histogram generation unit 15. As illustrated in FIG. 10, the light emitting unit 11, the light shielding object 13, the light receiving unit 20 (light receiving unit 20A) of the circuit 10A, and the light receiving unit 20 (light receiving unit 20B) of the circuit 10B are disposed in this order in the X direction. The light receiving unit 20A and the light receiving unit 20B are provided side by side in the Y direction. The half mirror 12A reflects a portion of the emission pulse light L0 emitted from the light emitting unit 11 to each of the light receiving units 20A and 20B and transmits the remainder. The light reflected by the half mirror 12A travels to the light receiving unit 20A as reference pulse light L1RA and travels to the light receiving unit 20B as reference pulse light L1RB. In addition, light passing through the half mirror 12A travels to measurement target objects 100A and 100B as the pulse light L1. The measurement target object 100A and the measurement target object 100B may be different target objects or may be different portions of the same target object. The light reflected by the measurement target object 100A then travels to the light receiving unit 20A as reflected pulse light L2A and the light reflected by the measurement target object 100B travels to the light receiving unit 20B as reflected pulse light L2B.

The signal processing unit 16C is configured to calculate the time TOFO of flight (time TOFOA of flight) for pulse light to fly from the light emitting unit 11 to the light receiving unit 20A via the measurement target object 100A on the basis of the difference value DIFFpeak supplied from the histogram generation unit 15 of the circuit 10A and calculate the time TOFO of flight (time TOFOB of flight) for pulse light to fly from the light emitting unit 11 to the light receiving unit 20B via the measurement target object 100B on the basis of the difference value DIFFpeak supplied from the histogram generation unit 15 of the circuit 10B.

The control unit 19C is configured to control an operation of the time measurement device 1C. Specifically, the control unit 19C controls an operation of the time measurement device 1C by supplying the trigger signal LDT to the light emitting unit 11, supplying the clock signal CLK and the signal STRT to each of the time measurement units 14 of the circuits 10A and 10B, and supplying the selection control signal SELO to each of the demultiplexers 31 of the circuits 10A and 10B.

Other Modification Examples

In addition, two or more of these modification examples may be combined.

2. Second Embodiment

Next, a time measurement device 2 according to a second embodiment is described. The present embodiment has a different method of measuring the time TOFO of flight for pulse light from that of the first embodiment. It is to be noted that substantially the same components as those of the time measurement device 1 according to the first embodiment described above are denoted by the same signs and descriptions thereof are omitted as appropriate.

FIG. 11 illustrates a configuration example of the time measurement device 2. The time measurement device 2 includes a reflector 41, a shutter 42, a calculation unit 50, a storage unit 48, and a control unit 49.

The reflector 41 is configured to reflect pulse light reflected by the reference reflector 12 to the reference reflector 12. The light emitting unit 11, the reflector 41, and the light receiving unit 20 are disposed close to each other, for example, in the same plane. As illustrated in FIG. 11, this allows the light receiving unit 20 to detect two pieces of reference pulse light L11R and L12R. The reference pulse light L11R is pulse light that makes one round trip between the light emitting unit 11, the reflector 41, and the light receiving unit 20 and the reference reflector 12. The reference pulse light L12R is pulse light that makes two round trips between the light emitting unit 11, the reflector 41, and the light receiving unit 20 and the reference reflector 12. In other words, the time TOFR of flight (time TOFR2 of flight) for the reference pulse light L12R is twice as long as the time TOFR of flight (time TOFR1 of flight) for the reference pulse light L11R.

The shutter 42 is disposed on the optical path of the pieces of reference pulse light L11R and L12R. The shutter 42 is configured to be openable and closable on the basis of a selection control signal SELM. This causes the two pieces of reference pulse light L11R and L12R to enter the light receiving surface S20 of the light receiving unit 20 by opening the shutter 42 in the time measurement device 2. In addition, the closed shutter 42 blocks the optical path of the pieces of reference pulse light L11R and L12R in the time measurement device 2 and makes it possible to prevent the two pieces of reference pulse light L11R and L12R from entering the light receiving surface S20 of the light receiving unit 20.

The calculation unit 50 includes a demultiplexer 51, a double calculation section 52, a selector 53, a storage section 54, an SR latch 55, subtraction sections 56 and 57, and a selector 58.

The demultiplexer 51 is configured to selectively supply the count value CNT to the double calculation section 52 or each of the subtraction sections 56 and 57 on the basis of a selection control signal SELO supplied from the SR latch 55. The count value CNT is supplied from the time measurement unit 14. Specifically, in a case where the selection control signal SELO is at the low level ("0"), the demultiplexer 51 supplies the count value CNT supplied from the time measurement unit 14 to the double calculation section 52. In a case where the selection control signal SELO is at the high level ("1"), the demultiplexer 51 supplies the count value CNT supplied from the time measurement unit 14 to each of the subtraction sections 56 and 57.

The double calculation section 52 is configured to double the count value CNT supplied from the demultiplexer 51 and output the doubled count value CNT.

The selector 53 is configured to select one of a value supplied from the storage unit 48 and a value supplied from the double calculation section 52 on the basis of the selection control signal SELM and output the selected value. Specifically, in a case where the selection control signal SELM is at the high level ("1"), the selector 53 selects the value supplied from the double calculation section 52. In a case where the selection control signal SELM is at the low level ("0"), the selector 53 selects the value supplied from the storage unit 48.

The storage section 54 includes, for example, a register. The storage section 54 is configured to store a value supplied from the selector 53. In addition, the storage section 54 has even a function of setting a control signal SET_SEL at the high level ("1") in a case where the storage section 54 stores the value supplied from the selector 53.

The SR latch 55 is configured to generate the selection control signal SELO on the basis of the control signals SET_SEL and RES_SEL. A terminal S of the SR latch 55 is supplied with the control signal SET_SEL and a terminal R is supplied with the control signal RES_SEL. The SR latch 55 sets the selection control signal SELO at the high level ("1") in a case where the control signal SET_SEL is set at the high level ("1"). The SR latch 55 sets the selection control signal SELO at the low level ("0") in a case where the control signal RES_SEL is set at the high level ("1").

The subtraction section 56 is configured to subtract a value supplied from the storage section 54 from the count value CNT supplied from the demultiplexer 51. The subtraction section 57 is configured to subtract the count value CNT supplied from the demultiplexer 51 from the value supplied from the storage section 54.

The selector 58 is configured to select one of a value supplied from the subtraction section 56 and a value supplied from the subtraction section 57 on the basis of the selection control signal SELM and output the selected value. Specifically, in a case where the selection control signal SELM is at the low level ("0"), the selector 58 selects the value supplied from the subtraction section 56. In a case where the selection control signal SELM is at the high level ("1"), the selector 58 selects the value supplied from the subtraction section 57.

The storage unit 48 includes, for example, a register. The storage unit 48 is configured to store a value supplied from the selector 58 of the calculation unit 50. The storage unit 48 then supplies the stored value to the selector 53 and the histogram generation unit 15.

The control unit 49 is configured to control an operation of the time measurement device 2. Specifically, the control unit 49 controls an operation of the time measurement device 2 by supplying the trigger signal LDT to the light emitting unit 11, supplying the clock signal CLK and the signal STRT to the time measurement unit 14, supplying the control signal RES_SEL to the SR latch 55, and supplying the selection control signal SELM to the shutter 42 and the selectors 53 and 58.

Here, the reflector 41 corresponds to a specific example of a "reflector" in the disclosure. The reference pulse light L11R corresponds to a specific example of the "first pulse light" in the present disclosure. The reference pulse light L12R corresponds to a specific example of "third pulse light" in the present disclosure. The calculation unit 50 corresponds to a specific example of the "first calculation unit" in the present disclosure.

Each of FIGS. 12A and 12B illustrates an operation example of the time measurement device 2. (A) illustrates the waveform of the clock signal CLK. (B) illustrates the count value CNT of the time measurement unit 14. (C) illustrates the waveform of the signal STRT (signal STRT_0) of the output terminal of the control unit 49. (D) illustrates the waveform of the signal STRT (signal STRT_D) of the input terminal of the time measurement unit 14. (E) illustrates the waveform of the trigger signal LDT of the output terminal of the control unit 49. (F) illustrates the waveform of pulse light Lout on a light emitting surface S11 of the light emitting unit 11. (G) illustrates the waveform of pulse light Lin on a light receiving surface S20 of the light receiving unit 20. (H) illustrates the waveform of the signal STP of the input terminal of the time measurement unit 14. (I) illustrates the waveform of the control signal RES_SEL. (J) illustrates the waveform of the controls signal SET_SEL. (K) illustrates the waveform of the selection control signal SELO. (L) illustrates the waveform of the selection control signal SELO.

The time measurement device 2 first detects the reference pulse light L11R that has made one round trip between the light emitting unit 11, the reflector 41, and the light receiving unit 20 and the reference reflector 12 in a period PR1 as illustrated in FIG. 12A. Next, the time measurement device 2 detects the reference pulse light L12R that has made two round trips between the light emitting unit 11, the reflector 41, and the light receiving unit 20 and the reference reflector 12 in a period PR2 subsequent to the period PR1. The time measurement device 2 then detects the reflected pulse light L2 in the period PO subsequent to the period PR2 as illustrated in FIG. 12B. The reflected pulse light L2 is reflected light by the measurement target object 100. The time measurement device 2 then calculates the time TOFO of flight for pulse light to fly from the light emitting unit 11 to the light receiving unit 20 via the measurement target object 100 on the basis of the light receiving timings of the pieces of reference pulse light L11R and L12R and the light receiving timing of the reflected pulse light L2. The following describes this operation in detail.

First, the period PR1 begins at a timing t31. In each of the periods PR1 and PR2, the control unit 49 sets the selection control signal SELM at the high level ((L) of FIG. 12A). This opens the shutter 42 in the time measurement device 2 and allows the two pieces of reference pulse light L11R and L12R to enter the light receiving surface S20 of the light receiving unit 20.

At this timing t31, the control unit 49 changes the control signal RES_SEL from the low level to the high level. At the timing a predetermined time after this timing t31, the control unit 49 changes the control signal RES_SEL from the high level to the low level ((I) of FIG. 12A). This causes the SR latch 55 to set the selection control signal SELO at the low level ((J) of FIG. 12A).

At this timing t31, the control unit 49 then changes the trigger signal LDT from the low level to the high level. At the timing a predetermined time (pulse width PW) after the timing t31, the control unit 49 changes the trigger signal LDT from the high level to the low level ((E) of FIG. 12A). This causes the light emitting unit 11 to emit light at a timing t33 that is delayed from the timing t31 by the time TD2 and causes the light emitting unit 11 to extinguish light at the timing a predetermined time (pulse width PW) after the timing t33, thereby outputting the pulse light Lout (emission pulse light L0) ((F) of FIG. 12A).

In addition, the control unit 49 changes the signal STRT (signal STRT_0) from the low level to the high level at this timing t31 ((C) of FIG. 12A). The signal STRT (signal STRT_D) of the input terminal of the time measurement unit 14 is changed from the low level to the high level at a timing t32 delayed from the timing t31 by the time TD1 ((D) of FIG. 12A). The time measurement unit 14 then begins to count the clock pulses included in the clock signal CLK on the basis of this signal STRT (signal STRT_D) ((A) and (B) of FIG. 12A). This causes the count value CNT of the time measurement unit 14 to begin to increase ((B) of FIG. 12A).

At a timing t34 delayed from the timing t33 by the time TOFR1 of flight, the light receiving unit 20 then detects the reference pulse light L11R that has made one round trip between the light emitting unit 11, the reflector 41, and the light receiving unit 20 and the reference reflector 12 ((G) of FIG. 12A). At a timing t35 delayed from this timing t34 by the time TD3, the signal STP of the input terminal of the time measurement unit 14 is then changed from the low level to the high level ((H) of FIG. 12A). The time measurement unit 14 outputs the count value CNT (value CR1) on the basis of this signal STP. As illustrated in (K) of FIG. 12A, the selection control signal SELO is at the low level ("0"). This causes the demultiplexer 51 of the calculation unit 50 to supply this count value CNT (value CR1) to the double calculation section 52. The double calculation section 52 multiplies this value CR1 by "2" (2×CR1). As illustrated in (L) of FIG. 12A, the selection control signal SELM is at the high level ("1"). This causes the selector 53 to supply the value (2×value CR1) supplied from this double calculation section 52 to the storage section 32. The storage section 32 then stores this value CNT (2×value CR1).

At a timing t36, the period PR1 then ends and the period PR2 begins. At this timing t36, the storage section 54 changes the control signal SET_SEL from the low level to the high level. At the timing a predetermined time after this timing t36, the storage section 54 changes the control signal SET_SEL from the high level to the low level ((J) of FIG. 12A). This causes the SR latch 55 to change the selection control signal SELO from the low level to the high level at this timing t36 ((K) of FIG. 12A).

At a timing t37 delayed from the timing t33 by the time TOFR2 (=2×TOFR1) of flight, the light receiving unit 20 then detects the reference pulse light L12R that has made two round trips between the light emitting unit 11, the reflector 41, and the light receiving unit 20 and the reference reflector 12 ((G) of FIG. 12A). At a timing t38 delayed from this timing t37 by the time TD3, the signal STP of the input terminal of the time measurement unit 14 is then changed from the low level to the high level ((H) of FIG. 12A). The time measurement unit 14 outputs the count value CNT (value CR2) on the basis of this signal STP. As illustrated in (K) of FIG. 12A, the selection control signal SELO is at the high level ("1"). This causes the demultiplexer 51 of the calculation unit 50 to supply this count value CNT (value CR2) to each of the subtraction sections 56 and 57. The subtraction section 57 subtracts the value CR2 supplied from the demultiplexer 51 from the value (2×value CR1) supplied from the storage section 54 and supplies a result of the subtraction to the selector 58. As illustrated in (L) of FIG. 12A, the selection control signal SELM is at the high level ("1"). This causes the selector 58 to supply the value supplied from the subtraction section 57 to the storage unit 48. The storage unit 48 stores the value supplied from the subtraction section 57.

The period PR2 then ends at a timing t39.

The value CR1 of the count value CNT is a count value obtained by the time measurement unit 14. This makes it possible to convert the value (2×value CR1) stored in the storage section 32 to a time TR1 by being multiplied by the time corresponding to one cycle of the clock signal CLK. It is possible to express this time TR1 with the following expression as illustrated in FIG. 12A.

$$TR1=2\times(TOFR1+TD2+TD3-TD1) \quad (EQ4)$$

It is possible to similarly convert the value CR2 of the count value CNT to a time TR2. It is possible to express this time TR2 with the following expression as illustrated in FIG. 12A.

$$TR2=TOFR2+TD2+TD3-TD1=2\times TOFR1+TD2+TD3-TD1 \quad (EQ5)$$

It is thus possible to express a time difference ΔT between the time TR1 and the time TR2 with the following expression.

$$\Delta T=TR1-TR2=TD2+TD3-TD1 \quad (EQ6)$$

In other words, the time difference ΔT includes three delay times (times TD1 to TD3) occurring in the time measurement device 2. The storage unit 48 stores the value corresponding to this time difference ΔT.

Next, as illustrated in FIG. 12B, the period PO begins at a timing t41. The control unit 49 changes the selection control signal SELM from the high level to the low level at this timing t41 ((L) of FIG. 12B). This closes the shutter 42 in the time measurement device 2, blocks the optical path of the two pieces of reference pulse light L11R and L12R, and prevents the two pieces of reference pulse light L11R and L12R from entering the light receiving surface S20 of the light receiving unit 20. In addition, the selector 53 supplies the value supplied from the storage unit 48 to the storage section 54. This causes the storage section 54 to store the value corresponding to the time difference ΔT indicated in the expression EQ6.

At this timing t41, the storage section 54 then changes the control signal SET_SEL from the low level to the high level. At the timing a predetermined time after this timing t41, the storage section 54 changes the control signal SET_SEL from the high level to the low level ((J) of FIG. 12B). This causes the SR latch 55 to change the selection control signal SELO from the low level to the high level at this timing t41 ((K) of FIG. 12B).

At this timing t41, the control unit 49 then changes the trigger signal LDT from the low level to the high level. At the timing a predetermined time (pulse width PW) after the timing t41, the control unit 49 changes the trigger signal LDT from the high level to the low level ((E) of FIG. 12B). This causes the light emitting unit 11 to emit light at a timing t33 that is delayed from the timing t41 by the time TD2 and causes the light emitting unit 11 to extinguish light at the timing a predetermined time (pulse width PW) after a timing t43, thereby outputting the pulse light Lout (emission pulse light L0) ((F) of FIG. 12B).

In addition, the control unit 49 changes the signal STRT (signal STRT_0) from the low level to the high level at this timing t41 ((C) of FIG. 12B). The signal STRT (signal STRT_D) of the input terminal of the time measurement unit 14 is changed from the low level to the high level at a timing t42 delayed from the timing t41 by the time TD1 ((D) of FIG. 12B). The time measurement unit 14 then begins to count the clock pulses included in the clock signal CLK on the basis of this signal STRT (signal STRT_D) ((A) and (B) of FIG. 12B). This causes the count value CNT of the time measurement unit 14 to begin to increase ((B) of FIG. 12B).

Next, at a timing t44 delayed from the timing t43 by the time TOFO of flight, the light receiving unit 20 detects the reflected pulse light L2 that is reflected light by the measurement target object 100 ((G) of FIG. 12B). At the timing t5 delayed from this timing t44 by the time TD3, the signal STP of the input terminal of the time measurement unit 14 is then changed from the low level to the high level ((H) of FIG. 12B). The time measurement unit 14 outputs the count value CNT (value CO) on the basis of this signal STP. As illustrated in (K) of FIG. 12B, the selection control signal SELO is at the high level ("1"). This causes the demultiplexer 51 of the calculation unit 50 to supply this count value CNT (value CO) to each of the subtraction sections 56 and 57. The subtraction section 56 subtracts the value supplied from the storage section 54 from the value (value CO)

supplied from the demultiplexer 51 and supplies a result of the subtraction to the selector 58. As illustrated in (L) of FIG. 12B, the selection control signal SELM is at the low level ("0"). This causes the selector 58 to supply the value supplied from the subtraction section 56 to the storage unit 48. The storage unit 48 stores the value supplied from the subtraction section 56.

The period PO then ends at a timing t46.

The value CO of the count value CNT is a count value obtained by the time measurement unit 14. It is thus possible to convert this value CO into the time TO by multiplying the value CO by the time corresponding to one cycle of the clock signal CLK. It is possible to express this time TO with the following expression as illustrated in FIG. 12B.

$$TO = TOFO + TD2 + TD3 - TD1 \quad \text{(EQ7)}$$

The subtraction section 56 subtracts the time difference ΔT corresponding to the value supplied from the storage section 54 from this time TO. This makes it possible to obtain the time TOFO of flight as in the following expression.

$$TO - \Delta T = TOFO + TD2 + TD3 - TD1 - \quad \text{(EQ 8)}$$
$$(TD2 + TD3 - TD1)$$
$$= TOFO$$

The histogram generation unit 15 generates the histogram HIST as illustrated in FIG. 4 on the basis of the value (difference value DIFF) supplied from the calculation unit 50. The histogram generation unit 15 then obtains the difference value DIFF having the highest frequency, for example, in this histogram HIST as the difference value DIFFpeak. The multiplication of this difference value DIFFpeak, for example, by the time corresponding to one cycle of the clock signal CLK allows the signal processing unit 16 to calculate the time TOFO of flight.

In this way, the time measurement device 2 is provided with the reflector 41. The light receiving unit 20 detects the reference pulse light L11R that has made one round trip between the light emitting unit 11, the reflector 41, and the light receiving unit 20 and the reference reflector 12 and the reference pulse light L12R that has made two round trips between the light emitting unit 11, the reflector 41, and the light receiving unit 20 and the reference reflector 12. This allows the time measurement device 2 to cancel the time TOFR1 of flight for the reference pulse light L11R and the time TOFR2 of flight for the reference pulse light L12R as indicated in the expressions EQ4 to EQ6. In other words, different from the time measurement device 1 according to the first embodiment described above, the time measurement device 2 does not have to accurately obtain the optical path length of the pieces of reference pulse light L11R and L12R. As a result, for example, it is possible to lower the accuracy of positions to dispose the light emitting unit 11, the reflector 41, the light receiving unit 20, and the reference reflector 12 in the time measurement device 2. It is thus possible to lower the processing accuracy of the manufacturing step. This consequently makes it possible to facilitate the time measurement device 2 to be manufactured.

As described above, in the present embodiment, the reflector is provided. The light receiving unit detects the reference pulse light L11R that has made one round trip between the light emitting unit, the reflector, and the light receiving unit and the reference reflector and the reference pulse light L12R that has made two round trips between the light emitting unit, the reflector, and the light receiving unit and the reference reflector. This makes it possible to facilitate the time measurement device to be manufactured. The other effects are similar to those of the first embodiment described above.

Modification Example 2-1

In the present embodiment described above, the light receiving unit 20 detects the reference pulse light L11R that has made one round trip between the light emitting unit 11, the reflector 41, and the light receiving unit 20 and the reference reflector 12 and the reference pulse light L12R that has made two round trips between the light emitting unit 11, the reflector 41, and the light receiving unit 20 and the reference reflector 12, but this is not limitative. It is sufficient if the light receiving unit 20 is able to detect a plurality of pieces of reference pulse light that makes different numbers of round trips.

3. Third Embodiment

Next, a time measurement device 3 according to a third embodiment is described. In the present embodiment, the reference reflector 12 is not provided to measure the time TOFO of flight for pulse light. It is to be noted that substantially the same components as those of the time measurement device 1 according to the first embodiment described above are denoted by the same signs and descriptions thereof are omitted as appropriate.

FIG. 13 illustrates a configuration example of the time measurement device 3. The time measurement device 3 includes a reflector 61, a calculation unit 60, and a control unit 69.

The reflector 61 is configured to reflect pulse light reflected by the measurement target object 100 to the measurement target object 100. The light emitting unit 11, the reflector 61, and the light receiving unit 20 are disposed close to each other, for example, in the same plane. As illustrated in FIG. 13, this allows the light receiving unit 20 to detect two pieces of reflected pulse light L21 and L22. The reflected pulse light L21 is pulse light that makes one round trip between the light emitting unit 11, the reflector 61, and the light receiving unit 20 and the measurement target object 100. The reflected pulse light L22 is pulse light that makes two round trips between the light emitting unit 11, the reflector 61, and the light receiving unit 20 and the measurement target object 100. In other words, the time TOFO of flight (time TOFO2 of flight) for the reflected pulse light L22 is twice as long as the time TOFO of flight (time TOFO1 of flight) for the reflected pulse light L21.

The calculation unit 60 includes the demultiplexer 31, a storage section 62, the subtraction section 33, and an SR latch 65. The storage section 62 includes, for example, a register. The storage section 62 is configured to store the count value CNT supplied from the demultiplexer 31. In addition, the storage section 62 has even a function of setting the control signal SET_SEL at the high level ("1") in a case where the storage section 62 stores the count value CNT supplied from the demultiplexer 31. The SR latch 65 is configured to generate the selection control signal SELO on the basis of the control signals SET_SEL and RES_SEL. A terminal S of the SR latch 65 is supplied with the control signal SET_SEL and a terminal R is supplied with the control signal RES_SEL. The SR latch 65 sets the selection control signal SELO at the high level ("1") in a case where the control signal SET_SEL is set at the high level ("1"). The SR latch 65 sets the selection control signal SELO at the low level ("0") in a case where the control signal RES_SEL is set at the high level ("1").

The control unit 69 is configured to control an operation of the time measurement device 3. Specifically, the control unit 69 controls an operation of the time measurement device 3 by supplying the trigger signal LDT to the light emitting unit 11, supplying the clock signal CLK and the signal STRT to the time measurement unit 14, and supplying the control signal RES_SEL to the SR latch 65.

Here, the reflector 61 corresponds to a specific example of the "reflector" in the disclosure. The reflected pulse light L22 corresponds to a specific example of the "first pulse light" in the present disclosure. The reflected pulse light L21 corresponds to a specific example of the "second pulse light" in the present disclosure. The calculation unit 60 corresponds to a specific example of the "first calculation unit" in the present disclosure.

FIG. 14 illustrates an operation example of the time measurement device 3. (A) illustrates the waveform of the clock signal CLK. (B) illustrates the count value CNT of the time measurement unit 14. (C) illustrates the waveform of the signal STRT (signal STRT_0) of the output terminal of the control unit 49. (D) illustrates the waveform of the signal STRT (signal STRT_D) of the input terminal of the time measurement unit 14. (E) illustrates the waveform of the trigger signal LDT of the output terminal of the control unit 49. (F) illustrates the waveform of pulse light Lout on a light emitting surface S11 of the light emitting unit 11. (G) illustrates the waveform of pulse light Lin on a light receiving surface S20 of the light receiving unit 20. (H) illustrates the waveform of the signal STP of the input terminal of the time measurement unit 14. (I) illustrates the waveform of the control signal RES_SEL. (J) illustrates the waveform of the controls signal SET_SEL. (K) illustrates the waveform of the selection control signal SELO.

The time measurement device 3 first detects the reflected pulse light L21 that has made one round trip between the light emitting unit 11, the reflector 61, and the light receiving unit 20 and the measurement target object 100 in the period PO as illustrated in FIG. 14. Next, the time measurement device 3 detects the reflected pulse light L22 that has made two round trips between the light emitting unit 11, the reflector 61, and the light receiving unit 20 and the measurement target object 100. The time measurement device 3 then calculates the time TOFO1 of flight for pulse light to fly from the light emitting unit 11 to the light receiving unit 20 via the measurement target object 100 on the basis of the light receiving timings of the pieces of reflected pulse light L21 and L22. The following describes this operation in detail.

First, the period PO begins at a timing t51. At this timing t51, the control unit 69 changes the control signal RES_SEL from the low level to the high level. At the timing a predetermined time after this timing t51, the control unit 69 changes the control signal RES_SEL from the high level to the low level ((I) of FIG. 14). This causes the SR latch 65 to set the selection control signal SELO at the low level ((J) of FIG. 14).

At this timing t51, the control unit 69 then changes the trigger signal LDT from the low level to the high level. At the timing a predetermined time (pulse width PW) after the timing t51, the control unit 69 changes the trigger signal LDT from the high level to the low level ((E) of FIG. 14). This causes the light emitting unit 11 to emit light at a timing t53 that is delayed from the timing t51 by the time TD2 and causes the light emitting unit 11 to extinguish light at the timing a predetermined time (pulse width PW) after the timing t53, thereby outputting the pulse light Lout (emission pulse light L0) ((F) of FIG. 14).

In addition, the control unit 69 changes the signal STRT (signal STRT_0) from the low level to the high level at this timing t51 ((C) of FIG. 14). The signal STRT (signal STRT_D) of the input terminal of the time measurement unit 14 is changed from the low level to the high level at a timing t52 delayed from the timing t51 by the time TD1 ((D) of FIG. 14). The time measurement unit 14 then begins to count the clock pulses included in the clock signal CLK on the basis of this signal STRT (signal STRT_D) ((A) and (B) of FIG. 14). This causes the count value CNT of the time measurement unit 14 to begin to increase ((B) of FIG. 14).

At a timing t54 delayed from the timing t53 by the time TOFO1 of flight, the light receiving unit 20 then detects the reflected pulse light L21 that has made one round trip between the light emitting unit 11, the reflector 61, and the light receiving unit 20 and the measurement target object 100 ((G) of FIG. 14). At a timing t55 delayed from this timing t54 by the time TD3, the signal STP of the input terminal of the time measurement unit 14 is then changed from the low level to the high level ((H) of FIG. 14). The time measurement unit 14 outputs the count value CNT (value CO1) on the basis of this signal STP. As illustrated in (K) of FIG. 14, the selection control signal SELO is at the low level ("0"). This causes the demultiplexer 31 of the calculation unit 60 to supply this count value CNT (value CO1) to the storage section 62. The storage section 62 then stores this count value CNT (value CO1).

At a timing t56, the storage section 62 then changes the control signal SET_SEL from the low level to the high level. At the timing a predetermined time after this timing t56, the storage section 62 changes the control signal SET_SEL from the high level to the low level ((J) of FIG. 14). This causes the SR latch 65 to change the selection control signal SELO from the low level to the high level at this timing t56 ((K) of FIG. 14).

At a timing t57 delayed from the timing t53 by the time TOFO2 (=2×TOFO1) of flight, the light receiving unit 20 then detects the reflected pulse light L22 that has made two round trips between the light emitting unit 11, the reflector 61, and the light receiving unit 20 and the measurement target object 100 ((G) of FIG. 14). At a timing t58 delayed from this timing t57 by the time TD3, the signal STP of the input terminal of the time measurement unit 14 is then changed from the low level to the high level ((H) of FIG. 14). The time measurement unit 14 outputs the count value CNT (value CO2) on the basis of this signal STP. As illustrated in (K) of FIG. 14, the selection control signal SELO is at the high level ("1"). This causes the demultiplexer 31 of the calculation unit 60 to supply this count value CNT (value CO2) to the subtraction section 33. The subtraction section 33 calculates the difference value DIFF by subtracting the count value CNT (value CO1) supplied from the storage section 62 from the count value CNT (value CO2) supplied from the demultiplexer 31.

The period PO then ends at a timing t59.

The value CO1 of the count value CNT is a count value obtained by the time measurement unit 14. It is thus possible to convert the value CO1 into the time TO1 by multiplying the value CO1 by the time corresponding to one cycle of the clock signal CLK. It is possible to express this time TO1 with the following expression as illustrated in FIG. 14.

$$TO1 = TOFO1 + TD2 + TD3 - TD1 \tag{EQ9}$$

It is possible to similarly convert the value CO2 of the count value CNT to a time TO2. It is possible to express this time TO2 with the following expression as illustrated in FIG. 14.

$$TO2 = TOFR2 + TD2 + TD3 - TD1 \quad \text{(EQ 10)}$$
$$= 2 \times TOFR1 + TD2 + TD3 - TD1$$

It is thus possible to express the time TDIFF corresponding to the difference value DIFF with the following expression.

$$TDIFF = TO2 - TO1 = TOFO1 \quad \text{(EQ11)}$$

In this way, the time measurement device 3 is able to obtain the time TOFO1 of flight on the basis of this difference value DIFF.

The histogram generation unit 15 generates the histogram HIST as illustrated in FIG. 4 on the basis of the difference value DIFF supplied from the calculation unit 60. The histogram generation unit 15 then obtains the difference value DIFF having the highest frequency, for example, in this histogram HIST as the difference value DIFFpeak. The multiplication of this difference value DIFFpeak, for example, by the time corresponding to one cycle of the clock signal CLK allows the signal processing unit 16 to calculate the time TOFO1 of flight.

In this way, the time measurement device 3 is provided with the reflector 61. The light receiving unit 20 detects the reflected pulse light L21 that has made one round trip between the light emitting unit 11, the reflector 61, and the light receiving unit 20 and the measurement target object 100 and the reflected pulse light L22 that has made two round trips between the light emitting unit 11, the reflector 61, and the light receiving unit 20 and the measurement target object 100. This allows the influence a variety of delays occurring in the time measurement device 3 to cancel each other in the time measurement device 3 as indicated in the expressions EQ9 to EQ11. It is thus possible to increase the measurement accuracy of the time TOFO1 of flight for pulse light.

As described above, in the present embodiment, the reflector is provided. The light receiving unit detects the reflected pulse light L21 that has made one round trip between the light emitting unit, the reflector, and the light receiving unit and the measurement target object and the reflected pulse light L22 that has made two round trips between the light emitting unit, the reflector, and the light receiving unit and the measurement target object. This makes it possible to increase the measurement accuracy of the time of light for pulse light.

4. Fourth Embodiment

Next, a time measurement device 4 according to a fourth embodiment is described. In the present embodiment, the one histogram HIST is generated on the basis of detection results of the two light receiving units 20. It is to be noted that substantially the same components as those of the time measurement device 1 according to the first embodiment described above are denoted by the same signs and descriptions thereof are omitted as appropriate.

FIG. 15 illustrates a configuration example of the time measurement device 4. The time measurement device 4 includes circuits 80A and 80B, a histogram generation unit 76, and a control unit 79.

Each of the circuits 80A and 80B includes a light receiving unit 70, the time measurement unit 14, and the calculation unit 30.

The light receiving unit 70 of the circuit 80A is configured to detect the reference pulse light L1RA and the reflected pulse light L2A. The reference pulse light L1RA is reflected light by the reference reflector 12. The reflected light by the reference reflector 12 corresponds to the emission pulse light L0. The reflected pulse light L2A is reflected light by the measurement target object 100. The reflected light by the measurement target object 100 corresponds to the emission pulse light L0. The light receiving unit 70 of the circuit 80B is configured to detect the reference pulse light L1RB and the reflected pulse light L2B. The reference pulse light L1RB is reflected light by the reference reflector 12. The reflected light by the reference reflector 12 corresponds to the emission pulse light L0. The reflected pulse light L2B is reflected light by the measurement target object 100. The reflected light by the measurement target object 100 corresponds to the emission pulse light L0.

FIG. 16 illustrates a configuration example of the light receiving unit 70. The light receiving unit 70 includes the light receiving element 21, the resistor element 22, an inverter 71, transistors 72 and 73, a buffer 74, and an inverted OR circuit (NOR) 75.

The inverter 71 is configured to invert and output an activation signal EN. Specifically, the inverter 71 in the circuit 80A inverts and outputs an activation signal EN_A and the inverter 71 in the circuit 80B inverts and outputs an activation signal EN_B.

The transistor 72 is a P-type MOS (Metal Oxide Semiconductor) transistor. The transistor 72 has the source supplied with the voltage VDDH, the gate coupled to the output terminal of the inverter 71, and the drain coupled to one end of the resistor element 22.

The transistor 73 is an N-type MOS transistor. The transistor 73 has the drain coupled to the cathode of the light receiving element 21, the other end of the resistor element 22, and the inverted OR circuit 75. The transistor 73 has the gate coupled to the output terminal of the inverter 71. The transistor 73 has the source grounded.

The input terminal of the buffer 74 is coupled to the output terminal of the inverter 71 and the output terminal is coupled to the inverted OR circuit 75.

A first input terminal of the inverted OR circuit 75 is coupled to the output terminal of the buffer 74 and a second input terminal is coupled to the cathode of the light receiving element 21, the other end of the resistor element 22, and the drain of the transistor 73. The inverted OR circuit 75 then generates the signal STP.

This configuration allows the light receiving unit 70 to detect pulse light in a case where the activation signal EN is at the high level. In addition, the light receiving unit 70 is unable to detect pulse light in a case where the activation signal EN is at the low level. The light receiving unit 70 keeps the signal STP at the low level.

The demultiplexer 31 of the circuit 80A is configured to selectively supply the count value CNT to the storage section 32 or the subtraction section 33 on the basis of a selection control signal SELO_A supplied from the control unit 79. The count value CNT is supplied from the time measurement unit 14. The demultiplexer 31 of the circuit 80B is configured to selectively supply the count value CNT to the storage section 32 or the subtraction section 33 on the basis of a selection control signal SELO_B supplied from the control unit 79. The count value CNT is supplied from the time measurement unit 14.

The histogram generation unit 76 is configured to generate the one histogram HIST on the basis of the difference value DIFF (difference value DIFF_A) supplied from the calculation unit 30 of the circuit 80A and the difference value DIFF (difference value DIFF_B) supplied from the calculation unit 30 of the circuit 80B. The histogram generation unit 76 then obtains the difference value DIFF having the highest frequency, for example, in this histogram HIST as the difference value DIFFpeak. The signal processing unit 16 calculates the time TOFO of flight for pulse light to fly from the light emitting unit 11 to the light receiving unit 20 via the measurement target object 100 on the basis of this difference value DIFFpeak. In other words, the time measurement device 4 brings the two circuits 80A and 90B into operation as one pixel, thereby generating the one histogram HIST. The time measurement device 4 calculates the time TOFO of flight on the basis of this histogram HIST.

The control unit 79 is configured to control an operation of the time measurement device 4. Specifically, the control unit 79 controls an operation of the time measurement device 4 by supplying the trigger signal LDT to the light emitting unit 11, supplying the activation signal EN_A to the light receiving unit 70 of the circuit 80A, supplying the activation signal EN_B to the light receiving unit 70 of the circuit 80B, supplying the clock signal CLK and the signal STRT to each of the time measurement units 14 of the circuits 80A and 80B, supplying the selection control signal SELO_A to the demultiplexer 31 of the circuit 80A, and supplying the selection control signal SELO_B to the demultiplexer 31 of the circuit 80B.

The time measurement device 4 allows the circuit 80A to detect the reference pulse light LIRA that is reflected light by the reference reflector 12 and detect the reflected pulse light L2A that is reflected light by the measurement target object 100. Similarly, the circuit 80B is able to detect the reference pulse light L1RB that is reflected light by the reference reflector 12 and detect the reflected pulse light L2B that is reflected light by the measurement target object 100. The control unit 79 controls an operation of the time measurement device 4 to cause at least one of the two circuits 80A and 80B to measure the pieces of reflected pulse light L2 (pieces of reflected pulse light L2A and L2B) that are pieces of reflected light by the measurement target object 100.

Here, the light receiving unit 70 of the circuit 80A corresponds to a specific example of the "first light receiving unit" in the present disclosure. The light receiving unit 70 of the circuit 80B corresponds to a specific example of the "second light receiving unit" in the present disclosure. The light receiving element 21 corresponds to a specific example of a "light receiving element" in the present disclosure. The transistor 72 corresponds to a specific example of a "transistor" in the present disclosure. The reference pulse light LIRA corresponds to a specific example of the "first pulse light" in the present disclosure. The reflected pulse light L2A corresponds to a specific example of the "second pulse light" in the present disclosure. The reference pulse light L1RB corresponds to a specific example of "fourth pulse light" in the present disclosure. The reflected pulse light L2B corresponds to a specific example of "fifth pulse light" in the present disclosure. The time measurement unit 14 of the circuit 80A corresponds to a specific example of the "first timing detection unit" in the present disclosure. The time measurement unit 14 of the circuit 80B corresponds to a specific example of a "second timing detection unit" in the present disclosure. The calculation unit 30 of the circuit 80A corresponds to a specific example of the "first calculation unit" in the present disclosure. The calculation unit 30 of the circuit 80B corresponds to a specific example of a "second calculation unit" in the present disclosure. The difference value DIFF_A corresponds to a specific example of the "first time value" in the present disclosure. The difference value DIFF_B corresponds to a specific example of a "second time value" in the present disclosure. The histogram generation unit 76 corresponds to a specific example of the "histogram generation unit" in the present disclosure. The control unit 79 corresponds to a specific example of a "control unit" in the present disclosure.

FIGS. 17A, 17B, and 17C illustrate an operation example of the time measurement device 4. The time measurement device 4 performs driving D1, for example, in a case where the time measurement device 4 is powered on. Following the driving D1, the time measurement device 4 repeats driving D2.

In the driving D1, the time measurement device 4 repeats an operation in an AR_BR mode two times in this example. In this AR_BR mode, a measurement target of the circuits 80A and 80B is the reference reflector 12. This causes the circuits 80A and 80B to measure a delay time in the time measurement device 4 as with the time measurement device 1 according to the first embodiment described above.

In the driving D2, the time measurement device 4 performs operations in the order of an AO_BR mode, an AR_BO mode, an AO_BO mode, and the AO_BO mode in this example.

In the AO_BR mode, a measurement target of the circuit 80A is the measurement target object 100 and a measurement target of the circuit 80B is the reference reflector 12. This causes the circuit 80A to measure the time TOFO of flight for pulse light to fly from the light emitting unit 11 to the light receiving unit 20 via the measurement target object 100 and causes the circuit 80B to measure a delay time in the time measurement device 4 as with the time measurement device 1 according to the first embodiment described above.

In the AR_BO mode, a measurement target of the circuit 80A is the reference reflector 12 and a measurement target of the circuit 80B is the measurement target object 100. This causes the circuit 80A to measure a delay time in the time measurement device 4 and causes the circuit 80B to measure the time TOFO of flight for pulse light to fly from the light emitting unit 11 to the light receiving unit 20 via the measurement target object 100 as with the time measurement device 1 according to the first embodiment described above.

In this AO_BO mode, a measurement target of the circuits 80A and 80B is the measurement target object 100. This causes each of the circuits 80A and 80B to measure the time TOFO of flight for pulse light to fly from the light emitting unit 11 to the light receiving unit 20 via the measurement target object 100 as with the time measurement device 1 according to the first embodiment described above.

In a case where the circuits 80A and 80B measure the time TOFO of flight, the circuits 80A and 80B measure the time TOFO of flight by using a result of the measurement of a delay time in the time measurement device 4 that has been measured before the measurement. Specifically, as illustrated in FIGS. 17A, 17B, and 17C, the circuit 80A uses a result of the measurement of a delay time in a second period P2 of the driving D2 in measuring the time TOFO of flight in a third period P3 of the driving D2. In addition, the circuit 80A uses a result of the measurement of a delay time in the second period P2 of the driving D2 in measuring the time TOFO of flight in a fourth period P4 of the driving D2. In addition, the circuit 80A uses a result of the measurement of a delay time in the second period P2 of the first driving D2 in measuring the time TOFO of flight in a first period P1 of the second driving D2.

In this way, in the driving D2, at least one of the circuits 80A and 80B measures the time TOFO of flight for pulse light to fly from the light emitting unit 11 to the light receiving unit 20 via the measurement target object 100. This allows the time measurement device 4 to continuously measure the time TOFO of flight with no interruption in a case where a delay time in the time measurement device 4 is measured.

FIG. 18 illustrates an operation example of the time measurement device 4 in the AR_BR mode. FIG. 19 illustrates an operation example of the time measurement device 4 in the AO_BR mode. FIG. 20 illustrates an operation example of the time measurement device 4 in the AR_BO mode. FIG. 21 illustrates an operation example of the time measurement device 4 in the AO_BO mode. In each of FIGS. 18 to 21, (A) illustrates the waveform of the clock signal CLK. (B) illustrates the waveform of the signal STRT (signal STRT_0) of the output terminal of the control unit 79. (C) illustrates the waveform of the trigger signal LDT of the output terminal of the control unit 79. (D) illustrates the waveform of the pulse light Lout on the light emitting surface S11 of the light emitting unit 11. (E) illustrates the waveform of the pulse light Lin on the light receiving surface S20 of the light receiving unit 70 of each of the circuits 80A and 80B. In each of FIGS. 18 to 21, (F) to (J) illustrate operations of the circuit 80A and (K) to (O) illustrate operations of the circuit 80B. In each of FIGS. 18 to 21, (F) illustrates the count value CNT (count value CNT_A) of the time measurement unit 14 of the circuit 80A. (G) illustrates the waveform of the signal STRT (signal STRT_D_A) of the input terminal of the time measurement unit 14 in the circuit 80A. (H) illustrates the waveform of the activation signal EN_A. (I) illustrates the waveform of the selection control signal SELO_A. (J) illustrates the waveform of the signal STP (signal STP_A) of the input terminal of the time measurement unit 14 in the circuit 80A. In each of FIGS. 18 to 21, (K) illustrates the count value CNT (count value CNT_B) of the time measurement unit 14 of the circuit 80B. (L) illustrates the waveform of the signal STRT (signal STRT_D_B) of the input terminal of the time measurement unit 14 in the circuit 80B. (M) illustrates the waveform of the activation signal EN_B. (N) illustrates the waveform of the selection control signal SELO_B. (O) illustrates the waveform of the signal STP (signal STP_B) of the input terminal of the time measurement unit 14 in the circuit 80B.

(AR_BR Mode)

In the AR_BR mode (FIG. 18), the control unit 79 sets the selection control signals SELO_A and SELO_B at the low level ((I) and (N) of FIG. 18). At a timing t61, the control unit 79 then sets the activation signals EN_A and EN_B at the low level ((H) and (M) of FIG. 18). This allows the light receiving unit 70 of each of the circuits 80A and 80B to detect pulse light.

At this timing t61, the control unit 79 then changes the trigger signal LDT from the low level to the high level. At the timing a predetermined time (pulse width PW) after the timing t61, the control unit 79 changes the trigger signal LDT from the high level to the low level ((C) of FIG. 18). This causes the light emitting unit 11 to emit light at a timing t64 that is delayed from the timing t61 by the time TD2 and causes the light emitting unit 11 to extinguish light at the timing a predetermined time (pulse width PW) after the timing t64, thereby outputting the pulse light Lout (emission pulse light L0) ((D) of FIG. 18).

In addition, the control unit 79 changes the signal STRT (signal STRT_0) from the low level to the high level at this timing t61 ((B) of FIG. 18).

The signal STRT (signal STRT_D_A) of the input terminal of the time measurement unit 14 of the circuit 80A is changed from the low level to the high level at a timing t62 delayed from the timing t61 by the time TD1_A ((G) of FIG. 18). This time TD1_A corresponds to the time of a signal delay of the signal STRT from the control unit 79 to the time measurement unit 14 of the circuit 80A. The time measurement unit 14 then begins to count the clock pulses included in the clock signal CLK on the basis of this signal STRT (signal STRT_D_A) ((A) and (F) of FIG. 18). This causes the count value CNT_A of the time measurement unit 14 to begin to increase ((F) of FIG. 18).

The signal STRT (signal STRT_D_B) of the input terminal of the time measurement unit 14 of the circuit 80B is changed from the low level to the high level at a timing t63 delayed from the timing t61 by the time TD1_B ((L) of FIG. 18). This time TD1_B corresponds to the time of a signal delay of the signal STRT from the control unit 79 to the time measurement unit 14 of the circuit 80B. The time measurement unit 14 then begins to count the clock pulses included in the clock signal CLK on the basis of this signal STRT (signal STRT_D_B) ((A) and (K) of FIG. 18). This causes the count value CNT_B of the time measurement unit 14 to begin to increase ((K) of FIG. 18).

At a timing t65 delayed from the timing t64 by the time TOFR of flight, the light receiving units 70 of the circuits 80A and 80B then detect the pieces of reference pulse light L1RA and L1RB each of which is reflected light by the reference reflector 12 ((E) of FIG. 18).

At a timing t66 delayed from this timing t65 by the time TD3_A, the signal STP_A of the input terminal of the time measurement unit 14 of the circuit 80A is then changed from the low level to the high level ((J) of FIG. 18). This time TD3_A corresponds to the total time of the time of an internal delay in the light receiving unit 70 of the circuit 80A and the time of a signal delay from the light receiving unit 70 to the time measurement unit 14. The time measurement unit 14 then outputs the count value CNT_A (value CRA) on the basis of this signal STP_A. As illustrated in (I) of FIG. 18, the selection control signal SELO_A is at the low level ("0"). This causes the demultiplexer 31 of the circuit 80A to supply this count value CNT_A (value CRA) to the storage section 32. The storage section 32 then stores this count value CNT_A (value CRA).

In addition, at a timing t67 delayed from this timing t65 by the time TD3_B, the signal STP_B of the input terminal of the time measurement unit 14 of the circuit 80B is changed from the low level to the high level ((O) of FIG. 18). This time TD3_B corresponds to the total time of the time of an internal delay in the light receiving unit 70 of the circuit 80B and the time of a signal delay from the light receiving unit 70 to the time measurement unit 14. The time measurement unit 14 then outputs the count value CNT_B (value CRB) on the basis of this signal STP_B. As illustrated in (N) of FIG. 18, the selection control signal SELO_B is at the low level ("0"). This causes the demultiplexer 31 of the circuit 80B to supply this count value CNT_B (value CRB) to the storage section 32. The storage section 32 then stores this count value CNT_B (value CRB).

At a timing t68, the control unit 79 then changes the activation signals EN_A and EN_B from the high level to the low level ((H) and (M) of FIG. 18). Accordingly, the light receiving unit 70 of each of the circuits 80A and 80B is unable to detect pulse light. The signals STP_A and STP_B are kept at the low level from this onward ((J) and (O) of FIG. 18).

(AO_BR Mode)

In the AO_BR mode (FIG. 19), the control unit 79 sets the selection control signal SELO_A at the high level and sets the selection control signal SELO_B at the low level ((I) and (N) of FIG. 19). At a timing t71, the control unit 79 then sets the activation signal EN_A at the low level and sets the activation signal EN_B at the high level ((H) and (M) of FIG. 19). Accordingly, the light receiving unit 70 of the circuit 80A is unable to detect pulse light and the light receiving unit 70 of the circuit 80B is able to detect pulse light.

At this timing t71, the control unit 79 then changes the trigger signal LDT from the low level to the high level. At the timing a predetermined time (pulse width PW) after the timing t71, the control unit 79 changes the trigger signal LDT from the high level to the low level ((C) of FIG. 19). This causes the light emitting unit 11 to emit light at a timing t74 that is delayed from the timing t71 by the time TD2 and causes the light emitting unit 11 to extinguish light at the timing a predetermined time (pulse width PW) after the timing t74, thereby outputting the pulse light Lout (emission pulse light L0) ((D) of FIG. 19).

In addition, the control unit 79 changes the signal STRT (signal STRT_0) from the low level to the high level at this timing t71 ((B) of FIG. 19).

The signal STRT (signal STRT_D_A) of the input terminal of the time measurement unit 14 of the circuit 80A is changed from the low level to the high level at a timing t72 delayed from the timing t71 by the time TD1_A ((G) of FIG. 19). The time measurement unit 14 then begins to count the clock pulses included in the clock signal CLK on the basis of this signal STRT (signal STRT_D_A) ((A) and (F) of FIG. 19). This causes the count value CNT_A of the time measurement unit 14 to begin to increase ((F) of FIG. 19).

The signal STRT (signal STRT_D_B) of the input terminal of the time measurement unit 14 of the circuit 80B is changed from the low level to the high level at a timing t73 delayed from the timing t71 by the time TD1_B ((L) of FIG. 19). The time measurement unit 14 then begins to count the clock pulses included in the clock signal CLK on the basis of this signal STRT (signal STRT_D_B) ((A) and (K) of FIG. 19). This causes the count value CNT_B of the time measurement unit 14 to begin to increase ((K) of FIG. 19).

At a timing t75 delayed from the timing t74 by the time TOFR of flight, the light receiving unit 70 of the circuit 80B then detects the reference pulse light L1RB that is reflected light by the reference reflector 12 ((E) of FIG. 19).

At a timing t76 delayed from this timing t75 by the time TD3_B, the signal STP_B of the input terminal of the time measurement unit 14 of the circuit 80B is then changed from the low level to the high level ((O) of FIG. 19). The time measurement unit 14 then outputs the count value CNT_B (value CRB) on the basis of this signal STP_B. As illustrated in (N) of FIG. 19, the selection control signal SELO_B is at the low level ("0"). This causes the demultiplexer 31 of the circuit 80B to supply this count value CNT_B (value CRB) to the storage section 32. The storage section 32 then stores this count value CNT_B (value CRB).

At a timing t77, the control unit 79 then changes the activation signal EN_A from the low level to the high level and changes the activation signal EN_B from the high level to the low level ((H) and (M) of FIG. 19). This allows the light receiving unit 70 of the circuit 80A to detect pulse light. In addition, the light receiving unit 70 of the circuit 80B is unable to detect pulse light. The signal STP_B is kept at the low level from this onward ((O) of FIG. 19).

Next, at a timing t78 delayed from the timing t74 by the time TOFO of flight, the light receiving unit 70 of the circuit 80A detects the reflected pulse light L2A that is reflected light by the measurement target object 100 ((E) of FIG. 19). At a timing t79 delayed from this timing t78 by the time TD3_A, the signal STP_A of the input terminal of the time measurement unit 14 is then changed from the low level to the high level ((J) of FIG. 19). The time measurement unit 14 outputs the count value CNT_A (value COA) on the basis of this signal STP_A. As illustrated in (I) of FIG. 19, the selection control signal SELO_A is at the high level ("1"). This causes the demultiplexer 31 of the circuit 80A to supply this count value CNT_A (value COA) to the subtraction section 33. The subtraction section 33 then calculates the difference value DIFF_A by subtracting the count value CNT_A (value COA) supplied from the storage section 32 from the count value CNT_A (value COA) supplied from the demultiplexer 31.

(AR_BO Mode)

In the AR_BO mode (FIG. 20), the control unit 79 sets the selection control signal SELO_A at the low level and sets the selection control signal SELO_B at the high level ((I) and (N) of FIG. 20). At a timing t81, the control unit 79 then sets the activation signal EN_A at the high level and sets the activation signal EN_B at the low level ((H) and (M) of FIG. 20). Accordingly, the light receiving unit 70 of the circuit 80A is able to detect pulse light and the light receiving unit 70 of the circuit 80B is unable to detect pulse light.

At this timing t81, the control unit 79 then changes the trigger signal LDT from the low level to the high level. At the timing a predetermined time (pulse width PW) after the timing t81, the control unit 79 changes the trigger signal LDT from the high level to the low level ((C) of FIG. 20). This causes the light emitting unit 11 to emit light at a timing t84 that is delayed from the timing t81 by the time TD2 and causes the light emitting unit 11 to extinguish light at the timing a predetermined time (pulse width PW) after the timing t84, thereby outputting the pulse light Lout (emission pulse light L0) ((D) of FIG. 20).

In addition, the control unit 79 changes the signal STRT (signal STRT_0) from the low level to the high level at this timing t81 ((B) of FIG. 20).

The signal STRT (signal STRT_D_A) of the input terminal of the time measurement unit 14 of the circuit 80A is changed from the low level to the high level at a timing t82 delayed from the timing t81 by the time TD1_A ((G) of FIG. 20). The time measurement unit 14 then begins to count the clock pulses included in the clock signal CLK on the basis of this signal STRT (signal STRT_D_A) ((A) and (F) of FIG. 20). This causes the count value CNT_A of the time measurement unit 14 to begin to increase ((F) of FIG. 20).

The signal STRT (signal STRT_D_B) of the input terminal of the time measurement unit 14 of the circuit 80B is changed from the low level to the high level at a timing t83 delayed from the timing t81 by the time TD1_B ((L) of FIG. 20). The time measurement unit 14 then begins to count the clock pulses included in the clock signal CLK on the basis of this signal STRT (signal STRT_D_B) ((A) and (K) of FIG. 20). This causes the count value CNT_B of the time measurement unit 14 to begin to increase ((K) of FIG. 20).

At a timing t85 delayed from the timing t84 by the time TOFR of flight, the light receiving unit 70 of the circuit 80A then detects the reference pulse light L1RA that is reflected light by the reference reflector 12 ((E) of FIG. 20).

At a timing t86 delayed from this timing t85 by the time TD3_B, the signal STP_A of the input terminal of the time measurement unit 14 of the circuit 80A is then changed from the low level to the high level ((J) of FIG. 20). The time measurement unit 14 then outputs the count value CNT_A (value CRA) on the basis of this signal STP_A. As illustrated in (I) of FIG. 20, the selection control signal SELO_A is at the low level ("0"). This causes the demultiplexer 31 of the circuit 80A to supply this count value CNT_A (value CRA) to the storage section 32. The storage section 32 then stores this count value CNT_A (value CRA).

At a timing t87, the control unit 79 then changes the activation signal EN_A from the high level to the low level and changes the activation signal EN_B from the low level to the high level ((H) and (M) of FIG. 20). This makes the light receiving unit 70 of the circuit 80A unable to detect pulse light. The signal STP_A is kept at the low level from this onward ((J) of FIG. 20). In addition, the light receiving unit 70 of the circuit 80B is able to detect pulse light.

Next, at a timing t88 delayed from the timing t84 by the time TOFO of flight, the light receiving unit 70 of the circuit 80B detects the reflected pulse light L2B that is reflected light by the measurement target object 100 ((E) of FIG. 20). At a timing t89 delayed from this timing t88 by the time TD3_B, the signal STP_B of the input terminal of the time measurement unit 14 is then changed from the low level to the high level ((O) of FIG. 20). The time measurement unit 14 outputs the count value CNT_B (value COB) on the basis of this signal STP_B. As illustrated in (N) of FIG. 20, the selection control signal SELO_B is at the high level ("1"). This causes the demultiplexer 31 of the circuit 80B to supply this count value CNT_B (value COB) to the subtraction section 33. The subtraction section 33 then calculates the difference value DIFF_B by subtracting the count value CNT_B (value COB) supplied from the storage section 32 from the count value CNT_B (value COB) supplied from the demultiplexer 31.

(AO_BO Mode)

In the AO_BO mode (FIG. 21), the control unit 79 sets the selection control signals SELO_A and SELO_B at the high level ((I) and (N) of FIG. 21). At a timing t91, the control unit 79 then sets the activation signals EN_A and EN_B at the low level ((H) and (M) of FIG. 121). This makes the light receiving unit 70 of each of the circuits 80A and 80B unable to detect pulse light.

At this timing t91, the control unit 79 then changes the trigger signal LDT from the low level to the high level. At the timing a predetermined time (pulse width PW) after the timing t91, the control unit 79 changes the trigger signal LDT from the high level to the low level ((C) of FIG. 21). This causes the light emitting unit 11 to emit light at a timing t94 that is delayed from the timing t91 by the time TD2 and causes the light emitting unit 11 to extinguish light at the timing a predetermined time (pulse width PW) after the timing t94, thereby outputting the pulse light Lout (emission pulse light L0) ((D) of FIG. 21).

In addition, the control unit 79 changes the signal STRT (signal STRT_0) from the low level to the high level at this timing t91 ((B) of FIG. 21).

The signal STRT (signal STRT_D_A) of the input terminal of the time measurement unit 14 of the circuit 80A is changed from the low level to the high level at a timing t92 delayed from the timing t91 by the time TD1_A ((G) of FIG. 21). The time measurement unit 14 then begins to count the clock pulses included in the clock signal CLK on the basis of this signal STRT (signal STRT_D_A) ((A) and (F) of FIG. 21). This causes the count value CNT_A of the time measurement unit 14 to begin to increase ((F) of FIG. 21).

The signal STRT (signal STRT_D_B) of the input terminal of the time measurement unit 14 of the circuit 80B is changed from the low level to the high level at a timing t93 delayed from the timing t91 by the time TD1_B ((L) of FIG. 21). The time measurement unit 14 then begins to count the clock pulses included in the clock signal CLK on the basis of this signal STRT (signal STRT_D_B) ((A) and (K) of FIG. 21). This causes the count value CNT_B of the time measurement unit 14 to begin to increase ((K) of FIG. 21).

At a timing t95, the control unit 79 then changes the activation signals EN_A and EN_B from the low level to the high level ((H) and (M) of FIG. 21). This allows the light receiving unit 70 of each of the circuits 80A and 80B to detect pulse light ((O) of FIG. 21).

Next, at a timing t96 delayed from the timing t94 by the time TOFO of flight, the light receiving units 70 of the circuits 80A and 80B detect the pieces of reflected pulse light L2A and L2B each of which is reflected light by the measurement target object 100 ((E) of FIG. 21).

At a timing t97 delayed from this timing t96 by the time TD3_A, the signal STP_A of the input terminal of the time measurement unit 14 of the circuit 80A is then changed from the low level to the high level ((J) of FIG. 21). The time measurement unit 14 outputs the count value CNT_A (value COA) on the basis of this signal STP_A. As illustrated in (I) of FIG. 21, the selection control signal SELO_A is at the high level ("1"). This causes the demultiplexer 31 of the circuit 80A to supply this count value CNT_A (value COA) to the subtraction section 33. The subtraction section 33 then calculates the difference value DIFF_A by subtracting the count value CNT_A (value COA) supplied from the storage section 32 from the count value CNT_A (value COA) supplied from the demultiplexer 31.

In addition, at a timing t98 delayed from this timing t96 by the time TD3_B, the signal STP_B of the input terminal of the time measurement unit 14 of the circuit 80B is changed from the low level to the high level ((O) of FIG. 21). The time measurement unit 14 outputs the count value CNT_B (value COB) on the basis of this signal STP_B. As illustrated in (N) of FIG. 21, the selection control signal SELO_B is at the high level ("1"). This causes the demultiplexer 31 of the circuit 80B to supply this count value CNT_B (value COB) to the subtraction section 33. The subtraction section 33 then calculates the difference value DIFF_B by subtracting the count value CNT_B (value COB) supplied from the storage section 32 from the count value CNT_B (value COB) supplied from the demultiplexer 31.

The histogram generation unit 76 generates the one histogram HIST as illustrated in FIG. 4 on the basis of the difference value DIFF_A supplied from the calculation unit 30 of the circuit 80A and the difference value DIFF_B supplied from the calculation unit 30 of the circuit 80B. The histogram generation unit 76 then obtains the difference value DIFF having the highest frequency, for example, in this histogram HIST as the difference value DIFFpeak. The signal processing unit 16 is able to calculate the time TOFO of flight, for example, by multiplying this difference value DIFFpeak by the time corresponding to one cycle of the clock signal CLK to calculate the time TDIFF and adding the known time TOFR of flight to this time TDIFF.

In this way, the time measurement device 4 is provided with the two circuits 80A and 80B. The time measurement device 4 generates the one histogram HIST on the basis of the difference value DIFF_A supplied from the circuit 80A and the difference value DIFF_B supplied from the circuit 80B. This makes it possible to reduce the influence of a jitter and increase the measurement accuracy of the time TOFO of flight for pulse light.

In addition, in the time measurement device 4, at least one of the circuits 80A and 80B measures the time TOFO of flight in the driving D2. This makes it possible to continuously measure the time TOFO of flight with no interruption in a case where a delay time in the time measurement device 4 is measured.

In addition, the use of the activation signal EN makes the light receiving unit 70 able to detect pulse light in the time measurement device 4. Alternatively, the use of the activation signal EN makes the light receiving unit 70 unable to detect pulse light in the time measurement device 4. This allows the time measurement device 4 to suppress the influence of a so-called dead time on the light receiving element 21. In other words, in a case where a photon enters the light receiving element 21, avalanche breakdown occurs and the cathode voltage lowers to a voltage near the voltage VAND. Then, once the avalanche breakdown ends after that, the cathode of the light receiving element 21 is charged by using currents flowing through the resistor element 22. The cathode voltage returns to the voltage VDDH. In a period (dead time) in which the cathode voltage is low, the light receiving element 21 is not able to detect the next photon. For example, the light receiving unit 70 is not therefore able to detect the reflected pulse light L2 immediately after detecting the reference pulse light L1R. For example, as illustrated in FIG. 21, in a case where the light receiving unit 70 should detect the reflected pulse light L2, the time measurement device 4 sets the activation signal EN at the low level in a period in which the reference pulse light L1R should enter the light receiving unit 70, thereby preventing the light receiving unit 70 from detecting the reference pulse light L1R. Accordingly, the time measurement device 4 sets the activation signal EN at the low level in advance and sets the activation signal EN at the high level, for example, immediately after the period timing of the entrance of the reference pulse light L1R. Even in case of the entrance of the reflected pulse light L2 immediately after the entrance of the reference pulse light L1R, this makes it possible to detect this reflected pulse light L2. It is thus possible to suppress the influence of a dead time on the light receiving element 21.

Effects

As described, in the present embodiment, the two circuits 80A and 80B are provided. The one histogram is generated on the basis of the difference value DIFF_A supplied from the circuit 80A and the difference value DIFF_B supplied from the circuit 80B. This makes it possible to increase the measurement accuracy of the time of flight for pulse light.

In the present embodiment, at least one of the circuits 80A and 80B measures the time of flight. This makes it possible to continuously measure the time TOFO of flight with no interruption.

In the present embodiment, the use of an activation signal makes the light receiving unit able to detect pulse light. Alternatively, the use of an activation signal makes the light receiving unit unable to detect pulse light. It is thus possible to suppress the influence of a so-called dead time on the light receiving element.

Modification Example 4-1

In the embodiment described above, the two circuits 80A and 80B are provided, but this is not limitative. For example, three or more circuits may be provided in place of two circuits.

Modification Example 4-2

In the embodiment described above, as illustrated in FIGS. 17A, 17B, and 17C, the four periods P1 to P4 are set in the driving D2. In three periods of these four periods P1 to P4, the time TOFO of flight for pulse light to fly from the light emitting unit 11 to the light receiving unit 20 via the measurement target object 100 is measured. In one period of the four periods P1 to P4, a delay time in the time measurement device 4 is measured. This is not, however, limitative. For example, in two periods of these four periods P1 to P4, the time TOFO of flight for pulse light to fly from the light emitting unit 11 to the light receiving unit 20 via the measurement target object 100 may be measured. In two periods of the four periods P1 to P4, a delay time in the time measurement device 4 may be measured. In addition, in the driving D2, for example, five or more periods may be set.

Modification Example 4-3

In the embodiment described above, there is provided one circuit pair including the two circuits 80A and 90B, but this is not limitative. There may be provided a plurality of such circuit pairs. In this case, the time measurement device is able to generate, for example, a depth image as in the modification example 1-3.

Modification Example 4-4

In the embodiment described above, the use of the activation signal EN makes the light receiving unit 70 able to detect pulse light. Alternatively, the use of the activation signal EN makes the light receiving unit 70 unable to detect pulse light. This is not, however, limitative. The following describes a time measurement device 4A according to the present modification example in detail.

FIG. 22 illustrates a configuration example of the time measurement device 4A. The time measurement device 4A includes circuits 90A and 90B, a half mirror 91, a mirror driving unit 92, and a control unit 99.

Each of the circuits 90A and 90B includes the light receiving unit 20, the time measurement unit 14, and the calculation unit 30.

The half mirror 91 functions as the reference reflector 12 according to the embodiment described above and is configured to be able to change the angle. The mirror driving unit 92 is configured to change the angle of the half mirror 91 by driving the half mirror 91.

Each of FIGS. 23A and 23B illustrates an operation example of the half mirror 91. In this example, the light emitting unit 11, the light shielding object 13, the light receiving unit 20 (light receiving unit 20A) of the circuit 90A, and the light receiving unit 20 (light receiving unit 20B) of the circuit 90B are disposed in this order in the X direction. The half mirror 91 selectively reflects a portion of the emission pulse light L0 emitted from the light emitting unit 11 to the light receiving unit 20A or the light receiving unit 20B and transmits the remainder. The half mirror 91 is configured to be rotatable around the axis extending in the Y direction. For example, in a case where the angle of the half mirror 91 is set at the angle illustrated in FIG. 23A, light reflected by the half mirror 91 travels to the light receiving unit 20A as the reference pulse light L1RA. In addition, in a case where the angle of the half mirror 91 is set at the angle illustrated in FIG. 23B, light reflected by the half mirror 91 travels to the light receiving unit 20B as the reference pulse light L1RB. In addition, light passing through the half mirror 91 travels to the measurement target object 100 as the pulse light L1. Pieces of light reflected by the measurement target object 100 then respectively travel to the light receiving units 20A and 20B as the pieces of reflected pulse light L2A and L2B.

The control unit 99 is configured to control an operation of the time measurement device 4A. Specifically, the control unit 99 controls an operation of the time measurement device 4 by supplying the trigger signal LDT to the light emitting unit 11, supplying the clock signal CLK and the signal STRT to each of the time measurement units 14 of the circuits 90A and 90B, supplying the selection control signal SELO_A to the demultiplexer 31 of the circuit 90A, supplying the selection control signal SELO_B to the demultiplexer 31 of the circuit 90B, and supplying the mirror driving unit 92 with a control signal.

Here, the half mirror 91 corresponds to a specific example of the "reference reflector" in the disclosure. The light receiving unit 20 of the circuit 90A corresponds to a specific example of the "first light receiving unit" in the present disclosure. The light receiving unit 20 of the circuit 90B corresponds to a specific example of the "second light receiving unit" in the present disclosure. The time measurement unit 14 of the circuit 90A corresponds to a specific example of the "first timing detection unit" in the present disclosure. The time measurement unit 14 of the circuit 90B corresponds to a specific example of the "second timing detection unit" in the present disclosure. The calculation unit 30 of the circuit 90A corresponds to a specific example of the "first calculation unit" in the present disclosure. The calculation unit 30 of the circuit 90B corresponds to a specific example of the "second calculation unit" in the present disclosure. The control unit 99 and the mirror driving unit 92 each correspond to a specific example of the "control unit" in the present disclosure.

For example, in the example illustrated in FIG. 23A, light reflected by the half mirror 91 travels to the light receiving unit 20A as the reference pulse light L1RA. In other words, the light receiving unit 20B does not detect the reference pulse light L1RB. This allows, for example, the light receiving unit 20B to detect the reflected pulse light L2B without receiving the influence of a dead time. Similarly, for example, in the example illustrated in FIG. 23B, light reflected by the half mirror 91 travels to the light receiving unit 20B as the reference pulse light L1RB. In other words, the light receiving unit 20A does not detect the reference pulse light L1RA. This allows, for example, the light receiving unit 20A to detect the reflected pulse light L2A without receiving the influence of a dead time. Then, the time measurement device 4A alternately repeats this state illustrated in FIG. 23A and the state illustrated in FIG. 23B. This allows the time measurement device 4A to continuously measure the time TOFO of flight with no interruption.

Especially the time measurement device 4A allows the configuration of the light receiving unit 20 to be simpler than that of the light receiving unit 70 (FIG. 16) according to the fourth embodiment described above. This makes it possible to increase the electrical characteristics. In other words, in the light receiving unit 70, for example, the transistor 73 is coupled to the cathode of the light receiving element 21. This increases the capacitance of the cathode and may result in a longer response time. In contrast, the light receiving unit 20 allows the cathode to have lower capacitance than that of the light receiving unit 70 and it is possible to shorten a response time.

5. Example of Application to Mobile Body

The technology (the present technology) according to the present disclosure is applicable to a variety of products. For example, the technology according to the present disclosure may be implemented as a device mounted on any type of mobile body such as an automobile, an electric vehicle, a hybrid electric vehicle, a motorcycle, a bicycle, a personal mobility, an airplane, a drone, a vessel, or a robot.

FIG. 24 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 24, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 24, an audio speaker 12061, a display section 12062, and an instrument panel 12063 are illustrated as the output device. The display section 12062 may, for example, include at least one of an on-board display and a head-up display.

FIG. 25 is a diagram depicting an example of the installation position of the imaging section 12031.

In FIG. 25, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 25 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The above has described the example of the vehicle control system to which the technology according to the present disclosure may be applied. The technology according to the present disclosure may be applied to the imaging section 12031 among the components described above. This allows the vehicle control system 12000 to increase the time measurement accuracy. It is thus possible to increase the accuracy of the collision avoidance or collision mitigation function of vehicles, the following travel function based on the inter-vehicle distance, the vehicle speed maintenance travel function, the collision warning function of the vehicle, the lane departure warning function of the vehicle, and the like.

The above has described the present technology with reference to some embodiments, modification examples, and specific application examples thereof, but the present technology is not limited to these embodiments or the like. A variety of modifications are possible.

For example, in each of the embodiments described above, a half mirror is used as the reference reflector 12, but this is not limitative. It is possible to use a variety of reflectors each of which is able to reflect a portion of light emitted from the light emitting unit 11 and guide the reflected light to the light receiving unit.

It is to be noted that the effects described in the present specification are merely illustrative, but not limited. In addition, other effects may be included.

It is to be noted that the present technology may be configured as below. According to the present technology having the following configurations, it is possible to increase the time measurement accuracy.

(1)

A time measurement device including:

a first light receiving unit configured to detect first pulse light and second pulse light, the first pulse light corresponding to emission pulse light emitted from a light emitting unit, the second pulse light including reflected light by a target object, the reflected light by the target object corresponding to the emission pulse light;

a first timing detection unit configured to detect a first light receiving timing of the first pulse light and a second light receiving timing of the second pulse light by the first light receiving unit on the basis of an output signal of the first light receiving unit;

a first calculation unit configured to calculate a first time value by performing a subtraction process on the basis of the first light receiving timing and the second light receiving timing; and a histogram generation unit configured to generate a histogram on the basis of the first time value.

(2)

The time measurement device according to (1), further including a reference reflector provided at a predetermined position, in which the first pulse light includes reflected light by the reference reflector, the reflected light by the reference reflector corresponding to the emission pulse light.

(3)

The time measurement device according to (1), further including a reflector configured to reflect light from the target object to the target object, in which the first pulse light includes reflected light that has been reflected by the target object, the reflector, and the target object in this order.

(4)

The time measurement device according to (2) or (3), in which the first calculation unit is configured to calculate the first time value by subtracting, from one of the first light receiving timing and the second light receiving timing, another of the first light receiving timing and the second light receiving timing.

(5)

The time measurement device according to (2) or (3), in which the first calculation unit is configured to calculate the first time value by subtracting, from one of the first light receiving timing and the second light receiving timing, another of the first light receiving timing and the second light receiving timing and adding a predetermined time value to a result of the subtraction, the predetermined time value corresponding to a total distance of a distance between the light emitting unit and the reference reflector and a distance between the reference reflector and the first light receiving unit.

(6)

The time measurement device according to (1), further including:

a reference reflector provided at a predetermined position; and a reflector configured to reflect light from the reference reflector to the reference reflector, in which the emission pulse light includes first emission pulse light and second emission pulse light, the first emission pulse light and the second emission pulse light being emitted at timings different from each other, the first pulse light includes reflected light by the reference reflector, the reflected light by the reference reflector corresponding to the first emission pulse light, the second pulse light includes reflected light by the target object, the reflected light by the target object corresponding to the second emission pulse light, the first light receiving unit is configured to further detect third pulse light that includes reflected light corresponding to the first emission pulse light, the reflected light having been reflected by the reference reflector, the reflector, and the reference reflector in this order, the first timing detection unit is configured to detect a third light receiving timing of the third pulse light by the light receiving unit on the basis of an output signal of the light receiving unit, and the first calculation unit is configured to calculate the first time value by performing a subtraction process on the basis of the first light receiving timing, the second light receiving timing, and the third light receiving timing.

(7)

The time measurement device according to (6), in which the first calculation unit is configured to calculate a time parameter on the basis of the first light receiving timing and the third light receiving timing and calculate the first time value by performing the subtraction process on the basis of the second light receiving timing and the time parameter.

(8)

The time measurement device according to (1), further including:

a reference reflector provided at a predetermined position;

a second light receiving unit configured to receive fourth pulse light and fifth pulse light, the fourth pulse light including reflected light by the reference reflector, the reflected light by the reference reflector corresponding to the emission pulse light, the fifth pulse light including reflected light by the target object, the reflected light by the target object corresponding to the emission pulse light;

a second timing detection unit configured to detect a fourth light receiving timing of the fourth pulse light and a fifth light receiving timing of the fifth pulse light by the second light receiving unit on the basis of an output signal of the second light receiving unit; and a second calculation unit configured to calculate a second time value by performing a subtraction process on the basis of the fourth light receiving timing and the fifth light receiving timing, in which the second pulse light includes reflected light by the reference reflector, the reflected light by the reference reflector corresponding to the emission pulse light, and the histogram generation unit is configured to generate the histogram on the basis of the first time value and the second time value.

(9)

The time measurement device according to (8), in which the emission pulse light includes first emission pulse light and second emission pulse light, the first emission pulse light and the second emission pulse light being emitted at timings different from each other, the second pulse light includes reflected light by the target object, the reflected light by the target object corresponding to the first emission pulse light, the fourth pulse light includes reflected light by the reference reflector, the reflected light by the reference reflector corresponding to the first emission pulse light, and the fifth pulse light includes reflected light by the target object, the reflected light by the target object corresponding to the second emission pulse light.

(10)

The time measurement device according to (8) or (9), further including a control unit, in which the first light receiving unit includes a light receiving element and a transistor, the transistor being configured to apply a bias voltage to the light receiving element by being turned on, and the control unit is configured to cause the first light receiving unit to detect one of the first pulse light and the second pulse light and prevent the first light receiving unit from detecting another of the first pulse light and the second pulse light by turning on and off the transistor.

(11)

The time measurement device according to (8) or (9), further including a control unit configured to cause the first pulse light to enter the first light receiving unit or prevent the first pulse light from entering the first light receiving unit by controlling an angle of the reference reflector.

(12)

The time measurement device according to any of (1) to (11), further including the light emitting unit.

The present application claims the priority on the basis of Japanese Patent Application No. 2018-224545 filed on Nov. 30, 2018 with Japan Patent Office, the entire contents of which are incorporated in the present application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A time measurement device, comprising:
   a light emitting unit configured to emit emission pulse light;
   a first light receiving unit configured to detect first pulse light and second pulse light, wherein
     the first pulse light corresponds to the emission pulse light,
     the second pulse light includes first reflected light that is reflected by a target object, and
     the first reflected light corresponds to the emission pulse light;
   a first timing detection unit configured to detect, a first light receiving timing of the first pulse light and a second light receiving timing of the second pulse light, based on a first output signal, wherein the first output signal is associated with the first light receiving unit;
   a first reflector configured to reflect second light from the target object to the target object, wherein
     the first pulse light includes second reflected light,
     the second reflected light is reflected by the target object, the first reflector, and the target object in this order, and
     the second reflected light is different from the first reflected light;
   a first calculation unit configured to:
     perform a first subtraction process based on the first light receiving timing and the second light receiving timing; and
     calculate a first time value based on the first subtraction process; and
   a histogram generation unit configured to generate a histogram based on the first time value.

2. The time measurement device according to claim 1, further comprising a reference reflector at a specific position, wherein
   the first pulse light further includes third reflected light,
   the third reflected light is reflected by the reference reflector, and the third reflected light corresponds to the emission pulse light.

3. The time measurement device according to claim 2, wherein the first calculation unit is further configured to:
    subtract, from one of the first light receiving timing or the second light receiving timing, a third light receiving timing of the first pulse light and a fourth light receiving timing of the second pulse light; and
    calculate the first time value based on the subtraction.

4. The time measurement device according to claim 2, wherein the first calculation unit is further configured to:
    subtract, from one of the first light receiving timing or the second light receiving timing, a third light receiving timing of the first pulse light and a fourth light receiving timing of the second pulse light:
    calculate the first time value based on the subtraction; and
    adding a specific time value to a result of the subtraction, wherein
        the specific time value corresponds to a total distance of a first distance and a second distance,
        the first distance is between the light emitting unit and the reference reflector, and
        the second distance is between the reference reflector and the first light receiving unit.

5. The time measurement device according to claim 1, further comprising:
    a reference reflector at a specific position; and
    a second reflector configured to reflect a third light from the reference reflector to the reference reflector, wherein
        the emission pulse light includes first emission pulse light and second emission pulse light,
        each of the first emission pulse light and the second emission pulse light is emitted at timings different from each other,
        the first pulse light further includes the third reflected light,
        the third reflected light corresponds to the first emission pulse light,
        the second pulse light further includes the first reflected light,
        the first reflected light corresponds to the second emission pulse light,
        the first light receiving unit is further configured to detect third pulse light that includes a fourth reflected light,
        the fourth reflected light corresponds to the first emission pulse light and the third reflected light that is reflected by the reference reflector and the second reflector in this order,
        the first timing detection unit is further configured to detect a third light receiving timing of the third pulse light based on a second output signal,
        the second output signal is associated with the light receiving unit, and the first calculation unit is further configured to;
            perform a second subtraction process based on the first light receiving timing, the second light receiving timing, and the third light receiving timing; and
            calculate the first time value based on the second subtraction process.

6. The time measurement device according to claim 5, wherein the first calculation unit is further configured to:
    calculate a time parameter based on the first light receiving timing and the third light receiving timing;
    perform a third subtraction process based on the second light receiving timing and the time parameter; and
    calculate the first time value based on the third subtraction process.

7. The time measurement device according to claim 1, further comprising:
    a reference reflector at a specific position;
    a second light receiving unit configured to receive fourth pulse light and fifth pulse light, wherein
        the fourth pulse light includes a third reflected light by the reference reflector,
        the third reflected light corresponds to the emission pulse light,
        the fifth pulse light includes the first reflected light, and
        the first reflected light corresponds to the emission pulse light;
    a second timing detection unit configured to detect a fourth light receiving timing of the fourth pulse light and a fifth light receiving timing of the fifth pulse light based on a second output signal,
        wherein the second output signal is associated with the second light receiving unit; and
    a second calculation unit configured to:
        perform a second subtraction process based on the fourth light receiving timing and the fifth light receiving timing; and
        calculate a second time value based on the second subtraction process, wherein
            the second pulse light further includes the third reflected light, and
            the histogram generation unit is further configured to generate the histogram based on the first time value and the second time value.

8. The time measurement device according to claim 7, wherein
    the emission pulse light includes first emission pulse light and second emission pulse light,
    each of the first emission pulse light and the second emission pulse light is emitted at timings different from each other,
    the second pulse light further includes the first reflected light,
    the first reflected light corresponds to the first emission pulse light,
    the fourth pulse light includes the third reflected light,
    the third reflected light corresponds to the first emission pulse light,
    the fifth pulse light includes the first reflected light, and
    the first reflected light corresponds to the second emission pulse light.

9. The time measurement device according to claim 7, further comprising a control unit, wherein
    the first light receiving unit includes a light receiving element and a transistor,
    the transistor is configured to apply a bias voltage to the light receiving element based on the light receiving element being turned on, and
    the control unit is configured to;
        control the first light receiving unit to detect one of the first pulse light or the second pulse light based on the transistor being turned on; and
        control the first light receiving unit to prevent the first light receiving unit to detect a third pulse light and a fourth pulse light based on the transistor being turned off.

10. The time measurement device according to claim 7, further comprising a control unit configured to one of:

control the first pulse light to enter the first light receiving unit; or prevent the first pulse light to enter the first light receiving unit based on an angle of the reference reflector.

11. A time measurement device, comprising:
a light emitting unit configured to emit emission pulse light;
a first light receiving unit configured to detect first pulse light and second pulse light, wherein
the first pulse light corresponds to the emission pulse light,
the second pulse light includes first reflected light that is reflected by a target object, and
the first reflected light corresponds to the emission pulse light;
a first timing detection unit configured to detect, a first light receiving timing of the first pulse light and a second light receiving timing of the second pulse light, based on a first output signal, wherein the first output signal is associated with the first light receiving unit;
a first reflector configured to reflect second light from the target object to the target object, wherein
the first pulse light includes second reflected light,
the second reflected light is reflected by the target object, the first reflector, and the target object in this order, and
the second reflected light is different from the first reflected light;
a first calculation unit configured to:
perform a first subtraction process based on the first light receiving timing and the second light receiving timing; and
calculate a first time value based on the first subtraction process;
a histogram generation unit configured to generate a histogram based on the first time value;
a reference reflector at a specific position; and
a second reflector configured to reflect a third light from the reference reflector to the reference reflector, wherein
the emission pulse light includes first emission pulse light and second emission pulse light,
each of the first emission pulse light and the second emission pulse light is emitted at timings different from each other,
the first pulse light further includes the third reflected light,
the third reflected light corresponds to the first emission pulse light,
the second pulse light further includes the first reflected light,
the first reflected light corresponds to the second emission pulse light,
the first light receiving unit is further configured to detect third pulse light that includes a fourth reflected light,
the fourth reflected light corresponds to the first emission pulse light and the third reflected light that is reflected by the reference reflector and the second reflector in this order,
the first timing detection unit is further configured to detect a third light receiving timing of the third pulse light based on a second output signal,
the second output signal is associated with the light receiving unit, and the first calculation unit is further configured to:
perform a second subtraction process based on the first light receiving timing, the second light receiving timing, and the third light receiving timing; and
calculate the first time value based on the second subtraction process.

12. The time measurement device according to claim 11, wherein the first calculation unit is further configured to:
calculate a time parameter based on the first light receiving timing and the third light receiving timing;
perform a third subtraction process based on the second light receiving timing and the time parameter; and
calculate the first time value based on the third subtraction process.

13. A time measurement device, comprising:
a light emitting unit configured to emit emission pulse light;
a first light receiving unit configured to detect first pulse light and second pulse light, wherein
the first pulse light corresponds to the emission pulse light,
the second pulse light includes first reflected light that is reflected by a target object, and
the first reflected light corresponds to the emission pulse light;
a first timing detection unit configured to detect, a first light receiving timing of the first pulse light and a second light receiving timing of the second pulse light, based on a first output signal, wherein the first output signal is associated with the first light receiving unit;
a first reflector configured to reflect second light from the target object to the target object, wherein
the first pulse light includes second reflected light,
the second reflected light is reflected by the target object, the first reflector, and the target object in this order, and
the second reflected light is different from the first reflected light;
a first calculation unit configured to:
perform a first subtraction process based on the first light receiving timing and the second light receiving timing; and
calculate a first time value based on the first subtraction process;
a histogram generation unit configured to generate a histogram based on the first time value;
a reference reflector at a specific position;
a second light receiving unit configured to receive fourth pulse light and fifth pulse light, wherein
the fourth pulse light includes a third reflected light by the reference reflector,
the third reflected light corresponds to the emission pulse light,
the fifth pulse light includes the first reflected light, and
the first reflected light corresponds to the emission pulse light;
a second timing detection unit configured to detect a fourth light receiving timing of the fourth pulse light and a fifth light receiving timing of the fifth pulse light based on a second output signal,
wherein the second output signal is associated with the second light receiving unit; and
a second calculation unit configured to:
perform a second subtraction process based on the fourth light receiving timing and the fifth light receiving timing; and calculate a second time value based on the second subtraction process, wherein
the second pulse light further includes the third reflected light, and
the histogram generation unit is further configured to generate the histogram based on the first time value and the second time value.

14. The time measurement device according to claim 13, wherein
the emission pulse light includes first emission pulse light and second emission pulse light,
each of the first emission pulse light and the second emission pulse light is emitted at timings different from each other,
the second pulse light further includes the first reflected light,
the first reflected light corresponds to the first emission pulse light,
the fourth pulse light includes the third reflected light,
the third reflected light corresponds to the first emission pulse light,
the fifth pulse light includes the first reflected light, and
the first reflected light corresponds to the second emission pulse light.

15. The time measurement device according to claim 13, further comprising a control unit, wherein
the first light receiving unit includes a light receiving element and a transistor,
the transistor is configured to apply a bias voltage to the light receiving element based on the light receiving element being turned on, and
the control unit is configured to:
control the first light receiving unit to detect one of the first pulse light or the second pulse light based on the transistor being turned on; and
control the first light receiving unit to prevent the first light receiving unit to detect a third pulse light and a fourth pulse light based on the transistor being turned off.

16. The time measurement device according to claim 13, further comprising a control unit configured to one of:
control the first pulse light to enter the first light receiving unit; or
prevent the first pulse light to enter the first light receiving unit based on an angle of the reference reflector.

\* \* \* \* \*